INVENTOR.
Henry S. Young.
BY
HIS ATTORNEY.

June 26, 1951 H. S. YOUNG 2,558,473

AUTOMATIC BLOCK SIGNALING SYSTEM FOR SINGLE TRACK RAILROADS WITH TWO-DIRECTION CODED TRACK CIRCUITS

Filed June 5, 1946 11 Sheets-Sheet 2

INVENTOR.
Henry S. Young.
BY
HIS ATTORNEY.

AUTOMATIC BLOCK SIGNALING SYSTEM FOR SINGLE TRACK RAILROADS WITH TWO-DIRECTION CODED TRACK CIRCUITS
Filed June 5, 1946 11 Sheets-Sheet 3

INVENTOR.
Henry S. Young.
BY [signature]
HIS ATTORNEY.

INVENTOR.
Henry S. Young.
BY
HIS ATTORNEY.

INVENTOR.
Henry S. Young.
BY
HIS ATTORNEY.

INVENTOR.
Henry S. Young.
BY
[signature]
HIS ATTORNEY.

INVENTOR.
Henry S. Young.
BY
[signature]
HIS ATTORNEY.

INVENTOR.
Henry S. Young.
BY
HIS ATTORNEY.

June 26, 1951 H. S. YOUNG 2,558,473

AUTOMATIC BLOCK SIGNALING SYSTEM FOR SINGLE TRACK RAILROADS WITH TWO-DIRECTION CODED TRACK CIRCUITS

Filed June 5, 1946 11 Sheets-Sheet 9

INVENTOR.
Henry S. Young.
BY
[signature]
HIS ATTORNEY.

June 26, 1951 H. S. YOUNG 2,558,473

AUTOMATIC BLOCK SIGNALING SYSTEM FOR SINGLE TRACK RAILROADS WITH TWO-DIRECTION CODED TRACK CIRCUITS

Filed June 5, 1946 11 Sheets-Sheet 10

INVENTOR.
Henry S. Young.
BY
HIS ATTORNEY.

June 26, 1951 H. S. YOUNG 2,558,473

AUTOMATIC BLOCK SIGNALING SYSTEM FOR SINGLE TRACK RAILROADS WITH TWO-DIRECTION CODED TRACK CIRCUITS

Filed June 5, 1946 11 Sheets-Sheet 11

INVENTOR.
Henry S. Young.
BY [signature]
HIS ATTORNEY.

Patented June 26, 1951

2,558,473

UNITED STATES PATENT OFFICE 2,558,473

AUTOMATIC BLOCK SIGNALING SYSTEM FOR SINGLE-TRACK RAILROADS WITH TWO-DIRECTION CODED TRACK CIRCUITS

Henry S. Young, Wilkinsburg, Pa., assignor to The Union Switch & Signal Company, Swissvale, Pa., a corporation of Pennsylvania Application June 5, 1946, Serial No. 674,436

23 Claims. (Cl. 246—33)

My invention relates to an automatic block signaling system for single track railroads which is controlled by two-direction coded track circuits.

An object of my invention is to provide an improved system of the type described which can be installed and maintained at the minimum cost so that the system is available for use in stretches where the number of trains operated is not sufficient to warrant the installation of a more complete system.

Another object of the invention is to provide an improved system of the type described which is arranged so that the system is controlled entirely over the track rails throughout most of the terrritory to thereby reduce the need for line wires.

A further object of the invention is to provide a system of the type described which is arranged so that the energy consumed by the system is reduced to the minimum and to thus make it practicable to operate the system from primary batteries.

Another object of the invention is to provide an improved system of the type described which is arranged so that when the track stretch is vacant only the basic elements of the system are energized, and so that on movement of a train through the stretch additional portions of the system essential for the control of the signals for this train are automatically energized on the approach of a train and are automatically deenergized after passage of the train.

A further object of the invention is to provide a system of the type described which is arranged to employ searchlight type signals, and in which the windings of the searchlight type signals are normally deenergized and become energized only when necessary in the control of the system.

Another object of the invention is to provide a system of the type described in which the lamps of the searchlight type signals are normally extinguished and become lighted on the approach of a train.

A further object of the invention is to provide a system of the type described in which the head block signals governing entrance of trains into a single track stretch between sidings are controlled by traffic conditions in the stretch so as to indicate stop if the stretch is occupied and may indicate clear only if the entire stretch is unoccupied.

Another object of the invention is to provide a system in which the head block signals governing entrance of traffic into the single track stretch between sidings are controlled by traffic conditions in a portion of the main track which parallels the passing siding in advance so that the signal will be held at stop if this main track portion is occupied by a train approaching the single track stretch but may clear if this track portion is occupied by a train leaving the single track stretch.

Another object of the invention is to provide an improved system of the type described in which each of the track sections in the single track stretches is provided with two track circuits employing coded energy, one for each direction of traffic.

A further object of the invention is to provide a system of the type described in which the impulses of coded energy employed are of relatively long duration so that an impulse of energy supplied to one end of a stretch can be transmitted or repeated through all of the sections in this stretch to the other end of the stretch.

Another object of the invention is to provide a system in which the impulses of energy supplied to each end of a track stretch are separated by relatively long periods so that there is ample opportunity between the energy impulses supplied to one end of a stretch for impulses of coded energy to be received over the track rails from the other end of the stretch.

A further object of the invention is to provide improved signal control circuits which are arranged so that a change from the clear to the caution indication will occur promptly even though the code detecting relays employed to control the signal are slow in releasing.

Other objects of the invention and features of novelty will be apparent from the following description taken in connection with the accompanying drawings.

I shall describe one form of railway signaling system embodying my invention, together with a modification thereof which I may employ, and shall then point out the novel features thereof in claims.

Briefly described, the system shown in the drawings of this application is applied to a railroad track layout in which each passing siding has at each end a head block signal which governs entrance of traffic into an adjoining single track stretch, and an entering signal which governs entrance of traffic into the main track portion of the tracks in the siding area. In each single track stretch there are distant signals which govern traffic approaching the entering signals. The entering and distant signals are capable of displaying either a stop, a caution, or a clear indication, and the head block signals are capable of displaying either a stop or a clear indication. The head block and distant signals are governed by the coded track circuit apparatus, and the entering signals are governed over line circuits which extend the length of the passing sidings, one of which is provided for each direction of traffic. The main track portion of the tracks in the siding area is usually divided into two track sections having steady energy track circuits, and the line circuits are controlled by traffic conditions in the siding sections and in the single track stretches.

In this system, the rails of each single track stretch are divided into a plurality of track sections each of which has at each end a code following track relay which is operated by energy supplied over the section rails, and a transmitter relay which is effective when energized to connect a source of energy across the rails of the stretch and when deenergized to connect the associated track relay across the rails of the stretch. The operating circuit for each transmitter relay includes a back contact of the associated track relay. Impulse forming equipment at each end of the stretch normally supplies impulses of substantial duration to the operating circuit for the associated transmitter relay, and each track relay in the track stretch except the track relays at the ends of the stretch is effective when its contacts are picked up to connect a source of energy across the rails of the adjacent end of the adjoining track section so that on the supply of energy to an end of the stretch the supply of energy is repeated through all the sections to operate the track relay at the other end, provided the stretch is unoccupied. Each impulse forming equipment is governed by the associated track relay and operates when in its active condition so long as the track relay is responding to received impulses to supply an energy impulse following each release of the track relay so that impulses of coded energy are normally transmitted over the rails of each single track stretch from end to end alternately in opposite directions. When the associated track relay remains released, each equipment operates, if in its active condition, to supply impulses of energy at intervals which are substantially longer than the impulses. Normally the track relays at the ends of the stretch are operated periodically by the received impulses to energize code detecting relays which indicate that the single track stretch is unoccupied. The code detecting relays prepare circuits for the windings of the head block signals and interrupt the circuits of the windings of the entering signals. When a train is about to enter a single track stretch, the supply of coded energy to the adjacent or entrance end of the stretch is cut off, thereby causing release of the code detecting relays at the other or exit end of the stretch, while the supply of coded energy over the single track stretch toward the train is maintained and causes the head block signal in advance of the train to show clear. Release of the code detecting relays at the exit end of the stretch insures that the opposing head block signal will be at stop, while it completes the circuit of the winding of the entering signal so that energy is supplied to this winding over its line circuit depending on traffic conditions in the main track portion and in the single track stretch in advance. Energization of the winding of the entering signal governs the polarity of the coded energy supplied to the single track stretch and thus controls the distant signal in the rear.

Certain features of the system shown herein, relating to the approach control of the signal mechanisms and lamps, are disclosed and claimed in a copending application for Letters Patent of the United States, Serial No. 680,885, of Crawford E. Staples, filed July 2, 1946, for Approach Control Apparatus for Railroad Block Signaling Systems. This application has matured to Patent Number 2,555,013 dated May 29, 1951.

In the drawings,

Figs. 1A, 1B, 1C and 1D, arranged side by side in the order named with Fig. 1A at the left show the track plan and the circuits associated with a single track stretch. Fig. 1A shows the circuits at the right-hand or east end of a passing siding I and at the adjoining or left-hand end of the single track stretch, while Fig. 1D shows the circuits at the left-hand end of a passing siding II and at the adjoining or right-hand end of the single track stretch. Figs. 1B and 1C show the circuits at the distant signals for the passing sidings, while Fig. 1B also shows the circuits which are employed at a cut-section. The circuits for a siding section are illustrated by placing Figs. 1A and 1D together with Fig. 1A at the right.

Figs. 2A to 2H, inclusive, are a series of diagrams showing the operation of the equipment on movement of an eastbound train through the stretch, Figs. 3A to 3H, inclusive, are a series of diagrams showing the operation of the equipment on movement of a westbound train through the stretch, Figs. 4A, 4B and 4C are a series of diagrams showing the operation of the equipment when two trains meet at a passing siding, and Figs. 5A and 5B show a modified arrangement of equipment which may be employed where a passing siding is relatively short.

Similar reference characters refer to similar parts in each of the several views.

In most instances in the drawings the relay contacts are shown directly under the relay winding, but in some cases, in order to simplify the drawings, relay contacts are separated from the relay winding. Where this is done, the relay with which the contacts are associated is indicated by appropriate reference characters placed above the contacts.

In this system the single track stretch between passing sidings is divided by insulated joints in the track rails into a plurality of track sections, each of which is provided with two sets of coded track circuit equipment, one for each direction of traffic. At each end of the single track stretch there is an end track section extending from the end of the passing siding to the distant signal for this siding. The portion of the single track stretch between the distant signals may form one or more track sections, the number depending on the length of this portion of the stretch. If more than one track section is required, the supply of coded energy in both directions is repeated between sections by front contact coding cut-section equipment. As shown, the single track portion between signals 3S and 4S is divided into two sections which are designated A3T and A4T.

In this modification of the invention the main track portion beside each passing siding is divided into two track sections 1T and 6T, each of which is provided with a track circuit employing steady energy. These passing siding track sections extend beyond and include the hand-throw track switches which connect the single track stretches with the main track portions or with the passing sidings.

As hereinafter explained the entering signals 1S and 6S, which govern entrance of traffic from the single track stretch into the main track portions beside the passing sidings, are governed over line circuits which extend the length of the passing siding and are controlled by the track relays of the track sections 1T and 6T in the siding area.

As shown, all of the signals are of the searchlight type shown in Letters Patent of the United States No. 1,864,224, issued June 21, 1932 to Wesley B. Wells for Light Signals, and each is provided with a spectacle arm biased to a position in which the signal, when lighted, displays a red or stop indication. On the supply of energy to the winding of a signal, the spectacle arm of the signal is moved to a position in which it causes the signal, when lighted, to display a yellow or a green indication depending on the polarity of the energy.

Each signal location in the track stretch is provided with a suitable source of direct current such as a battery, not shown, the terminals of which are designated B and C in the drawings.

The equipment is shown in the condition which it assumes when the single track stretch and the main track portions beside the passing sidings are vacant, and when there are no approaching trains adjacent the passing sidings.

At this time, as hereinafter explained, a code detecting relay 2TBP (Fig. 1A) is picked up and its contact 10 interrupts the circuit of the winding of entering signal 1S so contact G of the signal interrupts the circuit of a repeater relay 1DPR for signal 1S and it is released to cause energy of reverse polarity to be supplied to the rails of section 2—3T.

*Construction and operation of code generating equipment at left-hand end of single track stretch*

The supply of energy from track battery 2TB to the rails of section 2—3T, and the connection of track relay 2TR across the rails of section 2—3T, are governed by a code transmitter 2CT and the associated transmitter relays 2CRA, 2CRB and 2CRC.

The code transmitter 2CT, as well as the other code transmitters employed in this system, is preferably of a type which operates at a relatively low speed, such as at the rate of 75 code cycles a minute, so that the code transmitter contacts occupy each of their two positions for a relatively long period, such as .4 of a second.

The code transmitter 2CT and the transmitter relays 2CRA, 2CRB and 2CRC cooperate as hereinafter explained in detail to supply impulses of energy to the rails of the track stretch and to connect the track relay 2TR across the track rails. These transmitter relays together with the code transmitter provide means for supplying to the rails of the stretch impulses of energy of accurately measured length which are long enough to be certain to be repeated through the single track stretch to the other end. In addition, these transmitter relays and the code transmitter provide means for insuring that the time interval between successive energy impulses supplied to the left-hand end of the single track stretch is long enough to enable impulses of energy supplied at the other end of the stretch to be transmitted over the rails of the stretch to pick up the track relay 2TR.

As hereinafter explained, the transmitter relays 5CRA, 5CRB and 5CRC and the code transmitter 5CT at the other end of the single track streetch cooperate in a similar manner to supply energy impulses to the track rails and to connect the track relay 5TR across the track rails.

The system of this invention is not limited to the use of the particular means shown for generating the impulses of coded track circuit energy, and it is contemplated that other means may be employed for the purpose.

The arrangement of the transmitter relays CRA, CRB and CRC and the code transmitters CT is not a part of this invention, and is shown and claimed in application for Letters Patent of the United States Serial No. 676,643 of Crawford E. Staples, filed June 14, 1946 for Coded Signaling Apparatus which has matured to Patent No. 2,496,607 dated February 7, 1950.

The code transmitter 2CT and the associated transmitter relays are shown in the condition which they assume when energy is being supplied from track battery 2TB to the rails of sections 2—3T. At this time the positive terminal of the battery is connected over back contacts 14 and 15 of relay 2CRC in multiple, front contact 16 of relay 2CRB, front contacts 17 and 18 of relay 2CRA in series, front contact 19 of relay 2CRB, and back contact 20 of the signal repeater relay 1DPR to track rail 1, while the negative terminal of the battery is connected over back contact 21 of relay 1DPR to track rail 2.

As shown, the relays 2CRA and 2CRB are energized by current supplied over their stick circuits. The stick circuit for relay 2CRA is traced from terminal B over front contact 25 of track relay 1TR for one of the siding sections, back contact 26 of track relay 2TR, back contact 27 of relay 2CRC, and front contact 28 of relay 2CRA. The stick circuit for relay 2CRB is traced from contact 26 of relay 2TR over front contact 29 of relay 2CRA, and its own front contact 30.

As hereinafter explained in detail, the transmitter relays 2CRA, 2CRB and 2CRC operate cyclically in response to operation of the code transmitter 2CT so as to complete one cycle of operation every three cycles of operation of the code transmitter, unless operation of the relays 2CRA, 2CRB and 2CRC is altered because of picking up of the track relay 2TR. The cycle of operation of the transmitter relays 2CRA, 2CRB and 2CRC is such that these relays are first successively picked up, and are then successively released so there are six steps in the complete cycle, one step for each movement of the contacts of the code transmitter.

The position of the contacts of the transmitter relays 2CRA, 2CRB and 2CRC, and of the code transmitter 2CT during each of the six steps in the complete cycle is shown by the following chart in which the first step in the cycle is assumed to be the condition in which the contacts of the relays 2CRA, 2CRB and 2CRC, and of the code transmitter 2CT are all released.

| 2CT | STEP | 2CRA | 2CRB | 2CRC | |
|---|---|---|---|---|---|
| Down | 1 | Down | Down | Down | Track Relay Connected Across Track Rails. |
| Up | 2 | Up | Down | Down | Do. |
| Down | 3 | Up | Up | Down | Track Battery Connected Across Track Rails. |
| Up | 4 | Up | Up | Up | Rails Short Circuited. |
| Down | 5 | Down | Up | Up | Track Relay Connected Across Track Rails. |
| Up | 6 | Down | Down | Up | Do. |

As shown in Fig. 1A of the drawings, the relays 2CRA, 2CRB and 2CRC and the code transmitter 2CT are in the condition designated step 3 in the chart above.

On the next movement of the contacts of the code transmitter 2CT to their picked-up position energy is supplied to relay 2CRC over the circuit which is traced from contact 26 of relay 2TR, over front contact 34 of relay 2CRB, and front contact 35 of code transmitter 2CT, while when relay 2CRC picks up, its contact 36 establishes a stick circuit including front contact 34 of relay 2CRB. In addition, when relay 2CRC picks up, its contact 27 establishes a stick circuit which includes front contact 38 of code transmitter 2CT.

When code transmitter 2CT picks up to begin step 4, energy is also supplied over its front contact 39 to relay 2CRA over the circuit which includes front contact 29 of relay 2CRA, while relay 2CRB is maintained energized by current supplied over the circuit which is traced from contact 26 of track relay 2TR over front contact 29 of relay 2CRA and its own front contact 30. The energy supplied to relay 2CRA over its own front contact 29 and front contact 39 of code transmitter 2CT keeps the contacts of relay 2CRA picked up after interruption of the supply of energy thereto over back contact 27 of relay 2CRC, and over front contact 31 of code transmitter 2CT. The equipment is now in the condition designated step 4 in the chart above.

When relay 2CRC picks up, its contacts 14 and 15 interrupt the circuit traced above for supplying energy from track battery 2TB to the track rails and short circuit the track rails over the circuit which is traced from track rail 2 over back contact 21 of relay 1DPR, front contacts 14 and 15 of relay 2CRC in multiple, front contact 16 of relay 2CRB, front contacts 17 and 18 of relay 2CRA in series, front contact 19 of relay 2CRB, and back contact 20 of relay 1DPR to track rail 1. This short circuiting of the track rails dissipates any energy stored in the track circuit as a result of previous supply of energy to the track circuit from the track battery, and eliminates the possibility of operation of the track relay 2TR by stored energy from the track circuit on subsequent connection of the track relay with the track rails.

On the next movement of the contacts of code transmitter 2CT to their released position, contact 39 interrupts the circuit traced above for energizing relay 2CRA and after a short time interval relay 2CRA releases. At this time relay 2CRB is maintained energized over the circuit which is traced from back contact 26 of relay 2TR over front contact 34 of relay 2CRB, and back contact 35 of code transmitter 2CT so the contacts of relay 2CRB remain picked up. As relay 2CRB is picked up, energy is supplied to relay 2CRC over the circuit which is traced from contact 26 of relay 2TR over front contact 34 of relay 2CRB and front contact 36 of relay 2CRC so the relay 2CRC remains picked up. The equipment is now in the condition designated step 5 in the chart above.

On release of relay 2CRA its contacts 17 and 18 interrupt the circuit traced above for short circuiting the track rails 1 and 2, while the track relay 2TR is now connected across the track rails over the circuit which is traced from track rail 2 over back contacts 18 and 17 of relay 2CRA in series, and winding of relay 2TR to track rail 1. Accordingly, whenever relay 2CRA is released, the relay 2TR is connected across the track rails and may respond to energy supplied over the track rails from the other end of the track section even though relays 2CRB and 2CRC are both picked up.

During the next picked-up period of the contacts of the code transmitter 2CT its contacts 35 and 39 interrupt the circuits for supplying energy to relay 2CRB and its contacts release. At this time, energy is supplied to relay 2CRC over the circuit which is traced from back contact 26 of relay 2TR over front contact 27 of relay 2CRC and front contact 38 of code transmitter 2CT. Accordingly, during this picked-up period of the code transmitter 2CT the relay 2CRC remains energized and its back contact 27 interrupts the circuit including front contact 31 of code transmitter 2CT for supplying energy to relay 2CRA and relay 2CRA is not picked up during this picked-up period of the code transmitter. As relay 2CRA remains released its contacts 17 and 18 continue to connect track relay 2TR across the track rails. The equipment is now in the condition designated step 6 in the chart above.

During the next released period of the contacts of code transmitter 2CT, its contacts 35 and 38 interrupt the circuits for supplying energy to relay 2CRC and it releases so that its contacts 27 and 36 additionally interrupt the relay stick circuit, while back contact 27 of relay 2CRC is closed. The equipment is now in the condition designated step 1 in the chart above.

During the next picked-up period of the contacts of the code transmitter 2CT energy is supplied to the relay 2CRA over the circuit which is traced from contact 26 of track relay 2TR, back contact 27 of relay 2CRC, and front contact 31 of code transmitter 2CT. The energy supplied to relay 2CRA picks up the relay contacts so that contact 28 establishes one of the relay stick circuits to keep the relay energized after movement of the contacts of code transmitter 2CT to their released position. The equipment is now in the condition designated step 2 in the chart above.

When relay 2CRA picks up, its contacts 17 and 18 interrupt one circuit for connecting track relay 2TR across the track rails and establish a circuit including back contacts 16 and 19 of relay 2CRB for connecting the track relay 2TR across the track rails.

During the next movement of the contacts of code transmitter 2CT to their released position, energy is supplied to the relay 2CRB over the circuit which is traced from contact 26 of track relay 2TR over front contact 29 of relay 2CRA and back contact 39 of code transmitter 2CT and the contacts of relay 2CRB pick up. When relay 2CRB picks up, its contact 30 establishes one stick circuit for the relay while its contact 34 establishes another stick circuit for the relay, and the equipment is again in the condition designated step 3 in the chart above.

In addition, when relay 2CRB picks up, its contacts 16 and 18 interrupt the circuit for connecting track relay 2TR across the track rails and establish the circuit traced above for connecting the track battery 2TB across the track rails, and the equipment is now in the condition in which it is illustrated in Fig. 1A of the drawings.

From the foregoing it will be seen that as a result of operation of the contacts of the code transmitter 2CT between their two positions the relays 2CRA, 2CRB and 2CRC are picked up on successive operations of the code transmitter contacts, and on continued operation of the code transmitter 2CT the relays 2CRA, 2CRB and 2CRC are released on successive operations of the code transmitter contacts, whereupon the cycle of operations just described is repeated.

As one relay is picked up in response to each movement of the contacts of the code transmitter, and as one relay is thereafter released in response to each movement of the contacts of the code transmitter, the complete chain of operation of these relays occurs in six operations of the contacts of the code transmitter, that is, in three code cycles.

During the period (step 3) in which the relays 2CRA and 2CRB are picked up and the relay 2CRC is released, the track battery 2TB is connected across the track rails, while during the step in the cycle immediately following the supply of energy to the track rails (step 4), the relay 2CRC picks up to discontinue the supply of energy to the track rails and to short circuit the rails and thereby dissipate any energy stored in the track circuit. During the remaining four out of the six periods or steps in the chain of operation of the relays 2CRA, 2CRB and 2CRC, the track relay 2TR is connected across the track rails so that it may respond to energy supplied over the rails of the stretch.

As is clearly shown in Fig. 1A of the drawings the energy which is supplied to the pick-up and stick circuits for the transmitter relays 2CRA, 2CRB and 2CRC is supplied over the circuit which includes back contact 26 of the track relay 2TR so that when the track relay 2TR picks up the supply of energy to the relays 2CRA, 2CRB and 2CRC is cut off. As is also clearly shown in the drawings the circuit of the code transmitter 2CT is independent of the track relay 2TR and the code transmitter operates continuously irrespective of operation of the track relay. Each of the relays 2CRA, 2CRB and 2CRC is snubbed by a rectifier which delays release of the relay contacts along enough to bridge momentary interruptions in the supply of energy to the relay winding, such as occurs during movement of the contacts of the code transmitter between their two positions. However, the rectifiers will not delay release of the relays long enough to bridge a sustained interruption in the supply of energy to the winding of a relay, as occurs when the track relay picks up. Accordingly, when the track relay 2TR picks up, and its contact 26 interrupts the circuits of the relays 2CRA, 2CRB and 2CRC, any of these relays which are picked up will release, and all of these relays thereafter remain released until they are picked up as a result of operation of code transmitter 2CT subsequent to release of the track relay 2TR.

As previously explained, energy is supplied from battery 2TB to the track rails in the step or period in which relays 2CRA and 2CRB are picked up and relay 2CRC is released, while during the next or succeeding step or period the relay 2CRC is picked up and the track rails are short-circuited. During these two periods the track relay 2TR is not connected across the track rails, and hence cannot be picked up, so its contact 26 is certain to remain released and maintain the circuit for supplying energy to the relays 2CRA, 2CRB and 2CRC, and there is no possibility that the supply of energy from the track battery to the section rails, or the short-circuiting of the track rails, will be interrupted or disturbed by picking up of the track relay.

During the remaining four steps or periods in the chain of relay operation, that is, when (1) relay 2CRA is released and relays 2CRB and 2CRC are picked up; (2) relays 2CRA and 2CRB are released and relay 2CRC is picked up; (3) relays 2CRA, 2CRB and 2CRC are released; or (4) relay 2CRA is picked up and relays 2CRB and 2CRC are released, the track relay 2TR is connected across the section rails and may respond to energy supplied over the track rails.

As will be explained below, a short period will elapse from the time at which an impulse of energy is supplied to the single track stretch at the left-hand or west end of the stretch, and the time at which an impulse of energy is received over the track rails at the west end of the stretch. This period of time will ordinarily be longer than the time during which the track rails are short-circuited at the west end following the disconnection of the track battery from the track rails so the track relay will not ordinarily pick up immediately after it is connected across the track rails.

However, when the track relay picks up, any of the relays 2CRA, 2CRB and 2CRC which are picked up will release and will remain released as long as the track relay is picked up. If, at the time the track relay releases, the contacts of the code transmitter are in their released position, the relays 2CRA, 2CRB and 2CRC remain released until the code transmitter contacts pick up. When the track relay is released and the code transmitter contacts are picked up, energy is supplied to the relay 2CRA and its contacts pick up so that on subsequent movement of the contacts of code transmitter 2CT to their released position energy is supplied to relay 2CRB and its contacts pick up to interrupt the circuit of the track relay and to establish the circuit for supplying energy from the track battery to the track rails.

From the foregoing it will be seen that if the track relay is not operated by energy received over the track rails, the code transmitter 2CT and the associated relays cause an impulse of energy to be supplied to the track rails once during every six steps or periods in the chain of relay operations, or during one-half of every third cycle of the code transmitter.

However, if the sequence of operation of the relays 2CRA, 2CRB and 2CRC is interrupted by picking up of the track relay 2TR, an impulse of energy is supplied to the track rails during the first released period of the contacts of the code transmitter following the first picked-up period of its contacts subsequent to release of the track relay contact.

Accordingly, during the times in which the track relay 2TR is responding to coded energy, the sequence of operation of the relays 2CRA, 2CRB and 2CRC may be interrupted so these relays do not cause energy to be supplied to the track rails once during every three cycles or six periods in the operation of the contacts of the code transmitter, but during a period in the operation of the contacts of the code transmitter which is determined by the release of the track relay.

As will be seen from the chart above, the track relay 2TR is connected across the track rails at the start of the fifth period in the cycle of operation of the code transmitted so the track relay contacts may pick up at this time, thereby releasing the relays 2CRB and 2CRC and when the track relay releases, initiating a new cycle of operation of relays 2CRA, 2CRB and 2CRC. Under some conditions, if the track relay 2TR does pick up it will release prior to or during the period corresponding to the sixth period in the previous cycle of operation of the relays 2CRA, 2CRB and 2CRC. During the sixth period the contacts of the code transmitter 2CT are picked up and if the track relay releases during this period in the cycle of operation of the code transmitter, the relay 2CRA will pick up immediately. If this occurs, relay 2CRB will be picked up during the pext period in the cycle of operation of the code transmitter 2CT, and energy is supplied to the track rails from the track battery during this period, which occurs at the time at which the first step in a new cycle would take place if the previous cycle had not been terminated by picking up of the track relay. Under these conditions, therefore, the supply of energy to the track rails occurs after two cycles of operation of the code transmitter.

On the other hand, the track relay 2TR may not pick up until the time corresponding to the second period in a new cycle of operation of the relays 2CRA, 2CRB and 2CRC, and as picking up of the track relay results in release of relay 2CRA, the relay 2CRB will not be picked up during the next period in the operation of the code transmitter contacts so energy will not be supplied to the track rails at this time.

The energy impulses supplied over the track rails to the track relay 2TR are of such duration that the track relay, if picked up during the time corresponding to the second period in a new cycle, will release during the next succeeding period in the cycle, which corresponds to the third period in the new cycle. Accordingly, during the time corresponding to the following or fourth period of the new cycle of operation, energy will be supplied to the relay 2CRA so that during the time corresponding to the next or fifth period in the new cycle of operation of the relays 2CRA, 2CRB and 2CRC, energy is supplied to relay 2CRB and it picks up to cause energy to be supplied from the track battery to the track rails. Under these conditions, therefore, the supply of energy to the track rails occurs after four cycles of operation of the code transmitter.

From the foregoing it will be seen that the equipment at the west end of the stretch, when unaffected by picking up of the track relay 2TR, operates to supply an impulse of energy to the track rails once during every three cycles of operation of the code transmitter, but that if operation of the relay chain is altered by picking up of the track relay 2TR, the impulse of energy may be supplied to the track rails after only two cycles of operation of the code transmitter, or the impulse of energy may not be supplied to the track rails until after four cycles of operation of the code transmitter.

The equipment is arranged so that the impulse of energy supplied to the track rails will always be of the same length regardless of the effect of the track relay on the transmitter relays. As explained above, at times when the track relay is being operated by coded energy, the track battery is connected across the track rails during the first released period of the code transmitter contacts following picking up of the relay 2CRA, while the relay 2CRA is picked up when the track relay is released and the contacts of the code transmitter are picked up. The relay 2CRA, therefore, positively checks that the track relay is released at the time the code transmitter contacts establish the circuit for the relay 2CRB. This arrangement insures that, if the relay 2CRB is picked up to supply energy from the track battery to the track rails, it will be picked up at the start of the released period of the code transmitter contacts and, therefore, will cause energy to be supplied to the track rails for the entire released period of the code transmitter contacts.

In addition, it will be seen that when the track relay 2TR is picked up, its contact 26 interrupts the circuits of the relays 2CRA, 2CRB and 2CRC so that they are certain to remain released and maintain the circuit for connecting the track relay 2TR across the track rails. As a result there is no possibility that the track relay, when picked up, will be released because of interruption of its circuit by the relays 2CRA, 2CRB and 2CRC. Accordingly, if foreign current is present in section 2—3T and picks up the track relay 2TR, this relay will remain picked up and will not establish the circuit of relay 2TBP, which would occur if relay 2TR released. As relay 2TBP remains released, the circuit of the winding of signal 2S is interrupted and this signal displays its stop indication.

*Construction and operation of code generating equipment at right-hand end of single track stretch*

The transmitter relays 5CRA, 5CRB and 5CRC and the code transmitter 5CT associated with the track relay 5TR at the right-hand or east end of the track stretch (Fig. 1D), are arranged in substantially the same manner as the corresponding relays associated with track relay 2TR, and operate in substantially the same manner when the single track stretch is vacant so that track relay 5TR is operated by coded energy. A slow release track repeater relay 5TFP is maintained energized by impulses of coded energy supplied over contact 80 of relay 5TR, and contact 45 of relay 5TFP is picked up. Under these conditions these transmitter relays operate to cause an impulse of energy to be supplied from the track battery 5TB to the track rails of section 4—5T in the first released period of the contacts of the code transmitter 5CT following the period in which the code transmitter contacts are picked up and the contacts of the track relay 5TR are released.

When an impulse of energy is received over the rails of section 4—5T and picks up the contacts of the track relay 5TR, its contact 26*a* interrupts the circuits of the relays 5CRA, 5CRB and 5CRC so that any of these relays which are picked up release and so that all of these relays remain released as long as relay 5TR is picked up.

On release of relay 5TR energy is supplied over front contact 25*a* of the track relay 6TR and back contact 26*a* of track relay 5TR to relay 5CRA during the first picked-up period of the contacts of the code transmitter 5CT. The circuit for supplying energy to relay 5CRA includes back contact 27*a* of relay 5CRC and front contact 31a of code transmitter 5CT, and when relay 5CRA picks up, its contact 28a establishes a stick circuit to keep the relay picked up after release of contact 31a of the code transmitter 5CT. The equipment is now substantially in the condition designated step 2 in the chart above.

On the first movement of the contacts of code transmitter 5CT to their released position, energy is supplied to relay 5CRB over the circuit which is traced from track relay contact 26a over front contact 29a of relay 5CRA and back contact 39a of code transmitter 5CT, and when relay 5CRB picks up, its contact 30a establishes a stick circuit for the relay. The equipment is now substantially in the condition designated step 3 in the chart above.

When relays 5CRA and 5CRB are picked up and relay 5CRC is released, the track battery 5TB is connected across the track rails over the circuit which is traced from the positive terminal of the battery over back contacts 14a and 15a of relay 5CRC in multiple, front contact 16a of relay 5CRB, front contacts 17a and 18a of relay 5CRA in series, front contact 19a of relay 5CRB, and back contact 20a of a repeater relay 6DPR for signal 6S to one track rail, while the other terminal of the battery is connected over back contact 21a of relay 6DPR to the other track rail.

During the second picked-up period of the contacts of code transmitter 5CT, energy is supplied to relay 5CRC over the circuit which is traced from contact 26a of track relay 5TR over front contact 34a of relay 5CRB and front contact 35a of code transmitter 5CT. At this time, contact 27a of relay 5CRC interrupts one stick circuit for relay 5CRA, but relay 5CRA is maintained energized by current supplied over front contact 29a of relay 5CRA and front contact 39a of code transmitter 5CT. In addition, at this time, relay 5CRB is energized by current supplied over its front contact 30a. The equipment is now substantially in the condition designated step 4 in the chart above.

When relay 5CRC picks up, its contacts 14a and 15a interrupt the previously traced circuit for connecting the battery 5TB across the track rails and the track rails are now short circuited over the circuit which is traced from one track rail 2 over back contact 21a of relay 6DPR, front contacts 14a and 15a of relay 5CRC in multiple, front contact 16a of relay 5CRB, front contacts 17a and 18a of relay 5CRA in series, front contact 19a of relay 5CRB, and back contact 20a of relay 6DPR to track rail 1.

During the second released period of the contacts of the code transmitter, the supply of energy to relay 5CRA is interrupted and it releases with the result that its contacts 17a and 18a interrupt the circuit for short-circuiting the track rails and connect the track relay 5TR across the track rails. At this time energy is supplied to relay 5CRB over the circuit which is traced from contact 26a of track relay 5TR over front contact 34a of relay 5CRB, back contact 35a of code transmitter 5CT, and front contact 45 of relay 5TFP, so relay 5CRB remains energized. As relay 5CRB is picked up, energy is supplied over its front contact 34a and front contact 36a of relay 5CRC to the winding of relay 5CRC and it is maintained picked up, and the equipment is now in the condition designated step 5 in the chart above.

During the third picked-up period of the contacts of the code transmitter 5CT, the supply of energy to relay 5CRB is interrupted and it releases, but at this time relay 5CRC is energized by current supplied over its front contact 27a and front contact 38a of code transmitter 5CT. The equipment is now in the condition designated step 6 in the chart above.

During the third released period of the contacts of the code transmitter, the circuit of the relay 5CRC is interrupted and it releases, while thereafter the cycle just described is repeated.

The description above assumes that the operation of relays 5CRA, 5CRB and 5CRC was not interrupted by picking up of relay 5TR, and that relay 5TFP remains picked up so that its contact 45 establishes the stick circuit by which relay 5CRB is maintained energized during the fifth step in the operating cycle. If the track relay 5TR picks up, its contact 26a is open and the relays 5CRA, 5CRB and 5CRC release and a new cycle of operation is started after release of relay 5TR.

The relay 5TFP is energized during the picked-up periods of track relay 5TR and is snubbed by a condenser so as to be slow enough in releasing to remain picked up longer than one cycle of operation of the relays 5CRA, 5CRB and 5CRC. Accordingly, if relay 5TR picks up once during each cycle of operation of the transmitter relay chain, the relay 5TFP remains picked up and its contact 45 is closed so that relay 5CRB remains picked up during the fifth period in the operating cycle, and the relays 5CRA, 5CRB and 5CRC operate on the three-code cycle basis described above, except as these relays are affected by picking up of the track relay.

When a train is in the single track stretch, the track relay 5TR remains released and after a short time interval the relay 5TFP releases and its contact 45 is open. Under these conditions the relay 5CRA picks up during the first picked-up period of the contacts of the code transmitter, that is, during the period forming the second step in a cycle, while relay 5CRB is picked up during the first released period of the code transmitter, that is, during the period forming the third step in a cycle. At this time the track battery 5TB is connected across the track rails so energy is supplied to the track circuit. During the second picked-up period of the code transmitter, that is, during the period forming the fourth step in a cycle, the relays 5CRA and 5CRB are maintained picked up and relay 5CRC is picked up, with the result that the supply of energy to the track rails is cut off and the track rails are short circuited.

During the second released period of the code transmitter 5CT, which corresponds to the fifth step in the operating cycle outlined in the chart above, the relay 5CRA is released, while the relay 5CRB is also released since the stick circuit for this relay is interrupted by contact 45 of relay 5TFP. As relay 5CRB releases, its contact 34a interrupts the stick circuit for relay 5CRC and it releases with the result that the equipment assumes the condition designated step 1 in the chart above.

Under these conditions, that is, when relay 5TFP is released, the relays 5CRA, 5CRB and 5CRC complete one cycle of operation each two cycles of operation of the code transmitter contacts. The track battery is connected across the track rails during one of the four periods in these two cycles, while the track rails are short-circuited during the succeeding one of the four periods. The track relay 5TR is connected across the track rails during the other two periods or steps in the cycle.

It will be seen that regardless of whether the equipment associated with track relay 5TR is operating on the two or the three cycle basis, the energy supplied to the track rails occurs during release of the code transmitter contacts following a picked-up period of its contacts in which the track relay is released. This insures that the impulses of energy supplied to the track rails will always be of the length determined by one-half a cycle of the code transmitter, and the impulses of energy supplied to the right-hand end of the stretch are certain to be long enough to be transmitted through the intermediate sections to the left-hand end of the stretch, but will not be so long as to interfere with transmission of impulses of coded energy over the single track stretch in the opposite direction.

As previously explained, when the single track stretch is occupied, the equipment at the left-hand or west end of the stretch (Fig. 1A) operates on a cycle which requires three cycles of the code transmitter 2CT, and the track battery 2TB is connected across the track rails during one of the six periods in the three code cycles, the track rails are short-circuited during the succeeding one of the six periods, and the track relay is connected across the track rails during the remaining four of the six periods.

Since during occupancy of the single track stretch the equipment at the two ends of the stretch operates at different rates, the impulses of energy supplied over the track rails from opposite ends of the stretch will not occur simultaneously for extended periods of time after the single track stretch is vacated. Instead, as soon as the single track stretch is vacated, there will promptly occur a time at which the track relay 5TR is connected across the track rails and will respond to energy repeated from the west end of the stretch. Accordingly, the track relay 5TR will be picked up promptly when the single track stretch is vacated, and as soon as the track relay 5TR picks up energy is supplied to relay 5TFP, and it picks up so that thereafter the equipment associated with track relay 5TR operates to supply an impulse of energy to the section rails following release of the track relay, or, until the relay 5TFP releases, to supply an impulse of energy to the track rails once during each three cycles of operation of the code transmitter 5CT.

*Construction and operation of coded track circuit equipment for single track stretch*

The operation of the code detecting and impulse generating equipment at opposite ends of the single track stretch having been considered separately, the operation of the equipment for the single track stretch as a whole will now be considered.

When the equipment at the left-hand end of the stretch, Fig. 1A, operates to supply an impulse of energy to the rails of section 2—3T, one or the other of the track relays 3HTR or 3DTR (Fig. 1B) at the right-hand end of the section picks up, depending on the polarity of the impulse of energy. The polarity of the energy supplied to the rails at the west end of section 2—3T is governed by relay 1DPR so that energy of reverse or normal polarity is supplied to the rails of section 2—3T according as relay 1DPR is released or is picked up. The relay 1DPR is normally released, and is picked up when and only when the signal 1S is conditioned to display its green or clear indication. The signal 1S is normally dark and its winding is normally deenergized so that this signal, if lighted, would display its red or stop indication. As hereinafter explained, the winding of signal 1S is energized when the single track stretch between sidings I and II is occupied, and will display its green or clear indication if the main track portion beside the siding I is unoccupied, and if, in addition, the head block signal governing entrance of traffic into the single track stretch at the left of siding I is conditioned to display its clear indication.

As the signal repeater relay 1DPR is normally released, energy of reverse polarity is normally supplied to the rails of section 2—3T from battery 2TB. At these times the positive terminal of the battery is connected to the upper track rail 1. At the east or right-hand end of section 2—3T, the track relays 3HTR and 3DTR are normally connected in series across the section rails over front contacts 50 and 51 of a transmitter repeater relay 3CPR which is energized over back contact 52 of a transmitter relay 3CR, which relay is controlled over front contact 86 of the track relay A3ETR for the adjoining track section A3T. The track relays 3HTR and 3DTR are of the polar biased type, and each has a normally released contact which is picked up when and only when energy flows through the relay winding in a selected direction as indicated by the arrow on the relay winding. The relays 3HTR and 3DTR are connected with the track rails so that relay 3HTR picks up when positive energy flows from rail 1 to rail 2, and relay 3DTR picks up when positive energy flows from rail 2 to rail 1.

When relay 3HTR picks up, energy is supplied over its front contact 53 to a code following track repeater relay 3HTP and its contacts are picked up to cause energy to be supplied from battery A3WTB to the rails of section A3T. The negative terminal of the battery A3WTB is permanently connected to track rail 2, while at this time the positive terminal of the battery is connected through resistance 55 and the winding of an approach relay 3AR in multiple, and over front contact 56 of relay 3HTP and through the winding of the track relay A3ETR to track rail 1. In addition, at this time the winding of track relay A3ETR is short-circuited or shunted by contact 57 of relay 3HTP to reduce the resistance in the circuit for supplying energy from the battery to the track rails. This circuit is arranged as explained in Letters Patent of the United States No. 2,236,002, issued June 9, 1942, to Frank H. Nicholson for Railway Signaling System, and the energy supplied from the battery A3WTB flows through the winding of track relay A3ETR in the wrong direction to pick up the relay contacts and they remain released at this time. In addition, the circuit is arranged as explained in Letters Patent of the United States No. 2,176,605, issued October 17, 1939, to Herman G. Blosser for Approach Control Apparatus for Railway Signaling Systems, in that the various parts of the equipment are arranged and proportioned so that when section A3T is not occupied, too little energy is supplied from battery A3WTB through the winding of relay 3AR to pick up the relay contact 60 and it remains released. Contact 60 controls a slow release repeater relay 3AP which therefore remains released to interrupt the circuit of the winding of signal 3S and of the lamp of this signal.

The energy supplied from battery A3WTB to the rails of section A3T feeds over back contact 61 of track relay A4ETR to the track relay A3WTR which picks up its contact 62 to supply energy from battery A4WTB through the winding of track relay A4ETR to the rails of section A4T. The energy from battery A4WTB flows through the winding of relay A4ETR in the wrong direction to pick up the relay contact and it remains released and maintains the circuit of relay A3WTR.

The energy supplied from battery A4WTB feeds to the track relay A4WTR (Fig. 1C) over the circuit which includes back contacts 64 and 65 of a code following repeater 4HTP of the track relay 4HTR, and back contacts 66 and 67 of a code following repeater 4DTP of the track relay 4DTR. When relay A4WTR picks up, its contact 70 establishes the circuit for a transmitter relay 4CR and its contacts pick up so that contact 71 interrupts the circuit of its code following repeater relay 4CPR and establishes the circuit of a slow release track repeater relay A4TFPR. The relay A4TFPR has a condenser connected across its terminals so it is slow enough in releasing to remain picked up in the intervals between the picked-up periods of relay A4WTR even though relay A4WTR is only picked up for a short time during each three or four cycles of operation of the code transmitter 2CT. As relay A4TFPR is picked up, its contact 73 interrupts the circuits of a slow release back contact repeater relay 4TBPR and of two code detecting relays 4DR and 4HR, and contact 74 of relay A4TFPR interrupts one circuit for supplying energy to the lamp of signal 4S.

When relay 4CR picks up and relay 4CPR releases, energy is supplied from battery 4—5WTB to the rails of section 4—5T over the circuit which is traced from the positive terminal of the battery over front contact 76 of relay 4CR, and back contacts 77 and 78 of relay 4CPR in series to track rail 1, and from the other terminal of the battery to track rail 2. The energy supplied from battery 4—5WTB to the rails of section 4—5T feeds to track relay 5TR (Fig. 1D) over the circuit which is traced from track rail 1 through the winding of relay 5TR, and over back contacts 17*a* and 18*a* of relay 5CRA in series to track rail 2. This energy picks up the contacts of track relay 5TR so that contact 26*a* interrupts the circuits of relays 5CRA, 5CRB and 5CRC, while contact 80 of relay 5TR establishes the circuit of relay 5TFP.

It will be seen, therefore, that when the single track stretch is vacant and energy is supplied to the west end of the stretch, it is repeated through the successive track sections to the right-hand or east end of the stretch to pick up the track relay 5TR at that point.

After a short interval the supply of energy to the west end of the stretch is cut off and the rails of section 2—3T are short circuited. This results in release of relay 3HTR, and of relay 3HTP so that the supply of energy from battery A3WTB to the rails of section A3T is cut off. The relay 3HTP has a rectifier connected across its terminals to delay release of the relay slightly so that the impulses of energy supplied to section A3T are slightly prolonged to compensate for the pick-up times of relays 3HTR and 3HTP. When the supply of energy to section A3T is cut off, relay A3WTR releases and cuts off the supply of energy to section A4T and relay A4WTR releases, thereby releasing relay 4CR so that the supply of energy to section 4—5T is cut off.

When relay 4CR releases, its contact 76 interrupts the circuit of the battery 4—5WTB so the supply of energy to the track rails is interrupted. Also, when relay 4CR releases, its contact 71 establishes the circuit of relay 4CPR and it picks up so that its contacts 77 and 78 additionally interrupt the circuit of battery 4—5WTB and connect the track relays 4HTR and 4DTR across the track rails. Although the contacts of relay 4CPR pick up in a relatively short time after energy is supplied to the relay winding, they do not pick up instantaneously on release of relay 4CR. Accordingly, there is certain to be a short time interval between the instant at which the circuit of the track battery 4—5WTB is interrupted by contact 76 of relay 4CR, and the instant at which front contacts 77 and 78 of relay 4CPR are closed to connect relays 4DTR and 4HTR across the track rails. This time interval is long enough to insure that the impulse of energy induced in the track circuit on interruption of the circuit of the track battery will be dissipated before the track relays are connected across the track rails and thus prevents picking up of the track relays by this energy.

The arrangement just described for providing a time interval between interruption of the circuit of the track battery and connection of the track relays across the track rails to thereby prevent operation of the track relays by energy inductively discharged from the track circuit is not a part of this invention, and is shown and claimed in application for Letters Patent of the United States Serial No. 675,875 of Charles B. Shields, filed June 11, 1946, for Coded Track Circuits, which issued as Patent No. 2,458,746, on January 11, 1949.

The circuits at this location are also arranged so that overlapping of the front and back contacts of either or both of the relays 4CR and 4CPR will not result in improper supply of energy from the track battery 4—5WTB to either of the track relays 4DTR or 4HTR. The circuit arrangement by which this result is obtained is shown and claimed in application for Letters Patent of the United States Serial No. 678,026 of Charles W. Failor, filed June 20, 1946, for Coded Signaling Apparatus.

When the supply of energy from battery 4—5WTR is cut off, the track relay 5TR releases and its back contact 26*a* is closed so that energy is supplied to relay 5CRA when the contacts of the code transmitter 5CT are picked up. The circuit governed by contact 26*a* of relay 5TR is also controlled by front contact 25*a* of relay 6TR and by front contact 81 of relay 6SR so that energy is supplied over this circuit only if section 6T is vacant or is occupied by an eastbound train.

If traffic conditions are such that energy is supplied to the circuit governed by back contact 26*a* of relay 5TR, the relays 5CRA, 5CRB and 5CRC will operate as previously explained to cause an impulse of coordinated return code energy to be supplied from battery 5TB to the rails of section 4—5T. This energy impulse is of reverse or normal polarity according as the signal repeater relay 6DPR is released or is picked up. The relay 6DPR is controlled by entering signal 6S and is picked up when and only when the signal is conditioned to display its green or clear indication. The signal 6S, like the signal 1S, is normally dark and its winding is normally deenergized so that the signal, if lighted, would display its red or stop indication. The winding of signal 6S is energized when a code detecting relay 5TBP is released to show that the single track stretch is occupied, and when, in addition, the main track portion beside the siding II is vacant and the single track portion at the right of this siding is vacant.

The track stretch is assumed to be vacant so the relay 6DPR is released, as shown, and the energy impulses supplied from battery 5TB to the rails of section 4—5T are of reverse polarity and operate the track relay 4HTR but will not operate the track relay 4DTR. The relays 4HTR and 4DTR are of the polar biased type and each will respond to energy of one polarity only and the two relays are connected to the rails in such manner that they respond to energy of opposite polarity.

When relay 4HTR picks up, energy is supplied over its front contact 84 to relay 4HTP and it picks up so that its contacts 64 and 65 establish the circuit for suppling energy from battery A4ETB to the rails of section A4T. The battery is connected over front contact 65 of relay 4HTP through the winding of relay A4WTR in the wrong direction to pick up the relay contacts, while contact 64 of relay 4HTP short-circuits the winding of track relay A4WTR. A portion of the energy supplied from the battery A4ETB to the track rails is supplied through the winding of an approach relay 4AR, which controls a slow release repeater relay 4AP, but as long as section A4T is vacant too little energy is supplied through the winding of relay 4AR to pick up the relay contact 85 and energy is not supplied to relay 4AP and it remains released.

The energy supplied to the rails of section A4T feeds to relay A4ETR over back contacts 62 of relay A3WTR, and contact 61 of relay A4ETR picks up to cause energy to be supplied from battery A3ETB through the winding of relay A3WTR to the rails of section A3T. The energy supplied to the rails of section A3T feeds to relay A3ETR over back contacts of relays 3HTP and 3DTP, and contact 86 of relay A3ETR is picked up to energize relay 3CR. When relay 3CR picks up, its contact 52 interrupts the circuit of the relay 3CPR and after a short interval the relay 3CPR releases while during the picked-up period of relay 3CR energy is supplied over its front contact 52 the winding of a slow release track repeater to relay A3TFPR and it is maintained picked up to interupt the circuits of a slow release back contact repeater relay 3TBPR, and of two code detecting relays 3HR and 3DR, and to interupt one circuit for the lamp of signal 3S. After release of relay 3CPR energy is supplied from battery 2—3ETB to the rails of section 2—3T over the circuit which is traced from the positive terminal of the battery over front contact 87 of relay 3CR, and back contacts 51 and 50 of relay 3CPR in series to track rail 1, and from the other terminal of the battery to track rail 2. The energy supplied from battery 2—3ETB to the rails of section 2—3T feeds to track relay 2TR and picks up its contacts to energize a slow release repeater relay 2TFP, while contact 26 interrupts the circuits of relays 2CRA, 2CRB and 2CRC to release any of these relays which are picked up.

After a short time interval the equipment at the right-hand or east end of the single track stretch cuts off the supply of energy from battery 5TB to the rails of section 4—5T and relay 4HTR releases and interrupts the circuit of relay 4HTP. Accordingly, relay 4HTP releases and cuts off the supply of energy from battery A4ETB to the rails of section A4T, and relay A4ETR releases to cut off the supply of energy from battery A3ETB to the rails of section A3T. As a result relay A3ETR releases and its contact 86 interrupts the supply of energy to relay 3CR and it releases.

On release of relay 3CR its contact 87 interrupts the circuit of the battery 2—3ETB while contact 52 of relay 3CR interrupts the supply of energy to relay A3TFPR and establishes the circuit of relay 3CPR, and, after a short time interval, the contacts 50 and 51 of relay 3CPR are picked up to additionally interrupt the circuit of battery 2—3ETB and to connect relays 3HTR and 3DTR across the rails of section 2—3T. The relay 3CPR is of a type the contacts of which pick up promptly on the supply of energy to the relay winding, but even so there is a short time interval from the instant at which contact 87 of relay 3CR interrupts the circuit of battery 2—3ETB, and the instant at which the front contacts of relay 3CPR are closed to connect track relays 3HTR and 3DTR across the track rails. Because of the inductance of the track circuit an impulse of energy is discharged from the track circuit when the supply of energy from battery 2—3ETB is interrupted, and the time interval which elapses before relay 3CPR picks up causes this impulse to be dissipated before the track relays 3HTR and 3DTR are connected in the track circuit. This eliminates the possibility of improper operation of these track relays by energy inductively discharged from the track circuit.

When the supply of energy from battery 2—3ETB is cut off, the track relay 2TR releases so that its back contact 26 is closed, while its contact 89 interupts the supply of energy to relay 2TFP and establishes the circuit including front contact 90 of relay 2TFP for energizing the code detecting relay 2TBP. The relay 2TFP has a condenser connected across its terminals to make the relay slow enough in releasing to remain picked up in the intervals between picked-up periods of the relay 2TR. A condenser is connected across the terminals of relay 2TBP over a circuit including front contact 90 of relay 2TFP so the relay 2TBP remains picked up during the picked-up periods of relay 2TR, but releases promptly on release of relay 2TFP.

As previously explained, during the picked-up period of the track relay 2TR its contact 26 interrupts the circuits of the transmitter relays 2CRA, 2CRB and 2CRC, and all of these relays are released, while on release of relay 2TR and consequent closing of its back contact 26, energy may again be supplied to the relays 2CRA, 2CRB and 2CRC over the circuits governed by the contacts of the code transmitter 2CT so that an impulse of energy is supplied from the track battery 2TB and is repeated throughout the single track stretch.

As long as the single track stretch is vacant the operation just described is repeated, that is, an impulse of energy is supplied to the left-hand or west end of the stretch and is repeated throughout the stretch to the right-hand or east end where it picks up the track relay 5TR to energize the code detecting relays 5TFP and 5TBP and to cause an impulse of coordinated return code energy to be supplied to the right-hand or east end of the stretch promptly upon release of the track relay. The impulse of energy supplied to the east end of the stretch is repeated throughout the stretch to the west end where it picks up the track relay 2TR to energize the code detecting relays 2TFP and 2TBP and to cause an impulse of coordinated return code energy to be supplied to the west end of the stretch promptly upon release of the track relay.

The coded energy supplied through the stretch from west to east operates track relay A4WTR (Fig. 1C) to keep relay A4TFPR picked up to thereby deenergize the code detecting means associated with relays 4HTR and 4DTR and thus prevent consumption of energy by these relays. As these relays are deenergized the circuit of the winding of the signal 4S is interrupted so that it does not consume energy. In addition, a contact of relay A4TFPR interrupts one circuit for the lamp of signal 4S, while the other circuit of this lamp is interrupted by a contact of relay 4AP which is released since relay 4AR does not operate when section A4T is vacant.

Similarly, track relay A3ETR (Fig. 1B) is operated by energy supplied over the single track stretch from east to west and keeps relay A3TFPR picked up to deenergize the code detecting relays associated with relays 3HTR and 3DTR, while the winding of signal 3S and the lamp of this signal are deenergized and the energy consumed at this location is reduced to the minimum.

*Construction and operation of equipment for a siding section*

The construction and operation of the equipment for a siding section will now be considered. This can best be understood by arranging the drawings in the order, Fig. 1C, 1D, 1A and 1B, with Fig. 1C at the left so that the portions of the passing sidings I and II combine to form a complete siding section.

As the stretch is assumed to be vacant, track relay 6TR (Fig. 1D) is picked up, while at this time, as hereinafter explained, signal 5S is at stop so its repeater relay 5PCR is released and energy is supplied over front contact 95 of relay 6TR and back contact 96 of relay 5PCR to a stick repeater 6TPR of the track relay 6TR and it is picked up and its contact 97 shunts contact 96 of relay 5PCR, and provides a stick circuit to maintain relay 6TPR energized when relay 5PCR is picked up.

As the single track stretch at the left of the siding is vacant and track relay 5TR is operated by coded energy, relay 5TBP is picked up and its contact 98 interrupts the circuit of the winding of entering signal 6S so this signal does not consume energy, while the contacts operated by the signal mechanism interrupt the circuits of the signal repeater relays 6DPR and 6HPR and they are released. In addition, contact 100 of relay 5TBP interrupts the circuit of the multiple approach relay 6AR so that it is not operated by coded energy supplied from battery 5TB to the rails of section 4—5T. Relay 6AR governs a slow release repeater relay 6AFP and a code detecting relay 6ABP which relays are now released.

Under the conditions stated, terminal B of the source is connected over front contact 102 of relay 6TPR, back contact 103 of relay 5PCR, front contact 104 of relay 5TBP, and back contact 105 of relay 6ABP to line wire 106 leading to the entering signal (1S) at the other end of the siding. At this time, the other line wire 107 leading to the entering signal (1S) at the other end of the siding is connected over back contact 108 of relay 6ABP, front contact 109 of relay 5TBP, back contact 110 of relay 5PCR, front contact 111 of relay 6TPR, and winding of a series approach relay 5ALA to terminal C of the source, and also through the winding of a marginal series approach relay 5ALB and resistor 112 to terminal C. Although the windings of relays 5ALA and 5ALB are energized in parallel, these relays are identified herein as series relays for the reason that their windings are in series with the winding of the entering signal at the opposite end of the siding. The energy supplied to the wires 106 and 107 while relay 5PCR is released is of reverse polarity, and, if supplied to the winding of signal 1S, will cause the signal to display its yellow or caution indication.

The line wires 106 and 107, Fig. 1D, connect with similar wires 106A and 107A, Fig. 1A, so that energy may be supplied to the winding of signal 1S, but at this time the circuit of the signal winding is interrupted by contact 10 of relay 2TBP and energy is not supplied over the line wires and the series relays 5ALA and 5ALB are released. Accordingly, contact 114 of relay 5ALA interrupts the circuit controlled by front contacts 115 and 118 of relay 5TBP for supplying energy to the winding of signal 5S, while contact 116 of relay 5ALB interrupts one circuit for the lamp of signal 5S and connects the lamp to the circuit governed by back contact 117 of relay 6HPR and back contact 115 of relay 5TBP. The lamp of signal 5S, therefore, is not lighted at this time, while the lamp of signal 6S is not lighted since the circuit for energizing this lamp is open at contact 115 of relay 5TBP. Accordingly, the signals 5S and 6S are both dark, which is proper as the stretch is vacant and there is no reason for the signals to be lighted, and the signals, being dark, do not consume energy.

The approach control equipment at the right-hand end of the siding section is shown in Fig. 1A and operates in a similar manner. As the single track stretch at the right of the siding is vacant and track relay 2TR is operated by coded energy, the relay 2TBP is picked up and its contact 10 interrupts the circuit of the winding of signal 1S and the signal is deenergized so the contacts operated by the signal do not establish the circuits of signal repeater relays 1HPR and 1DPR and they are released. As relay 2TBP is picked up, its contact 120 interrupts the circuit of the multiple approach relay 1AR and it does not respond to coded energy supplied from battery 2TB to the rails of section 2—3T. Relay 1AR governs a slow release repeater relay 1AFP and a code detecting relay 1ABP which relays are now released.

As hereinafter explained, a series approach relay 2ALA is now released and its contact 121 interrupts the circuit of the winding of signal 2S so this signal is deenergized and does not consume energy, while contact G of the signal interrupts the circuit of a signal repeater relay 2PCR and it is released.

At this time energy is supplied over front contact 123 of track relay 1TR and back contact 124 of relay 2PCR to the winding of a stick repeater 1TPR of the track relay 1TR, and relay 1TPR is picked up so that its contact 126 shunts contact 124 of relay 2PCR and establishes a stick circuit to keep relay 1TPR picked up when relay 2PCR is picked up. As relay 1TPR is picked up, wires 106A and 107A are connected over its front contacts 128 and 129 to the wires leading to the winding of signal 1S, but at this time the circuit which includes these wires is interrupted by contact 10 of relay 2TBP.

Under the conditions outlined, terminal B of the battery is connected over front contact 130 of relay 1TPR, back contact 131 of relay 2PCR, front contact 132 of relay 2TBP, and back contact 133 of relay 1ABP to line wire 135 leading to the entering signal (6S) at the other end of the siding. The other line wire 137 leading to the entering signal (6S) is connected over back contact 139 of relay 1ABP, front contact 140 of relay 2TBP, back contact 141 of relay 2PCR, front contact 142 of relay 1TPR, and winding of relay 2ALA to terminal C, and also through the winding of a marginal series approach relay 2ALB and the resistor 143 to terminal C.

The line wires 135 and 137 connect with line wires 135A and 137A, Fig. 1D, which are connected over front contacts 145 and 146 of relay 6TPR to the wires leading to the winding of entering signal 6S, but at this time, the circuit of the signal winding is interrupted by contact 98 of relay 5TBP so energy is not supplied over the line wires to the signal 6S and the series relays 2ALA and 2ALB are released. The energy supplied to line wires 135 and 137 while relay 2PCR is released is of reverse polarity, and, if supplied to the winding of signal 6S, will cause the signal to display its yellow or caution indication.

As relay 2ALA is released, its contact 121 interrupts the circuit of the winding of signal 2S, as stated above, and as relay 2ALB is released, its contact 148 interrupts one circuit for supplying energy to the lamp of signal 2S and connects this lamp to the circuit governed by back contact 149 of relay 1HPR and back contact 150 of relay 2TBP. At this time relay 2TBP is picked up so energy is not supplied to the lamp of signal 2S, nor to the lamp of signal 1S.

The series approach relays 2ALA, 2ALB, 5ALA and 5ALB are employed to reduce the energy consumed by the siding section equipment. If the energy for operating the siding section equipment must be supplied from primary batteries the use of these series relays is highly desirable. However, if a passing siding is located where energy for the operation of the signal equipment is available at low cost, the series approach relays may be unnecessary, and they may be omitted without affecting this invention.

The arrangement and operation of the series approach relays 2ALA, 2ALB, 5ALA and 5ALB is not a part of this invention but is shown and claimed in the hereinbefore referred to application for Letters Patent of the United States, Serial No. 680,885 of Crawford E. Staples, filed July 2, 1946, for Approach Control Apparatus for Railroad Block Signaling Systems.

From the foregoing, it will be seen that when the track stretch is vacant, the windings of all of the signals are deenergized and all of the signal lamps are extinguished, while a substantial part of the recoding means is deenergized so the energy consumed by the system is held to a minimum. At this time the coded track circuit apparatus for the single track stretches operates to energize the code detecting relays 2TBP and 5TBP and thus provide at each end of the single track stretch an indication of the fact that that stretch is vacant.

*Operation of equipment on movement of an eastbound train through the stretch*

For purposes of illustration it will be assumed that the drawings are arranged in the order, Figs. 1C, 1D, 1A and 1B, with Fig. 1C at the left, so as to show a passing siding with single track stretches at both ends, and that an eastbound train is present in the single track stretch at the left of the passing siding.

When the eastbound train enters the single track stretch, the supply of coded energy at the entering end is cut off from the track rails in front of the train by the shunting effect of its wheels and axles.

At signal 4S, Fig. 1C, the track relay A4WTR ceases to follow coded energy and its contact 70 does not establish the circuit of relay 4CR so it remains released and its contact 71 interrupts the circuit of relay A4TFPR and establishes the circuit of relay 4CPR so that the contacts of relay 4CPR are continuously picked up and connect track relays 4HTR and 4DTR across the rails of section 4—5T. After a short time the relay A4TFPR releases and its back contact 73 is closed to permit energy to be supplied to relays 4TBPR, 4DR and 4HR.

At the east end of the stretch, the track relay 5TR remains released and after it has been released for a short time interval the relay 5TFP releases so that relay 5TBP releases promptly thereafter. When relay 5TBP releases, its contact 98 establishes the circuit of the winding of signal 6S so that energy is supplied to this winding over the circuit including the line wires 135A and 137A with the result that energy flows through the windings of the series approach relays 2ALA and 2ALB (Fig. 1A). The relay 2ALB has a resistor 143 in series therewith so less energy flows through the winding of this relay than through the winding of relay 2ALA. The equipment is arranged and proportioned so that the energy supplied through relays 2ALA and 2ALB and over the line circuit through the winding of signal 6S will pick up relay 2ALA but will not pick up relay 2ALB.

When relay 2ALA picks up, its front contact 121 in the circuit of the winding of signal 2S is closed, and as relay 2TBP is picked up, energy of normal polarity is supplied to the winding of this signal so the signal, if lighted, would display its green or clear indication. In addition, a contact of the signal mechanism establishes the circuit of its repeating relay 2PCR and its contacts pick up to maintain the supply of energy through relays 2ALA and 2ALB, while changing the energy supplied to wires 135 and 137 from reverse to normal polarity. This energy causes the signal 6S, when lighted, to display its green or clear indication, while a contact of the signal mechanism establishes the circuit of relay NDPR and its contacts pick up. Accordingly, contacts 20*a* and 21*a* of relay 6DPR reverse the connections of battery 5TB to the track rails so that the energy impulses supplied to the rails of section 4—5T are of normal polarity, that is, the positive terminal of the battery is connected to track rail 2, and these energy impulses pick up relay 4DTR but do not pick up relay 4HTR.

When relay 4DTR picks up, its contact 153 establishes the circuit of relay 4DTP and its contacts pick up with the result that contact 67 establishes a circuit for supplying energy from battery A4ETB to the rails of section A4T, while contact 66 short-circuits the winding of relay A4WTR. A portion of the energy supplied from the battery A4ETB to the rails of section A4T is supplied through the winding of relay 4AR, but as long as section A4T is vacant too little energy flows through the relay winding to pick up the relay contact and relay 4AP remains released and does not establish the circuit of the winding of signal 4S or of the signal lamp.

During the released periods of relay 4DTP, its contact 155 establishes the circuit including back contact 156 of relay 4HTP and back contact 73 of relay A4TFPR for energizing relay 4TBPR so that it is picked up, and during the picked-up periods of relay 4DTP energy is supplied over its front contact 155 and front contact 158 of relay 4TBPR to relay 4DR and its contacts are picked up to cause energy of normal polarity to be supplied to the winding of signal 4S when the contacts of relay 4AP are picked up.

As hereinafter explained the track relay 4DTR is operated by code pulses which are separated by long "off" periods. The relay 4TBPR is energized during the released periods of relay 4DTP and the circuit of relay 4TBPR is interrupted only during the relatively short picked-up periods of relay 4DTP so the rectifier snub is effective to maintain the contacts of relay 4TBPR picked up while the circuit of the relay winding is interrupted. On the other hand, the circuit of relay 4DR is established only during the relatively short picked-up periods of relay 4DTP and is interrupted during the relatively long released periods of the relay 4DTP. Accordingly, a condenser snub is provided for the relay 4DR to keep it picked up during coding operation of relay 4DTP.

As previously stated, as long as the single track stretch is occupied, the supply of coded energy over the rails of the stretch from left to right is cut off and the relay 5TR ceases to follow code and relay 5TFP releases. When relay 5TFP releases, its contact 45 interrupts the stick circuit for relay 5CRB so that this relay releases when code transmitter 5CT releases with relay 5CRA released, and the equipment operates to supply an impulse of energy from battery 5TB to the rails of section 4—5T once during each two cycles of operation of the code transmitter 5CT.

In addition, as relay 5TBP is released, its contacts 115 and 118 interrupt the circuit for supplying energy to the winding of signal 5S to insure that this signal displays it stop indication as long as the eastbound train is present in the single track stretch.

On release of relay 5TBP its contact 100 establishes the circuit of the multiple approach relay 6AR so that relay 6AR responds to the coded energy supplied to the rails of section 4—5T from battery 5TB. The relay 6AR is of the polar biased type and will respond only to energy of one polarity, but the relay winding is reversibly connected across the track rails by contacts of relay 6DPR so that the energy supplied to the winding of relay 6AR is always of the proper polarity to operate the relay. In response to the periodic operation of relay 6AR the relays 6AFP and 6ABP pick up and contact 159 of relay 6AFP interrupts the circuit of the lamp of signal 6S, while contacts 105 and 108 of relay 6ABP connect line wires 106 and 107 to the source to maintain the supply of energy of reverse polarity to these line wires even though relay 5TBP is released. This permits entering signal 1S to display a caution indication for a westbound train.

When the eastbound train under consideration enters section A4T and advances within a predetermined distance of signal 4S, such as 4000 feet, the energy supplied from battery A4ETB through the winding of relay 4AR is increased to such an extent that contact 85 of relay 4AR picks up and establishes the circuit of relay 4AP each time an impulse of energy is supplied to the rails of section A4T. The relay 4AP has a condenser connected across its terminals so the relay is slow enough in releasing to remain picked up in the intervals between picked-up periods of relay 4AR.

When relay 4AP picks up, its contact 160 establishes the circuit of the winding of signal 4S and energy of normal polarity is supplied to this signal over the circuit which includes back contact 161 of relay 4HR, front contact 162 of relay 4DR, front contact 160 of relay 4AP, winding of signal 4S, front contact 163 of relay 4DR, and back contact 164 of relay 4HR, so the signal is conditioned to display its green or clear indication. At this time energy is supplied to the lamp of signal 4S over the circuit established by front contact 166 of relay 4AP.

When relay 4DR is picked up, the circuits for supplying energy to the winding of signal 4S to cause it to display its green or clear indication include back contacts of relay 4HR. Accordingly, if, while signal 4S is displaying its clear indication, traffic conditions in advance change so that energy of reverse polarity is supplied to the rails of section 4—5T and operates track relay 4HTR to pick up relay 4HR, the supply of energy to the winding of signal 4S over the contacts of relay 4DR will be cut off immediately. Furthermore, on picking up of relay 4HR, there is supplied to the winding of signal 4S energy of the polarity effective to cause the signal 4S to display its yellow or caution indication. The change to the more restrictive indication by signal 4S, therefore, occurs promptly and is not dependent on release of the slow release relay 4DR.

When the train advances into section 4—5T, the relay 4DTR is shunted and remains released so that energy is no longer supplied to relay 4DTP and it remains released and energy is not supplied from battery A4ETB to the rails of section A4T, so that relay 4AR remains released and does not establish the circuit of relay 4AP. Accordingly, relay 4AP releases to interrupt the circuit of the winding of the signal 4S so the signal 4S displays its stop indication.

When relay 4DTP remains released, energy is not supplied to relay 4DR and it releases to additionally interrupt the circuit of the winding of signal 4S, while energy is supplied to the lamp of signal 4S over the circuit which includes back contact 161 of relay 4HR, back contact 162 of relay 4DR, and back contact 74 of relay A4TFPR, and the signal is lighted and displays its red or stop indication to warn a following train of occupancy of section 4—5T.

As the train advances in section 4—5T, the shunting effect of the wheels and axles of the vehicles of the train diverts energy from the multiple approach relay 6AR, and when the train is within a predetermined distance of the exit end of the section, the energy supplied to relay 6AR is reduced below the value effective to operate the relay. Accordingly, energy is no longer supplied to relays 6AFP and 6ABP and they release so that energy is supplied over back contact 115 of relay 5TBP and back contact 159 of relay 6AFP to the lamp of signal 6S and this lamp is lighted to cause the signal to display its green or clear indication.

On release of relay 6ABP its contact 105 disconnects wire 106 from terminal B of the source and connects this wire over back contact 104 of relay 5TBP, and front contact 168 of relay 6TPR to the connection which is open at contact 96 of relay 5PCR, while contact 108 of relay 6ABP disconnects wire 107 from terminal C of the source and connects it over back contact 109 of relay 5TBP to contact 169 of relay 5PCR which is openat this time. Accordingly, the connections for supplying the energy to line wires 106 and 107 are interrupted, and signal 1S, if lighted, will display its stop indication.

When the eastbound train under consideration passes signal 6S and enters section 6T, the track relay 6TR releases and its contact 95 interrupts the circuit of relay 6TPR so that it releases to additionally interrupt its stick circuit, while contact 95 of track relay 6TR establishes a circuit for the lamp of signal 5S to keep it lighted after the single track stretch is vacated and relay 5TBP picks up.

When relay 6TR releases, energy is supplied over contact 171, which is closed when and only when the switch at this end of the siding is in its normal position, back contact 172 of track relay 6TR, and front contact 173 of relay 6DPR to the winding of a directional stick relay 6SR, and its contacts pick up so that contact 175 provides a stick circuit to keep the relay picked up after release of relay 6DPR. The relay 6DPR is slow to release and its contact 173 maintains the pick-up circuit for relay 6SR long enough after release of relay 6TR to insure picking up of relay 6SR.

When relay 6SR picks up, its contact 81 establishes a circuit to supply energy to the transmitter relays 5CRA, 5CRB and 5CRC while contact 25a of relay 6TR is released. Accordingly, relays 5CRA, 5CRB and 5CRC continue to operate and to cause coded energy to be supplied to the rails of section 4—5T.

When relay 6TPR releases, its contacts 145 and 146 disconnect wires 135A and 137A from the winding of signal 6S and short-circuit these wires, that is, connects them together independently of the winding of signal 6S, with the result that signal 6S is deenergized and displays its stop indication and interrupts the circuit of relay 6DPR so that it releases to cause the coded energy supplied to the rails of section 4—5T to be of reverse polarity. In addition, when relay 6TPR releases, its contact 102 disconnects terminal B of the source from the connection from from which energy is supplied to line wires 106 and 107 to thereby insure that energy will not be supplied to signal 1S while section 6T is occupied. At this time, contacts 111 and 160 of relay 6TPR additionally interrupt the circuits for supplying energy to line wires 106 and 107, while back contact 102 establishes a circuit including a current limiting resistance for supplying energy locally to the series approach relays 5ALA and 5ALB, and both of these relays pick up so that energy is supplied over front contact 116 of relay 5ALB to the lamp of signal 5S, while contact 114 of relay 5ALA is closed to permit energy to be supplied to the winding of signal 5S when the single track stretch is vacated and relay 5TBP picks up.

When the line wires 135A and 137A are connected together by back contacts 145 and 146 of relay 6TPR there is an increase in the flow of energy over these wires because of the elimination of the resistance of the winding of the signal 6S, and the energy supplied over these wires picks up the marginal relay 2ALB as well as relay 2ALA. When relay 2ALB picks up, its contact 148 establishes a circuit for the lamp of signal 2S and this signal displays its green or clear indication.

As the rear of the train vacates the track sections in the single track stretch, the impulses of coded energy supplied at the west end of the single track stretch operate the track relays and cause coded energy to be repeated in the sections behind the train.

When section A4T is vacated, the track relay A4WTR is operated by coded energy and energizes relay 4CR so that relay A4TFPR picks up and its contact 74 interrupts the circuit of the lamp of signal 4S so that lamp is dark, which is proper, as there is no reason for it to be lighted. If a following train should enter the single track stretch before section 4—5T is vacated, the supply of coded energy over the rails of the track stretch from the west end would be cut off and relay A4TFPR would release to establish the circuit of the lamp of signal 4S so this signal would be lighted and would display its red or stop indication.

When the rear of the train clears section 4—5T, coded energy supplied to the rails of the stretch at the west end of the stretch feeds to the track relay 5TR and operates it to pick up relays 5TFP and 5TBP. At the time the single track stretch is vacated the equipment at the right-hand end is being operated to supply an impulse of energy to the stretch once during each two cycles of operation of code transmitter 5CT, while the equipment at the left-hand end of the stretch operates to supply an impulse of energy to the stretch once during each three cycles of operation of the code transmitter 2CT. Because of this difference in the rate of operation of the apparatus at opposite ends of the single track stretch, an impulse of energy will feed to the track relay 5TR promptly when the single track stretch is vacated and will operate relay 5TR to pick up relays 5TFP and 5TBP. When relay 5TFP picks up, its contact 45 is closed so that the code generating equipment at this end of the stretch thereafter operates to supply to the track rails impulses of coded energy which are coordinated with the impulses received over the track rails.

When relay 5TBP picks up, its contacts 115 and 118 establish the circuit for supplying energy to the winding of the signal 5S and this signal displays its green or clear indication to show that the single track stretch is unoccupied. As long as section 6T is occupied energy is supplied to the lamp of signal 5S over back contact 95 of relay 6TR, while energy is supplied over back contact 102 of relay 6TPR to relay 5ALA so its contact 114 is closed to establish the circuit of the winding of the signal 5S. This prompt clearing of the signal 5S permits prompt movement of a westbound train off from the siding into the single track stretch.

In addition, when relay 5TBP picks up, its contact 100 interrupts the circuit of the multiple approach relay 6AR and it remains released so relays 6AFP and 6ABP are released.

The coded energy supplied to the rails of section 4—5T is of reverse polarity as relay 6DPR is released, and operates relay 4HTR so that its repeater relay 4HTP operates to supply energy to the rails of section A4T and thus cause energy to be repeated to the other end of the single track stretch.

The operation of the equipment on continued movement of the eastbound train through the stretch is best understood by arranging the drawings in the following order, Figs. 1A, 1B, 1C and 1D, with Fig. 1A at the left.

When the eastbound train under consideration enters section 1T, Fig. 1A, the track relay 1TR releases and its back contact 178 is closed but energy is not supplied to relay the directional stick 1SR since signal 1S is at stop and relays 1HPR and 1DPR are released so that their contacts 180 and 181 in the pick-up circuits for relay 1SR are open. As relay 1SR remains released its contact in the circuits of the transmitter relays 2CRA, 2CRB and 2CRC is open, and on opening of contact 25 of relay 1TR the supply of energy to relays 2CRA, 2CRB and 2CRC is cut off and they cease to operate to supply energy to the rails of section 2—3T. Accordingly, the supply of energy over the rails of the single track stretch from left to right is cut off. At this time, the track relay at the east end of the single track stretch ceases to follow code and the associated code detecting relays release, as will be seen from Fig. 1D. This prevents clearing of the head block signal governing entrance of westbound traffic into the single track stretch, while the code generating equipment at the east end of the single track stretch continues to supply impulses of coded energy to the track rails, and these are repeated through the sections in the single track stretch to the west end of the stretch to operate relay 2TR and keep relays 2TFP and 2TBP picked up.

As previously explained, the coded energy supplied to an end of the stretch is repeated throughout the stretch by front contact coding cut-section apparatus. Accordingly, as soon as track relay 1TR releases to cut off the supply of coded energy to the left-hand end of the single track stretch, the equipment throughout the stretch immediately ceases to supply coded energy in the corresponding direction, and operation of the track relay at the opposite or right-hand end of the single track stretch ceases so that the release time of the associated code detecting means starts at once. As a result, after cutting off the supply of coded energy to one end of the single track stretch, there is a minimum of delay in the release of the code detecting means at the other end of the stretch, and the opposing head block signal is promptly held at stop.

When the supply of coded energy to the west end of section 2—3T is cut off, the relays 3HTR and 3DTR remain released with the result that relays 3HTP and 3DTP remain released and do not cause energy to be supplied to the rails of section A3T. At this time the energy supplied from the east end of the single track stretch operates relay A3ETR so that relay 3CR operates and keeps relay A3TFPR picked up and its contact 185 interrupts the circuits of the code detecting relays 3HR, 3DR and 3TBPR, while contact 186 of relay A3TFPR interrupts the circuit of the winding of signal 3S to thereby eliminate unnecessary consumption of energy by this equipment.

On release of relay 1TR its contact 123 interrupts the circuit of relay 1TPR and it releases so that its contacts 130, 142 and 182 prevent the supply of energy to line wires 135 and 137 leading to the signal 6S so this signal is certain to remain at stop. After release of relay 1TPR energy is supplied over its back contact 130 to relays 2ALA and 2ALB so that their contacts remain picked up and contact 121 of relay 2ALA maintains the circuit of the winding of signal 2S, and contact 148 of relay 2ALB establishes a circuit for the lamp of signal 2S. As relay 2TBP is picked up, energy is supplied to the winding of signal 2S and the signal displays its clear indication.

If the eastbound train now advances into section 2—3T, the track relay 2TR will remain released and relays 2TFP and 2TBP will release to put signal 2S to stop, and when signal 2S is at stop, the relay 2PCR releases.

As the train advances in the single track stretch, the equipment for the single track stretch operates as previously described and the description of the operation of this part of the equipment need not be repeated.

When the train vacates section 6T, track relay 6TR picks up and its contact 172 interrupts the circuit of relay 6SR so that it releases and its contact 81 interrupts the circuit which it controls for energizing the transmitter relays 5CRA, 5CRB and 5CRC, but these relays continue to operate by energy supplied over front contact 25*a* of relay 6TR so energy continues to be supplied to the rails of section 4—5T.

When relay 6TR picks up, its contact 95 interrupts one circuit for the lamp of signal 5S and establishes for relay 6TPR the pick-up circuit which includes back contact 96 of relay 5PCR or front contact 189 of relay 6SR so relay 6TPR picks up and its contact 97 establishes the relay stick circuit and interrupts the circuit of relay 6TE. In the period after picking up of relay 6TR and prior to picking up of relay 6TPR, energy is supplied over front contact 95 of relay 6TR and back contact 97 of relay 6TPR to the slow pick-up thermal time element relay 6TE. The relay 6TE is of a type the contacts of which require a short time interval, such as several seconds, to pick up, and if the contacts of relay 6TE pick up while relay 6TPR is released, energy will be supplied over front contact 95 of relay 6TR, and front contact 188 of relay 6TE to relay 6TPR so that its contacts pick up with the result that contact 97 establishes the relay stick circuit and interrupts the circuit of relay 6TE so that it releases. If, after picking up of relay 6TR, the relay 6TPR picks up by energy supplied over back contact 96 of relay 5PCR or front contact 189 of relay 6SR before relay 6TE picks up, contact 97 of relay 6TPR will interrupt the supply of energy to relay 6TE so as to limit consumption of energy by this relay to the minimum.

When relay 6TPR picks up, its contacts 145 and 146 cease to shunt the line wires 135A and 137A and connect these wires to the connections leading to the winding of signal 6S. In addition, when relay 6TPR picks up, its contact 102 interrupts the circuit which it governs for supplying energy to relays 5ALA and 5ALB, while front contacts 102 and 111 of relay 6TPR establish connections for supplying energy through the windings of relays 5ALA and 5ALB to the line wires 106 and 107. At this time the line wires 106A and 107A are short-circuited over back contacts 128 and 129 of relay 1TPR, and the energy supplied to these line wires in series with the relays 5ALA and 5ALB maintains them picked up, and contact 116 of relay 5ALB maintains the circuit for the lamp of signal 5S, and contact 114 of relay 5ALA maintains the circuit of the winding of signal 5S.

When the train vacates section 1T, track relay 1TR picks up and its contact 123 interrupts one circuit for the lamp of signal 2S, and establishes a pick-up circuit including back contact 124 of relay 2PCR for relay 1TPR and it picks up. When relay 1TR picks up, energy is supplied over its front contact 123 and back contact 126 of relay 1TPR to time element relay 1TE so that after a short time interval its contact 190 will pick up to provide a pick-up circuit for relay 1TPR if relay 1TPR is not already picked up by energy supplied over the circuit including back contact 124 of relay 2PCR. When relay 1TPR picks up, its contact 126 interrupts the circuit for relay 1TE and it releases, but at this time contact 126 of relay 1TPR establishes the stick circuit for relay 1TPR.

The supply of energy to the winding of signal 2S is governed by relay 2TBP which is slow in releasing as it is snubbed by a condenser. Accordingly, when a train enters section 2—3T the relay 2TBP does not release for a short time interval, such as several seconds, and maintains the supply of energy to the winding of signal 2S with the result that a contact of the signal maintains the circuit of relay 2PCR and its contacts are picked up to cause energy supplied to the line wires 135 and 137 leading to signal 6S to be of normal polarity.

When a short fast train or a light engine moves from section 1T into section 2—3T, the track relay 1TR may pick up before relay 2TBP releases, and if relay 1TPR were permitted to pick up as soon as relay 1TR picks up, it would result in improper display of a clear indication by signal 6S.

As long as relay 1TPR is released, the supply of energy to line wires 135 and 137 leading to signal 6S is cut off and the signal 6S displays its stop indication regardless of whether relay 2PCR is picked up or is released. If relay 1TPR should pick up before relay 2PCR releases, energy of normal polarity would be supplied to the line wires 135 and 137 and would cause the signal 6S to display its green or clear indication, which is improper. One pick-up circuit for relay 1TPR is governed by back contact 124 of relay 2PCR and if relay 1TPR is picked up by energy supplied over this circuit, the energy supplied to the line wires 135 and 137 is certain to be of reverse polarity, as the contacts of relay 2PCR are released, and will cause signal 6S to display its caution indication. Furthermore, when relay 2PCR is released, energy will not be supplied to line wires 135 and 137 unless relay 1ABP is picked up and this relay will be released at the time section 1T is vacated by the train advancing into section 2–3T.

The relay 1TE provides an alternative pick-up circuit for relay 1TPR, and to insure that relay 1TPR will not be picked up by energy supplied over contact 190 of relay 1TE before relay 2PCR releases, the pick-up time of relay 1TE is made long enough to make certain that relay 2PCR will release if it is going to do so. This prevents undesired momentary display of an improper indication by signal 6S which would occur if relay 1TPR picked up before relay 2PCR released. The relay 1TE provides means for picking up relay 1TPR in the event it releases because of irregular or unusual train movements, or for other reasons, such as opening of the switch 1W, and the relay 2PCR does not release. As hereinafter explained, the relay 1TE also provides means for picking up the relay 1TPR after a movement into the siding.

When relay 1TPR picks up, its front contacts 130, 142 and 182 are closed to prepare a circuit to supply energy to line wires 135 and 137, but as relays 1ABP and 2TBP are both released, this circuit is incomplete and energy is not supplied to the line wires 135 and 137, and signal 6S, therefore, will be held at stop. At this time the connection from line wire 135 to terminal B of the source is open at front contact 133 of relay 1ABP and also at front contact 132 of relay 2TBP, while the connection from line wire 137 to terminal C of the source is open at front contact 139 of relay 1ABP and also at front contact 193 of relay 2PCR.

When relay 1TPR picks up, its contact 130 interrupts the circuits of relays 2ALA and 2ALB and they release so that contact 121 of relay 2ALA interrupts the circuit of the winding of signal 2S, while contact 148 of relay 2ALB interrupts one circuit for supplying energy to the lamp of signal 2S and connects this lamp to the circuit governed by contact 149 of relay 1HPR and back contact 150 of relay 2TBP.

When relay 1TR picks up, its contact 25 establishes the circuits of relays 2CRA, 2CRB and 2CRC and these relays are operated by the code transmitter 2CT so that energy is supplied from battery 2TB to the rails of section 2—3T. However, because of the presence of the train in this section, this energy does not reach the exit end of the section and is not repeated to the sections farther in advance. In addition, because of the shunting action of the train in section 2—3T, the coded energy supplied to the section rails does not operate relay 1AR and the relays 1AFP and 1ABP remain released. Accordingly, energy is supplied over back contact 150 of relay 2TBP and back contact 191 of relay 1AFP to the lamp of signal 1S and this lamp is lighted.

At this time, as relay 2TBP is released, its contact 10 in the circuit of the winding of signal 1S is closed, and, as relay 1TPR is picked up, its contacts 128 and 129 connect line wires 106A and 107A to the winding of signal 1S and the signal displays its caution or its clear indication depending on the polarity of the energy supplied over the line wires.

When relay 1TPR picks up and connects the line wires 106A and 107A to the winding of signal 1S, and also discontinues short-circuiting of these line wires, the energy supplied over these wires keeps relay 5ALA picked up but will not keep relay 5ALB picked up. When relay 5ALB releases, its contact 116 interrupts one circuit for supplying energy to the lamp of signal 5S and transfers this lamp to the circuit governed by back contact 117 of relay 6HPR and back contact 115 of relay 5TBP. The relay 5TBP will be picked up unless the single track stretch is occupied so the lamp of signal 5S will be extinguished.

As relay 5ALA is picked up, its contact 114 establishes the circuit of the winding of signal 5S, assuming relay 5TBP to be picked up, and a contact of the signal mechanism establishes the circuit of relay 5PCR and it is picked up to cause the energy supplied over line wires 106 and 107 to signal 1S to be of normal polarity so signal 1S displays its green or clear indication.

If the signal 1S displays its caution indication, the relay 1HPR will be picked up and its contact 149 will interrupt the circuit of the lamp of signal 2S to prevent unnecessary lighting of this lamp at this time. If the signal 1S displays its clear indication, the relay 1DPR will be picked up and the relay 1HPR will be released so that the lamp of signal 2S is lighted although its lighting is not required.

When the train advances in section 2—3T so that the rear of the train is a considerable distance from the left-hand end of the section, the shunting effect of the train is reduced so much that relay 1AR responds to coded energy supplied to the track rails and relays 1AFP and 1ABP are picked up. When relay 1AFP picks up, its contact 191 interrupts the circuit of the lamp of signal 1S. When relay 1ABP picks up, its contacts 133 and 139 transfer line wires 135 and 137 to connections governed by relay 1TPR, but independent of relays 2TBP and 2PCR, so that energy of reverse polarity is supplied to these line wires to permit signal 6S to display its caution indication to a following train.

As long as the single track stretch is occupied so that relay 2TBP is released, the energy supplied to line wires 135 and 137 is of reverse polarity, and signal 6S will display its yellow or caution indication to approaching trains, but when the single track stretch is vacated and relay 2TBP picks up so that signal 2S may clear on the approach of a train, the energy supplied to the line wires 135 and 137 is changed to normal polarity upon the approach of a train and will cause signal 6S to display its green or clear indication.

When the train advances into section A3T, the track relay A3ETR is shunted and remains released while relay 3CR also remains released and relay A3TFPR releases and establishes a circuit for the lamp of signal 3S. However, as soon as the train vacates section 2—3T coded energy supplied over the section rails from left to right operates one of the track relays 3HTR or 3DTR to thereby operate one of the repeater relays 3HTP or 3DTP so that one of the relays 3HR or 3DR picks up to interrupt the circuit governed by relay A3TFPR for supplying energy to the lamp of signal 3S, while energy is supplied from battery A3WTB to the rails of section A3T. Because of the shunting action of the train in section A3T, the relay 3AR is operated and picks up relay 3AP to establish the circuits of the winding of signal 3S and of the signal lamp so this signal displays an appropriate indication.

When the train advances far enough in section A3T for the rear of the train to be located a considerable distance from signal 3S, the relay 3AR ceases to operate and relay 3AP releases to interrupt the circuits of the winding and of the lamp of signal 3S.

On continued movement of the train through the single track stretch, the equipment operates as described for the single track stretch on the left-hand side of the passing siding. When the single track stretch is vacated, the master code supplied at the left-hand end of the stretch feeds to the right-hand end of the stretch and conditions the equipment at that point to supply coordinated return code energy to the track rails. When coded energy supplied to the single track stretch at the right-hand end feeds to the left-hand end and operates track relay 2TR to pick up relay 2TBP, the circuit of the winding of signal 1S is interrupted and relay 5ALA releases to interrupt the circuit of the winding of signal 5S. This results in release of relay 5PCR so that the energy supplied to line wires 106 and 107 is changed from normal to reverse polarity.

*Operation of equipment as shown diagrammatically in Figs. 2A–2H of the drawings*

The operation of the equipment on movement of an eastbound train through the stretch is shown diagrammatically in Figs. 2A–2H, inclusive. In these diagrams the windings of the signals are deenergized unless designated as energized, while the lamps which are lighted under various traffic conditions are shown. The type of track circuit energy in the sections of the single track stretch is indicated, and the polarities shown are for the energy in the end sections. The polarity of the energy which is, or will be, supplied to the line circuits at the siding sections over the existing circuit connections is shown, while these diagrams also indicate when the line circuits are shunted or short-circuited. Although energy is indicated as being supplied to certain of the line circuits, it is to be understood that these circuits are normally deenergized and that energy flows therein when and only when the line wires are shunted or the circuit of the signal winding governed over the line circuit is established.

Referring to Fig. 2A it will be seen that when the stretch is vacant, the windings of all signals are deenergized, all signal lamps are dark, while impulses of coded energy are supplied over the rails of the single track stretches alternately in opposite directions, the coded energy supplied to the end sections of the single track stretches being of reverse polarity. At this time each line circuit is connected to a source so as to be supplied with energy of reverse polarity, but no current flows in the line circuits since they are incomplete, the connections to the signal windings being interrupted. In addition, the code detecting apparatus, the operation of which is not essential at this time, is deenergized so the energy consumed by the system as a whole is held to the minimum.

Referring to Fig. 2B, when an eastbound train occupies the track section 1T at the east or right-hand end of the passing siding I, the supply of coded energy to the adjacent end of the adjoining single track stretch is cut off, thereby holding at stop the head block signal 5S governing entrance of traffic into the other end of the single track stretch and also lighting the lamp of this signal so that westbound trains will not enter the single track stretch. At this time the operation of the code supplying means at the east end of the stretch between sidings I and II is changed from a coordinated return code basis to a master code basis, and this coded energy maintains the display of the clear indication by the signal 2S at the entrance to the stretch.

In addition, when the supply of coded energy to the west end of the stretch between sidings I and II is cut off, the circuit of the winding of the entering signal 6S at the entrance end of the siding II is established and energy supplied to this winding over the associated line circuit picks up the series approach relay ALA at the other end of the passing siding II to close the contact of this relay in the circuit of the winding of the head block signal 8S governing entrance of eastbound traffic into the single track stretch in advance of the siding II. If this single track stretch is not occupied, and if, in addition, section 12T in the main track beside the passing siding III in advance is vacant, or is occupied by an eastbound train, coded energy will be supplied to this single track stretch at the east end and will cause the code detecting means at the west end of the stretch to energize the winding of the head block signal 8S at that point. If signal 8S clears, the energy supplied to the line circuit leading to the entering signal 6S at the other end of the siding is changed from reverse to normal polarity to cause the entering signal 6S at the entrance to the siding section to display its clear indication, while the polarity of the coded energy supplied to the right-hand end of the single track stretch between sidings I and II is changed from reverse to normal to cause the distant signal 4S to display its clear indication on the approach of a train.

On cutting off of the supply of coded energy to the west end of the single track stretch between sidings I and II, the code detecting means at the east end of the stretch interrupts one set of connections for supplying energy of reverse polarity to the line wires leading to the entering signal 7S at the other end of the siding. However, at this time the code detecting means governed by the multiple approach relay 6AR which is operated by coded energy supplied to the east end of the single track stretch establishes another set of connections for supplying energy of reverse polarity to these line wires and thus permits the signal 7S to display its caution indication on the approach of a westbound train.

The distant signal 4S is deenergized and the signal lamp is extinguished until the train approaches the signal, as shown in Fig. 2C, while the signal is deenergized and the lamp is again extinguished when the train advances beyond the signal, as shown in Fig. 2D.

When the train advances far enough for the rear end thereof to be located a substantial distance from the entrance end of the stretch, the multiple approach relay at the left-hand end of the stretch operates and the code detecting means governed thereby is energized to establish connections for supplying energy of reverse polarity to the line wires 135 and 137 leading to the entering signal, not shown, at the west end of siding I so that this signal will display its yellow or caution indication for a following train.

In addition, as shown in Fig. 2D, when the train passes the distant signal 4S and advances within a predetermined distance of the entering signal 6S for the passing siding II, the multiple approach relay at this end of the single track stretch ceases to operate and the code detecting relays associated therewith complete the circuit of the lamp of the entering signal 6S and interrupt the connections for supplying energy to the line wires 106 and 107 leading to the entering signal 7S at the other end of the siding. This prevents the display of a permissive indication by signal 7S and insures that it will display its stop indication on the approach of a westbound train.

When the train passes the entering signal 6S and enters section 6T beside the siding II, as shown in Fig. 2E, the connections for supplying energy to the line wires 106 and 107 leading to the entering signal 7S at the other end of the siding are additionally interrupted to insure that this signal remains at stop, while the line wires 135 and 137 leading from the east end of the siding section are shunted so that both series relays at this location are picked up. This maintains the circuit of the winding of the head block signal 8S at this point and establishes a circuit for the signal lamp.

When the single track stretch between sidings I and II is vacated, the code supply apparatus at the east end of this single track stretch ceases to operate on a master code basis and operates on the coordinated return code basis to supply impulses of energy to the rails of the track stretch. After the single track stretch is vacated, the coded energy supplied to the east end of the stretch feeds to the track relay at the west end of the stretch and energizes the decoding means associated therewith. This cuts off operation of the multiple approach relay at that point so the code detecting means associated with this relay releases and interrupts one set of connections for supplying energy of reverse polarity to the line wires 135 and 137 leading to the entering signal at the other end of the siding I, but at this time the code detecting means governed by the track relay establishes another set of connections for supplying energy of reverse polarity to these line wires. In addition, the decoding means associated with the track relay prepares the circuit for energizing the winding of the head block signal 2S, but this circuit is incomplete until a train approaches, in which event the decoding means causes the signal to display its clear indication with the result that the energy supplied to the line wires leading to the entering signal at the other end of the siding is changed from reverse to normal polarity.

Referring to Fig. 2F it will be seen that when the train advances into section 7T of the main track adjacent the east end of the passing siding II, the supply of coded energy to the west end of the single track stretch leading to siding III is cut off, the lamp of the head block signal 8S is maintained lighted, the supply of energy to the line wires 135 and 137 leading to the entering signal 6S at the west end of siding II is cut off, and the line wires 106 and 107 leading to the entering signal 7S at the east end of siding II are shunted. When the train vacates section 6T of the main track at the west end of the siding II, connections are established to supply energy to the line wires 106 and 107 leading to the entering signal 7S at the east end of the siding, but this energy does not reach the signal winding since these line wires are shunted. However, the energy supplied to the line wires picks up both series relays at the west end of the siding to establish the circuit of the winding of the head block signal 5S at that point and to establish the circuit of the signal lamp, while clearing of the signal 5S causes the energy supplied to the line wires 106 and 107 to be of normal polarity.

If a following train now leaves the passing siding I and enters the single track stretch leading to siding II, the coded energy supplied at the east end of the single track stretch will continue to be of reverse polarity since the entering signal 6S for the siding II remains at stop. Accordingly, when this following train approaches the distant signal 4S, it will receive a yellow or caution indication.

The coded energy supplied to the east end of the single track stretch between sidings I and II will also be of reverse polarity if the entering signal 6S is at caution. The coded energy supplied to the east end of the single track stretch is of normal polarity only if the entering signal 6S is clear, and it will be clear only if the single track stretch in advance of the siding II is unoccupied and if, in addition, the west portion of the main track beside the passing siding III in advance is unoccupied or is occupied by an eastbound train.

Continuing with the operation of the equipment during movement of the eastbound train through the stretch, it will be seen from Figs. 2F and 2G that, when the train under consideration occupies section 7T and after it advances into the single track stretch between sidings II and III, the supply of coded energy from left to right over the rails of the single track stretch is cut off so the code detecting relays at the right-hand end of the single track stretch release to cause the code supply apparatus at that point to supply master code energy to the track rails. In addition, the circuit of the winding of the entering signal 12S is established so one of the series relays at the other end of the siding III is picked up to close its contact in the circuit of the winding of the head block signal at that point, and, if that head block signal clears, energy of normal polarity is supplied to the winding of the entering signal 12S with the result that this signal, when lighted, displays its clear indication, while the coded energy supplied to the single track stretch is changed from reverse to normal polarity. In addition, at this time the lamp of signal 11S is lighted and this signal is held at stop, while the multiple code following approach relay at this location operates to provide connections for supplying energy of reverse polarity to the line wires 106 and 107 leading to the entering signal at the other end of siding III.

As the code detecting means at the west end of the single track stretch between sidings II and III is deenergized after the train enters this track stretch, the circuit of the winding of entering signal 7S is established provided section 7T is vacated, so one of the series relays at the other end is picked up and closes its contact in the circuit of the winding of signal 5S. If signal 5S clears, the energy supplied to the line wires 106 and 107 leading to entering signal 7S is of normal polarity so signal 7S, if lighted, will display its clear indication, while the coded energy supplied to the single track stretch is caused to be of normal polarity.

As the train continues through the track stretch the equipment operates as described for movement of the train through the single track stretch between sidings I and II, and into the main track beside the siding II, and a detailed explanation of the operation of the equipment is not required.

As shown in Fig. 2H, when the train clears the single track stretch between sidings II and III, the track circuit apparatus for this stretch operates so that coordinated return code energy is supplied to the right-hand end of the stretch and is repeated through the stretch to deenergize the winding of signal 7S, thereby releasing the series relay at the other end of the siding II to deenergize the winding of signal 5S and thus change the energy supplied to the line wires 106 and 107 leading to signal 7S from normal to reverse polarity, while, at this time the coded energy supplied to the single track stretch at the right of siding II is changed to reverse polarity.

When the code detecting means at the left-hand end of the single track stretch between sidings II and III picks up, it prepares the circuit of the winding of signal 8S so that on the approach of an eastbound train this signal will clear and energy of normal polarity will be supplied over the line wires 135 and 137 to signal 6S and this signal will cause the coded energy supplied to the single track stretch to be of normal polarity so that distant signal 4S will provide its clear indication.

*Operation of equipment on movement of a westbound train through the stretch*

On movement of a westbound train through the track stretch, the equipment operates in a similar manner as during movement of an eastbound train through the stretch, and Figs. 3A–3H, inclusive, are diagrams showing the effect of movement of a westbound train through the stretch.

Fig. 3A is similar to Fig. 2A and shows the condition of the equipment when the stretch is vacant. At this time master and coordinated return codes are supplied over the rails of the single track stretches, while connections are established to supply energy of reverse polarity to the various line circuits. In addition, at this time the circuits of the signal windings are interrupted and the signal lamps are dark.

When a westbound train occupies section 12T in the main track beside siding III, as shown in Fig. 3B, the track relay for this section releases and interrupts the circuits of the associated code generating relays so that the supply of coded energy to the right-hand or east end of the single track stretch between sidings II and III is cut off, thereby causing release of the code detecting relays at the other or left-hand end of the stretch and energizing the winding of entering signal 7S with the result that a series relay at the west end of siding II picks up to establish the circuit of the winding of signal 5S. When this winding is energized, the polarity of the energy supplied to the line wires 106 and 107 leading to signal 7S is changed from reverse to normal so this signal, when lighted, displays its green or clear indication, while the coded energy supplied to the single track stretch between sidings II and III is changed from reverse to normal polarity. The coded energy supplied over the rails of the single track stretch causes the winding of signal 11S to be energized so the signal displays its green or clear indication, while energy is supplied to the lamp of signal 11S over the circuit established by a back contact of the track relay for section 12T.

When the supply of coded energy to the right-hand end of the single track stretch between sidings II and III is cut off, the operation of the equipment at the distant signals 9S and 10S is similar to that which occurs when the supply of coded energy to the left-hand end of a stretch is cut off. The operation of the equipment at such times was explained in detail above in connection with movement of an eastbound train through the single track stretch between sidings I and II and need not be repeated. It is sufficient to state that the equipment at signal 9S prepares the circuit for supplying energy to the winding of this signal on the approach of a train but does not light the signal lamp, while at signal 10S the circuits of the signal winding and of the signal lamp are interrupted.

Referring to Fig. 3C, it will be seen that when the train vacates the siding section 12T, the code supply apparatus at the right-hand end of the single track stretch between sidings II and III operates to supply master code energy of normal polarity to the single track stretch, while, when the train advances to within a predetermined distance of distant signal 9S, the circuit of the signal winding is completed and this signal is lighted and will display its green or clear indication.

As shown in Fig. 3D, when the train passes the distant signal 9S and advances toward the entering signal 7S, the circuit of the lamp of this signal is established, while the supply of energy to the line wires 135 and 137 leading to signal 6S is cut off to insure that this signal remains at stop, and to also insure that the coded energy supplied to the right-hand end of the single track stretch between sidings I and II is of reverse polarity so the distant signal 4S can display only its caution indication.

When the train enters the siding section 7T, as shown in Fig. 3E, the line wires 106 and 107 leading to entering signal 7S are shunted with the result that both series relays associated with this line circuit are picked up to maintain the circuit of the winding of the signal 5S and to also establish the circuit of the signal lamp. When the train clears the single track stretch between sidings II and III, coded energy supplied to the left-hand end of this track stretch feeds to the right-hand end of the stretch and operates the track relay at that point to energize the associated code detecting means and thereby deenergize the winding of signal 12S. At this time the code generating equipment for the single track stretch between sidings II and III is converted from operation on a master code basis to operation on a coordinated return code basis. During occupancy of section 7T, the lamp of signal 8S is lighted by energy supplied over the circuit established by a contact of the track relay for the section.

As shown in Fig. 3F, when the train advances into section 6T, the supply of coded energy to the east end of the single track stretch between sidings I and II is cut off by release of the track relay for section 6T, while the supply of energy to the line wires 106 and 107 leading to signal 7S is also cut off, thereby insuring that this signal displays its stop indication and that the coded energy supplied to the west end of the track stretch between sidings II and III will be of reverse polarity. In addition, when section 6T is occupied, the line wires 135 and 137 leading to signal 6S are shunted with the result that when section 7T is vacated and relay 1TPR picks up to establish the circuit for supplying energy to line wires 135 and 137 the series relays at the right-hand end of these wires are picked up to establish the circuits of the winding of the signal 8S and of the signal lamp.

When the supply of coded energy to the right-hand end of the single track stretch between sidings I and II is cut off, the code detecting relays at the left-hand end of this stretch release and establish the circuit of the winding of signal 1S, and one of the series relays at the other end of the line wires 106 and 107 associated with this signal picks up to establish the circuit of the winding of the head block signal and thus cause the energy supplied to the winding of signal 1S to be of normal polarity. This causes the coded energy supplied to the single track stretch between sidings I and II to be of normal polarity so the distant signal 3S will display its green or clear indication to an approaching train.

Referring to Fig. 3G it will be seen that when the train advances into the single track stretch between sidings I and II, the reception of coded energy over the rails of the single track stretch is prevented so that the code detecting relays at both ends of the stretch are released and interrupt the the circuits of the windings of the signals 5S and 2S and also establish circuits for lighting the lamps of these signals.

When the train vacates section 6T, the track relay for this section picks up so that coded energy is supplied to the right-hand end of the single track stretch between sidings I and II, and this energy is of normal polarity since the winding of signal 6S is energized and prepares the signal, when lighted, to display its green or clear indication. In addition, as soon as the train advances a short distance in the single track stretch, the code detecting relays associated with the multiple approach relay at the right-hand end of the single track stretch establish connections for supplying energy of reverse polarity to the line wires 106 and 107 leading to signal 7S so that this signal will display its yellow or caution indication to an approaching train. As signal 7S will display tis caution indication to an approaching train, the coded energy supplied to the left-hand end of the single track stretch between sidings II and III continues to be of reverse polarity and will cause the distant signal 9S to display its yellow or caution indication to an approaching train.

When the train advances into section 1T and vacates the single track stretch between sidings I and II, as shown in Fig. 3H, the line wires 106 and 107 leading to signal 1S are shunted so the winding of signal 1S is deenergized and this signal is certain to display its stop indication to a following train. In addition, as a result of shunting of these line wires the circuit of the winding of the head block signal at the west end of siding I is established while energy is supplied to the lamp of that signal. When section 1T is occupied, the supply of energy to the line wires 135 and 137 leading to the entering signal at the left-hand end of siding I is cut off to hold this signal at stop.

When the train vacates the single track stretch between sidings I and II, coded energy supplied to the left-hand end of the stretch feeds over the rails of the stretch to the right-hand end to operate the track relay at that point so the code detecting relays are energized and interrupt the circuit of the winding of signal 6S and also interrupt the circuit governed by the multiple approach relay for lighting the lamp of this signal. In addition, energization of these code detecting relays causes the code supply apparatus at the right-hand end of the single track stretch to operate on the coordinated return code basis, while, on deenergization of the winding of signal 6S, the coded energy supplied to the single track stretch is changed to reverse polarity. When the circuit of the winding of signal 6S is interrupted, the series relay at the other end of the line circuit over which energy is supplied to signal 6S releases and interrupts the circuit of the winding of signal 8S and thus causes the connections for supplying energy to the line wires 135 and 137 leading to signal 6S to be changed so that energy of reverse polarity is supplied to these wires.

In addition, when the train vacates the single track stretch between sidings I and II, the code detecting relays at the left-hand end of the stretch are energized, thereby interrupting the circuit of the winding of signal 1S and also interrupting the circuit of the lamp of this signal. At this time energy is supplied to the lamp of signal 2S over the circuit established by a back contact of the track relay for section 1T, as well as over the circuit established by a contact of one of the series relays which are picked up by energy supplied over the circuit established by a back contact of the track relay repeater. In addition, as the series relays at this point are picked up, the circuit of the winding of signal 2S is established and this signal displays its green or clear indication.

On continued movement of the westbound train through the stretch the equipment operates substantially as described and further explanation of its operation is unnecesary.

*Operation of equipment when a train takes a siding*

Traffic in track stretches equipped with this signaling system is governed by train orders so that trains proceed to specified sidings to meet and pass trains moving in the opposite direction. Ordinarily the train which is to take siding will reach the meeting point and enter the siding so as to clear the main track before the train approaching in the opposite direction advances close enough to be affected by the train taking the sliding, but this will not always be the case.

Referring to Fig. 2D it will be seen that, when an eastbound train is approaching siding II, the entering signal 6S is lighted and displays its clear indication, assuming that there is no westbound train within the control limits for signal 6S. In addition, at this time the supply of energy to the line wires 106 and 107 leading to entering signal 7S is cut off to insure that this signal remains at stop and to also insure that the coded energy supplied to the left-hand end of the single track stretch between sidings II and III is of reverse polarity to thereby cause signal 9S to display its caution indication to an approaching train.

If this train is to take siding II, the train is stopped short of the end of the siding and one of the crew reverses the manually operated track switch 2W at the left-hand end of the siding. When this switch is reversed, a contact 200 (Fig. 1D) which is governed in accordance with the position of the switch, establishes a circuit shunting the track rails of section 6T so that the track relay 6TR releases and remains released as long as the switch is reversed. In addition, on this movement of this switch, contact 171, which is also governed in accordance with the position of switch 2W, interrupts the circuit of relay 6SR so that relay 6SR remains released on release of track relay 6TR. As relays 6TR and 6SR are both released, the circuits including back contact 26a of track relay 5TR (Fig. 1D) for supplying energy to the transmitter relays 5CRA, 5CRB and 5CRC are interrupted and these relays remain released and do not operate to supply coded energy to the single track stretch.

When track relay 6TR releases because of reversal of the switch, the track relay repeater 6TPR (Fig. 1D) releases and prevents the supply of energy to the line wires 106 and 107 leading to signal 7S so this signal is certain to remain at stop. Release of relay 6TPR also results in shunting of the line wires 135 and 137 leading to signal 6S so this signal displays its stop indication, while the series relays at the other end of this line circuit are picked up to establish the circuit of the winding of signal 8S and of the signal lamp. At this time the lamp of signal 5S is lighted by energy supplied over a back contact of track relay 6TR while the lamp of signal 6S is also lighted.

The switch having been reversed, the train may now advance into siding II, after which the switch may be restored to its normal position. When this is done, contact 200 interrupts the circuit shunting the rails of section 6T, and assuming that the train has cleared the fouling point, the track relay 6TR picks up and establishes the circuit of the repeater relay 6TPR so that it picks up.

When the train vacates section 4—5T, coded energy supplied over the rails of the single track feeds to track relay 5TR and operates it to pick up the associated code detecting relays, and relay 5TBP establishes the circuit of the winding of signal 5S so this signal shows clear and causes relay 5PCR to pick up. When relay 6TR picks up, the relay 6TPR is picked up by energy supplied over the circuit governed by the time element relay 6TE, while picking up of relay 6TPR results in release of relay 5ALA to interrupt the circuit of the winding of signal 5S so relay 5PCR releases. In addition, picking up of relay 6TPR interrupts the connections shunting the line wires 135 and 137 leading to signal 6S so the series relays at the other end of these line wires release. Furthermore, when relay 6TPR picks up, connections are established for supplying energy to the line wires 106 and 107 leading to signal 7S so that this signal may display its clear indication on the approach of a westbound train and will cause the coded energy supplied to the left-hand end of the single track stretch between sidings II and III to be of normal polarity so the signal 9S will display its clear indication.

The supply of coded energy to the right-hand end of the single track stretch between sidings I and II is cut off as long as track relay 6TR is released, and as long as coded energy is not supplied to this stretch the signal 2S is held at stop. When the track relay 6TR picks up, the circuits for relays 5CRA, 5CRB and 5CRC are established and these relays now operate to supply coordinated return code to the track stretch and this energy is repeated to the left-hand end of the stretch to permit signal 2S to display its clear indication. In addition, when coded energy is received at the west end of the single track stretch and the code detecting relays at that point are energized the circuit of the winding of signal 1S is interrupted, thereby releasing the series relay at the west end of siding I and thus deenergizing the head block signal at that point. Except for the presence of a train on siding II, the equipment is now in the condition shown in Fig. 2A.

*Operation of equipment when a train leaves a siding*

When the train on siding II is to leave the siding, the switch at the right-hand or east end of the siding is reversed by one of the train crew. When this is done, the rails of section 7T are shunted so the track relay and the repeater relay therefore release, while the directional stick relay SR at this point remains released. The equipment at this point is similar to that at the right-hand end of siding I and shown in Fig. 1A.

On release of the track relay and its repeater relay with the associated directional stick relay released, the system is substantially in the condition in which it is shown in Fig. 2F, in which section 7T is occupied, except for the fact that the train shown is assumed to be on the side track II. At this time the supply of coded energy to the left-hand end of the single track stretch between sidings II and III is cut off so the code detecting relays at the right-hand end of this stretch release to interrupt the circuit of the winding of signal 11S and insure that it remains at stop. In addition, the circuit of the winding of signal 12S is established, and, if traffic conditions in advance are such that signal 12S displays its clear indication, the coded energy supplied to the right-hand end of the single track is changed to normal polarity so signal 10S will display its clear indication on the approach of a train. At this time a circuit is established for the lamp of signal 11S, while the code supply apparatus at this point now operates on a master code basis instead of a coordinated return code basis.

If traffic conditions are such that coded energy is supplied over the single track stretch between sidings II and III and is received at the west end of this stretch, the winding of signal 8S will be energized after reversal of the switch at this end of siding II, while the signal lamp will be lighted to cause the signal to display its clear indication. This shows that no train is approaching from the east and that traffic conditions in advance are such that it is safe for the train on the siding II to enter the single track stretch leading to siding III, while it is assumed that the train crew received authority from the dispatcher before reversing the switch, and therefore are certain that no train is approaching from the west, or that this condition is shown by recent passage of a westbound train.

After reversal of the switch and consequent release of the repeater for the track relay for section 7T the supply of energy to the line wires 135 and 137 leading to signal 6S is cut off to insure that on the approach of an eastbound train this signal will display its stop indication, and that the coded energy supplied to the single track stretch in the rear is of reverse polarity and will cause the distant signal 4S to display its caution indication.

When the train advances into the single track stretch, and vacates section 7T, and the switch is restored to its normal position, the track relay for section 7T and the repeater for this relay pick up, and the equipment assumes the condition in which it is shown in Fig. 2G. On continued movement of the train through the track stretch the equipment operates as previously described.

The equipment operates in a similar manner when a westbound train takes or leaves a siding and a detailed explanation of the operation of the equipment at such times is unnecessary.

*Operation of system when trains meet and pass at a siding*

Fig. 4A shows the condition of the equipment when an eastbound train occupies section 1T beside siding I and a westbound train occupies section 12T beside siding III.

Figure 1A:
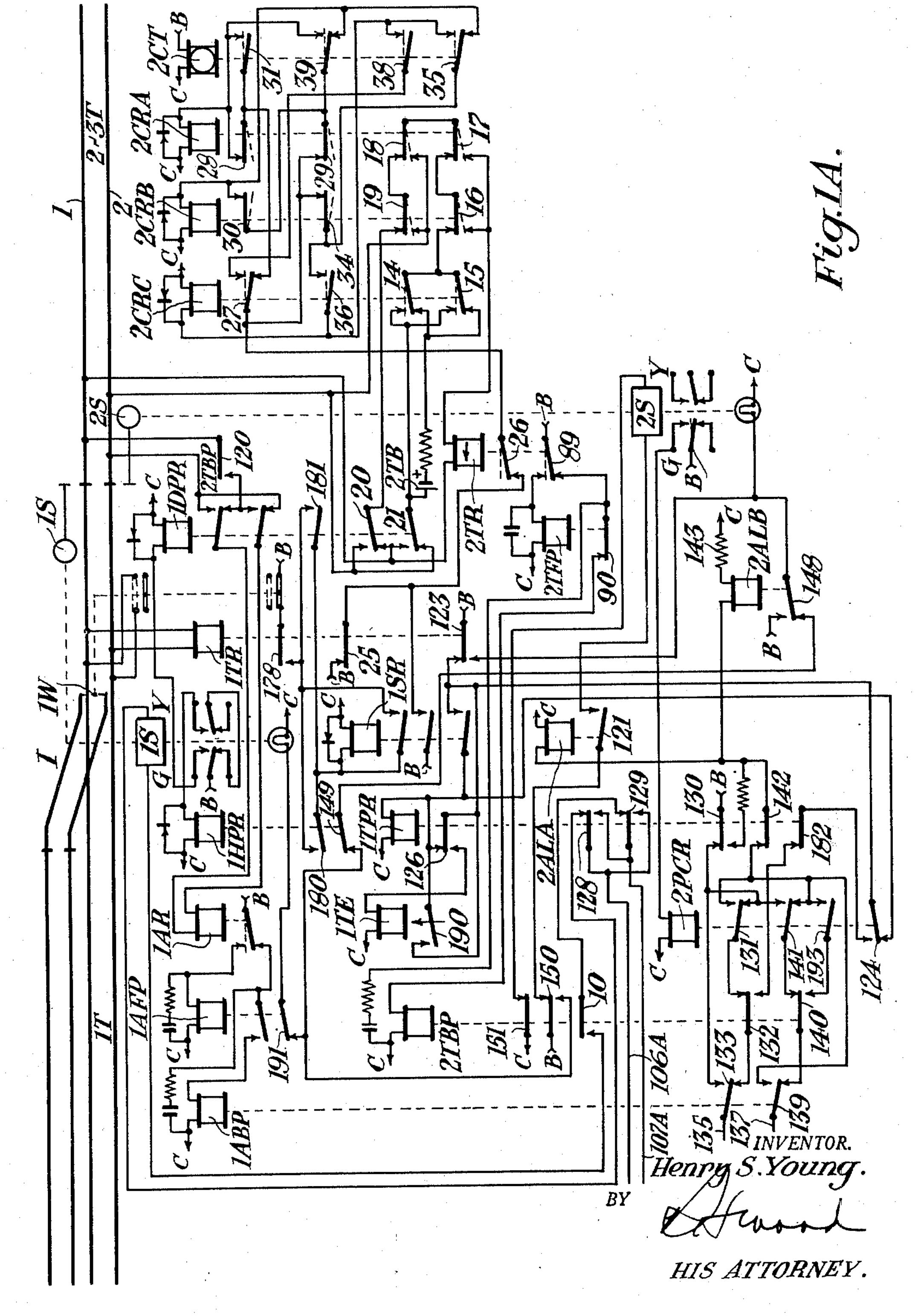
Figure 1B:
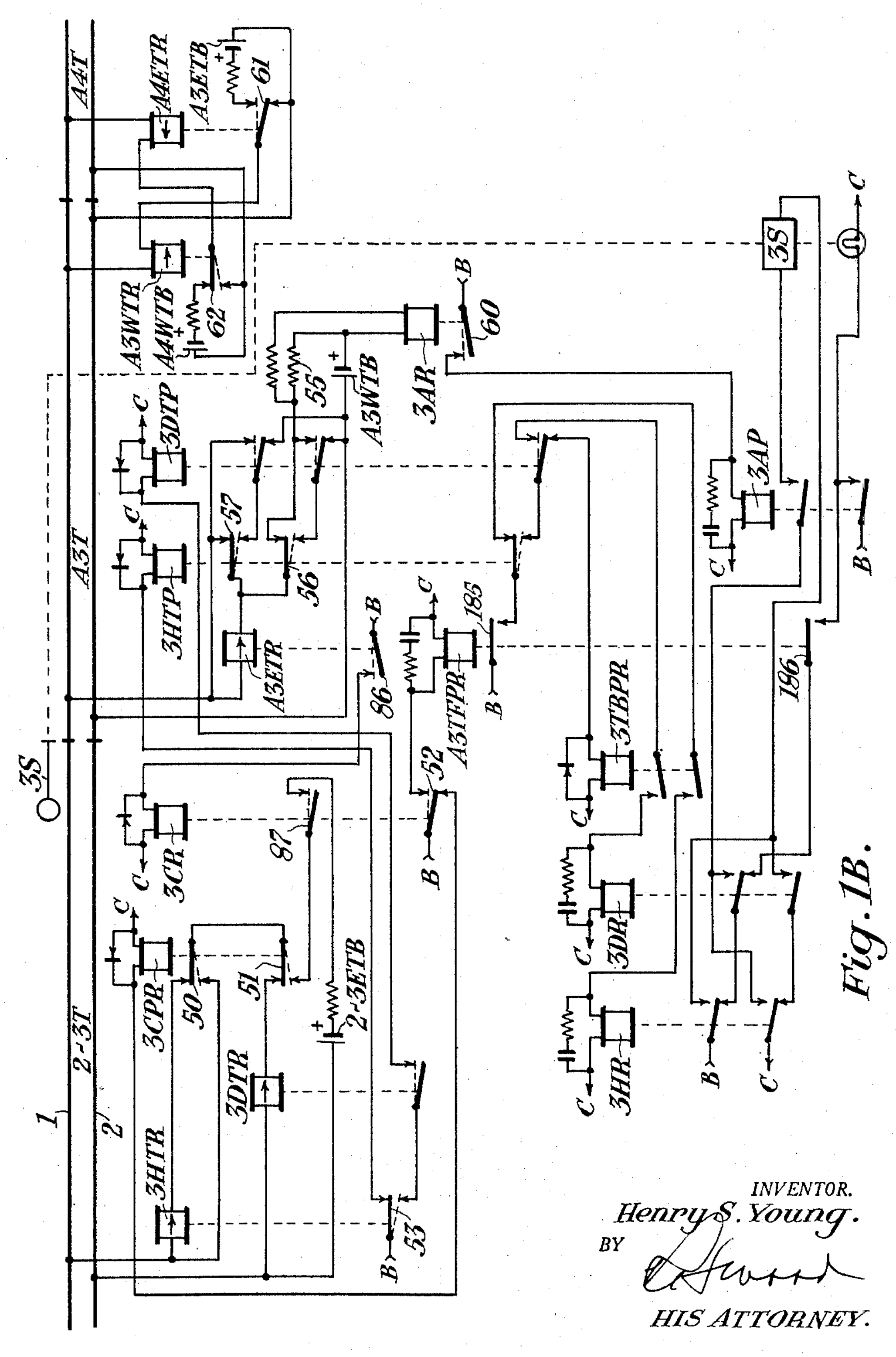
Figure 1C:
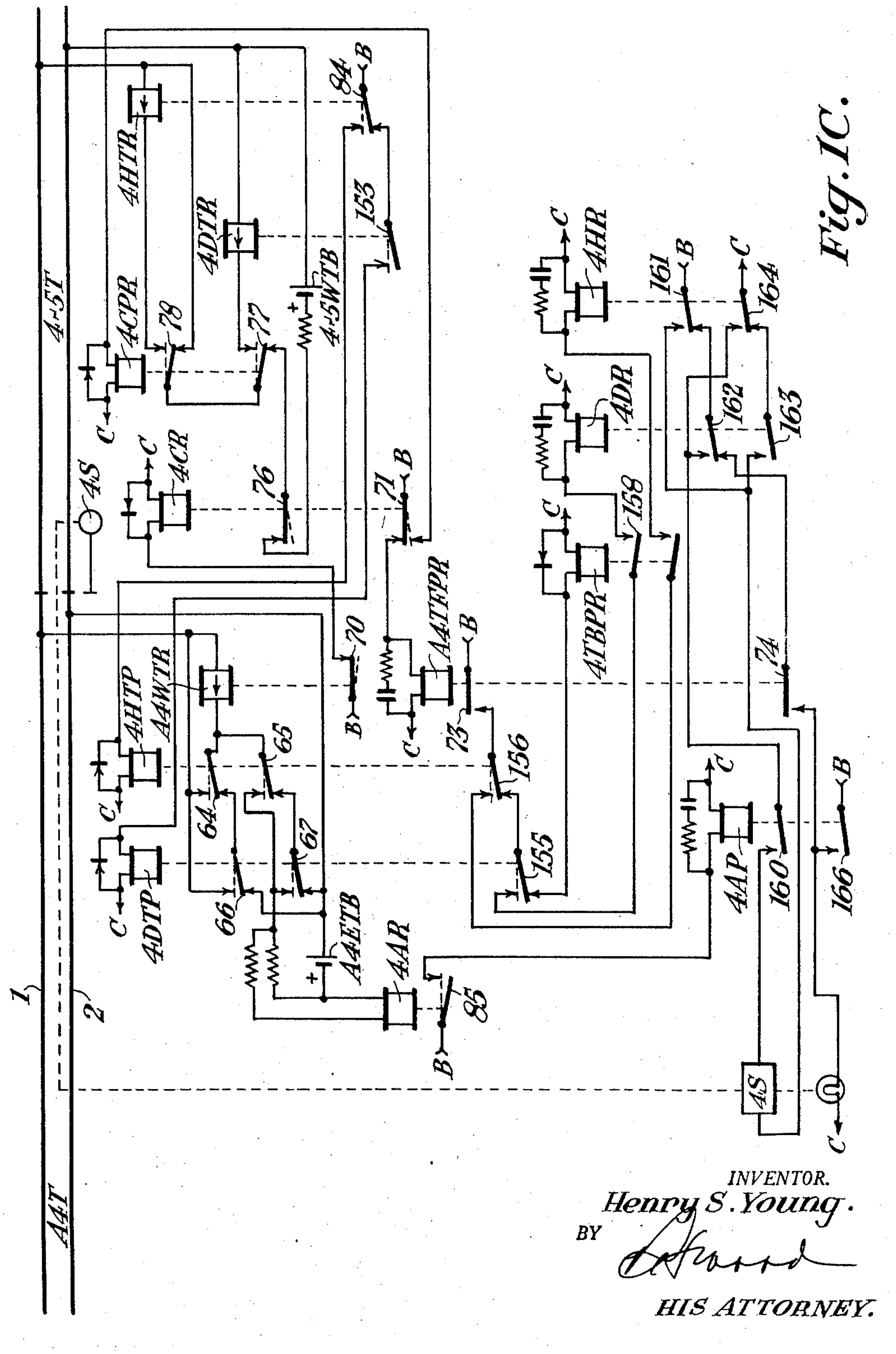

As section 1T is occupied, the track relay for the section is released and causes the series relays at this located to be picked up to establish the circuit of the winding of signal 2S and to light the signal lamp. At this time the code detecting relays at this location are picked up as a result of coded energy transmitted over the rails of the single track stretch, and the circuit of the winding of signal 2S is complete and this signal displays its green or clear indication and authorizes the eastbound train to proceed into the single track stretch.

Occupancy of section 1T by the eastbound train cuts off the supply of coded energy to the west end of the single track stretch between sidings I and II with the result that the code detecting relays at the east end of this stretch are released so the code supply apparatus at that point operates on a master code basis instead of on the coordinated return code basis. In addition, release of these code detecting relays establishes the circuit of the winding of signal 6S with the result that one of the series relays at the right-hand end of the line wires 135 and 137 associated with signal 6S picks up to prepare the circuit for the winding of signal 8S. However, the winding of this signal remains deenergized because of the presence of the westbound train in section 12T, and the energy supplied to the line circuit leading to signal 6S continues to be of reverse polarity and this signal, when lighted, displays its caution indication, while the coded energy supplied to the single track stretch between sidings I and II is of reverse polarity so that the distant signal 4S, when lighted, displays its caution indication. At this time, because of release of the code detecting relays at the east end of the single track stretch between sidings I and II, the circuit of the winding of signal 5S is interrupted to insure that this signal remains at stop, while one set of connections for supplying energy to the line wires 106 and 107 leading to signal 7S are interrupted, but the multiple approach relay at the right-hand end of the single track stretch between sidings I and II operates and the associated code detecting relays establish another set of connections for supplying energy of reverse polarity to these line wires so the signal 7S, when lighted, will display its caution indication.

Similarly, occupancy of section 12T by the westbound train establishes the circuit of the winding of signal 11S and of the signal lamp, while energy is supplied to this signal winding because the code detecting relays at this location are energized as a result of the supply of coded energy over the rails of the single track stretch between sidings II and III. Accordingly, signal 11S displays its clear indication and authorizes the westbound train to proceed into the single track stretch.

Occupancy of section 12T by the westbound train cuts off the supply of coded energy to the east end of the single track stretch so the code detecting relays at the west end of this stretch are released and interrupt the circuit of the winding of signal 8S to insure that it remains at stop. Release of these code detecting relays also interrupts one set of connections for supplying energy to the line wires 135 and 137 leading to signal 6S, but at this time the multiple approach relay at the west end of the single track stretch between sidings II and III is operated by coded energy supplied to the single track stretch, and the code detecting relays associated with this relay establish connections for supplying energy of reverse polarity to the line wires 135 and 137 so the signal 6S, when lighted, will display its caution indication.

In addition, release of the code detecting relays at the west end of the single track stretch between sidings II and III establishes the circuit of the winding of signal 7S. As previously explained, energy of reverse polarity is supplied to the line wires 106 and 107 leading to the winding of signal 7S so this signal, when lighted, displays its caution indication, while the coded energy supplied to the track stretch between sidings II and III is of reverse polarity and causes the signal 9S, when lighted, to display its caution indication.

Figure 4A:
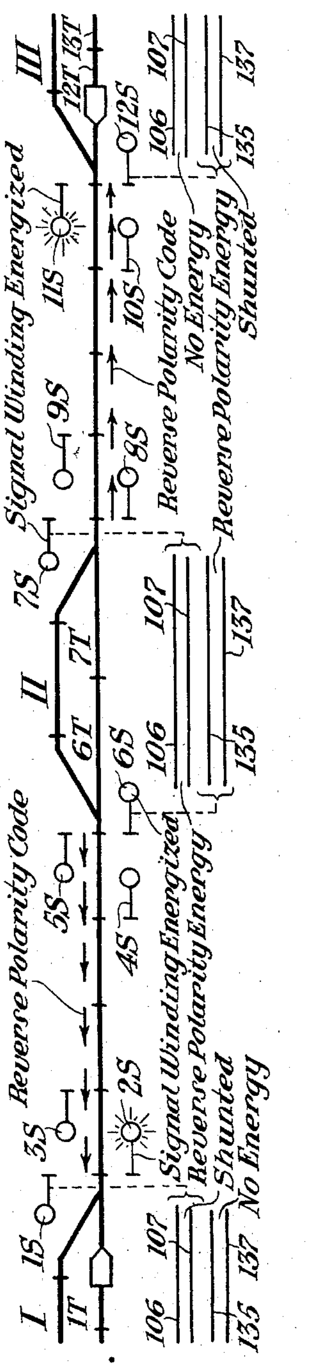
Figs. 4A, 4B and 4C are diagrams illustrating the operation of the equipment when two trains meet and pass at a siding.
Figure 4B:
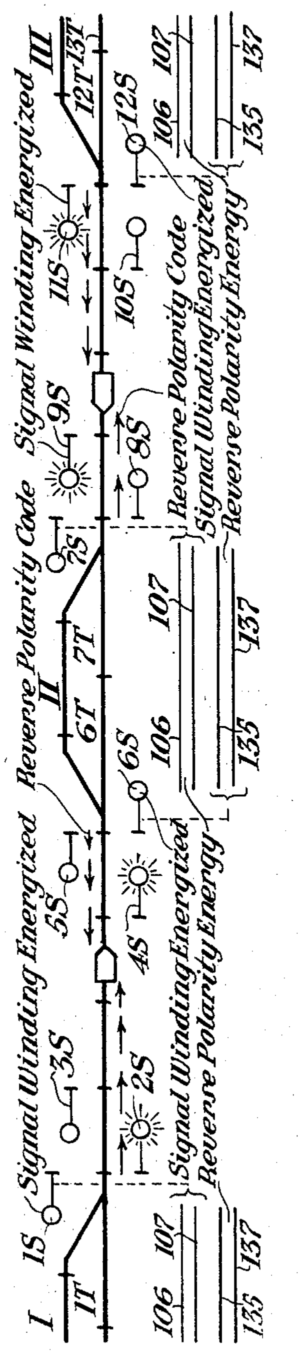

When the trains enter the single track stretches and advance within a predetermined distance of the distant signals 4S and 9S, as shown in Fig. 4B, the circuits of the windings of these signals and of the signal lamps are established. As previously explained, the coded energy for controlling these singals is of reverse polarity so each of these signals displays its caution indication to inform the engineer of the approaching train that it is proper for him to proceed to the adjacent end of the passing siding II, but to be prepared to stop at the entering signal for the siding.

Each of the distant signals is deenergized when a train advances beyond the signal, while the lamp of each signal is extinguished when the train clears the section in the rear of the signal.

Movement of the trains under consideration is governed by previously issued train orders and by operating rules which determine which one of them is to take the siding and which is to remain on the main track. For purposes of illustration it will be assumed that the eastbound train is to take the siding and that the westbound train is to remain on the main track.

When the eastbound train advances within a predetermined distance of signal 6S, the multiple approach relay at this location ceases to operate and the associated code detecting relays release to establish the circuit of the lamp of signal 6S and to cut off the supply of energy to the line wires 106 and 107 leading to signal 7S so that the winding of this signal is deenergized and the signal, when lighted, displays its stop indication. At this time the supply of coded energy to the single track stretch to the right of siding II is maintained so the signal 9S will continue to display its caution indication if the westbound train has not passed the signal, and so that the multiple approach relay will continue to operate and energize its code detecting relays to maintain the supply of energy of reverse polarity to the line wires 135 and 137 leading to signal 6S, providing the westbound train has not advanced too near the entering signal 7S. Accordingly, the signal 6S, when lighted, will display its caution or its stop indication depending on the position of the approaching westbound train. If the signal 6S displays its caution indication, it will be put to stop when the eastbound train passes the signal or when the switch is reversed, whichever occurs first. If signal 6S is at stop, when the eastbound train reaches it, the train may advance beyond the signal under flag protection and enter the siding.

When the eastbound train enters section 6T, or when the switch is reversed, the track relay for the section releases, thereby releasing its repeater relay 6TPR, while, at this time, the directional stick relay 6SR (Fig. 1D) is released as its circuit is interrupted by contact 172 which is governed by the switch. Release of the track relay repeater 6TPR interrupts the circuits for supplying energy to the line wires 106 and 107 leading to signal 7S to insure that this signal remains at stop, while it shunts the line wires leading to signal 6S and holds signal 6S at stop. It will be seen that neither entrance of the train into section 6T, nor reversal of the switch, interferes with the supply of coded energy to the west end of the single track stretch between sidings II and III so the distance signal 9S will continue to provide its caution indication if the westbound train has not advanced beyond the signal.

Similarly, if the westbound train had reached the siding before the eastbound train, the multiple approach relay governed by coded energy supplied to the west end of the single track stretch between sidings II and III would not operate and the associated code detecting relays would release to cut off the supply of energy to the line wires 135 and 137 leading to signal 6S and this signal would display its stop indication, but coded energy would continue to be supplied to the single track stretch in the rear of signal 6S and would cause the distant signal 4S to display its caution indication if the eastbound train has not progressed beyond this signal.

If, when the westbound train reaches signal 7S, the eastbound train has not advanced to within a predetermined distance of signal 6S, the signal 7S will display its caution indication and the westbound train may advance into section 7T. When this train enters section 7T, the supply of energy to the line wires 135 and 137 leading to signal 6S continues to be interrupted to insure that this signal remains at stop, while the line wires 105 and 106 leading to signal 7S are shunted to hold this signal at stop and to pick up both of the series relays at the left-hand end of the line wires to establish a circuit for the lamp of signal 5S so that it is lighted and displays its stop indication.

When the westbound train enters section 7T, the supply of coded energy to the right-hand end of the single track stretch between sidings I and II is not disturbed and coded energy of reverse polarity continues to be supplied to cause distant signal 4S to display its caution indication if the eastbound train has not passed this signal.

Accordingly, the westbound train may proceed to the west end of section 7T without interfering with progress of the eastbound train. If the westbound train should enter section 6T, the supply of coded energy to the single track stretch between sidings I and II would be cut off and distant signal 4S would be put to stop and would delay progress of the eastbound train if this train had not advanced beyond this signal. In order to prevent interference with opposing trains under these circumstances the operating rules provide that a train passing an entering signal at caution shall not advance into the track section adjacent the other end of the siding until the leaving or head block signal in advance displays its clear indication. A marker may be placed along the track at the junction of the siding sections to prevent inadvertent movement of a train from one siding section to the other.

When the eastbound train under consideration vacates the single track stretch between sidings I and II, coded energy supplied to the west end of this stretch feeds to the track relay at the east end of the stretch and causes it to energize the associated code detecting relays to thereby establish the circuit of the winding of signal 5S so that this signal displays its green or clear indication while the relay 5PCR picks up and interrupts one pick-up circuit for relay 6TPR.

Figure 1D:
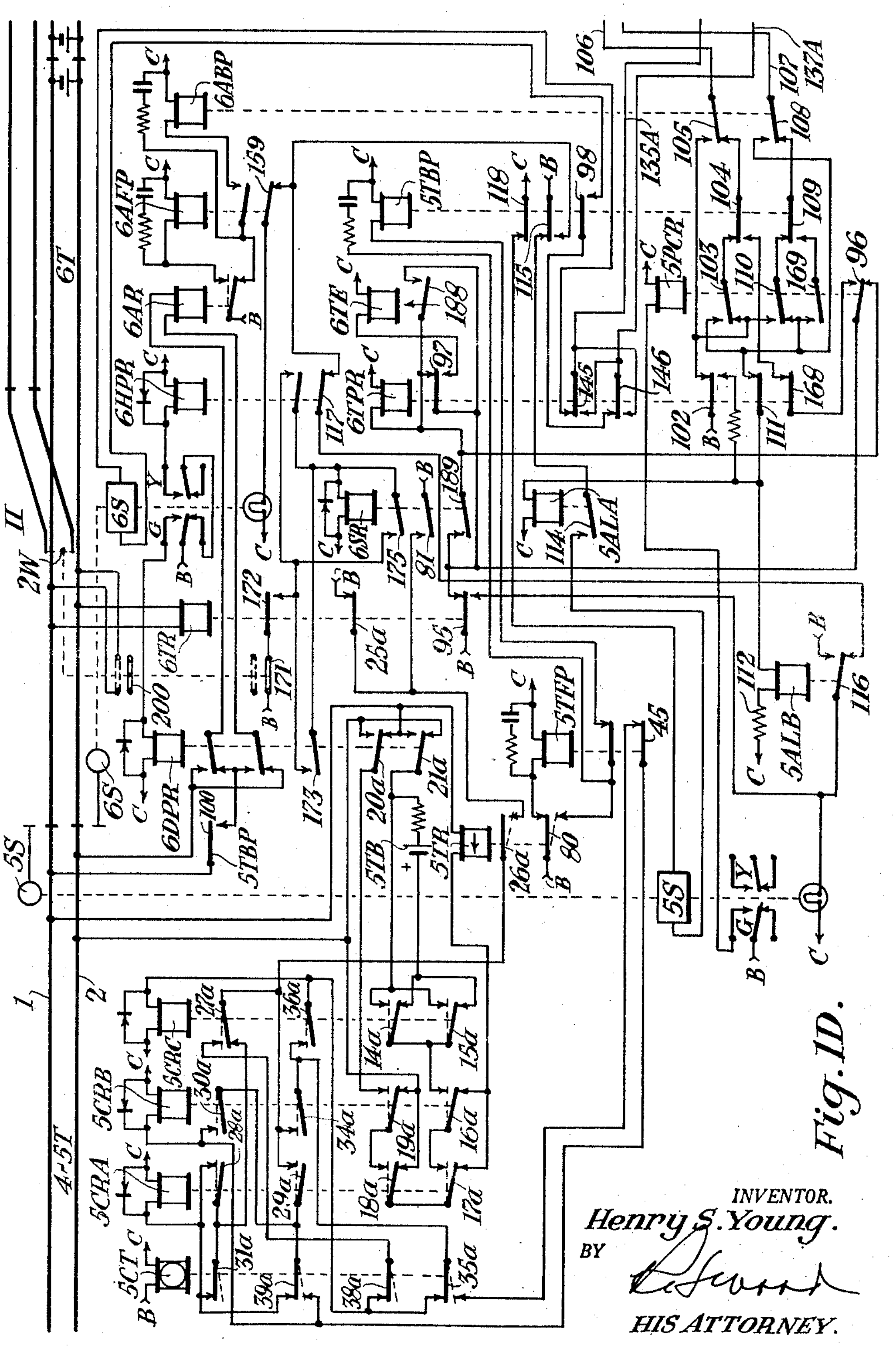
Figures 2A, 2B, 2C, 2D:
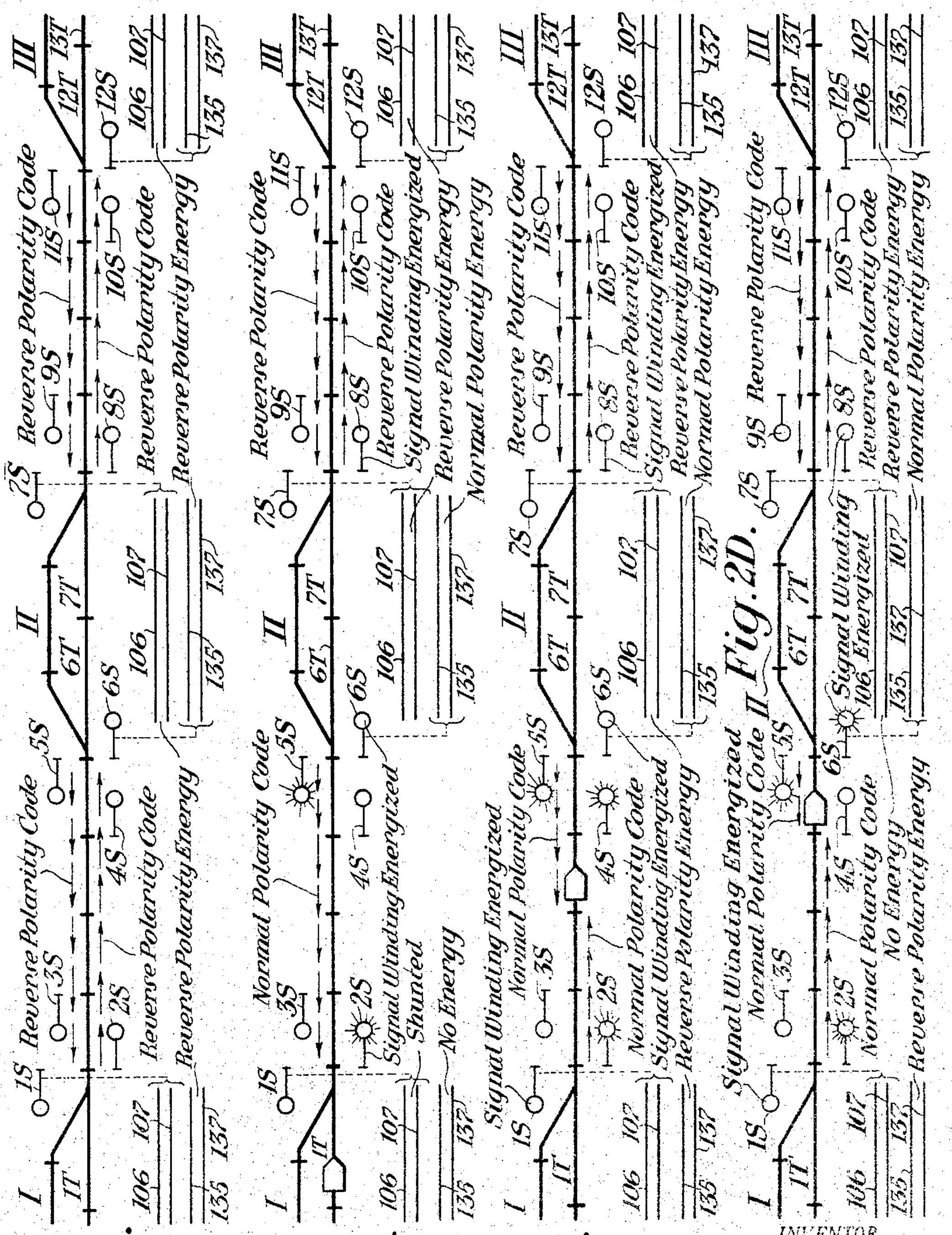
Figures 2E, 2F, 2G, 2H:
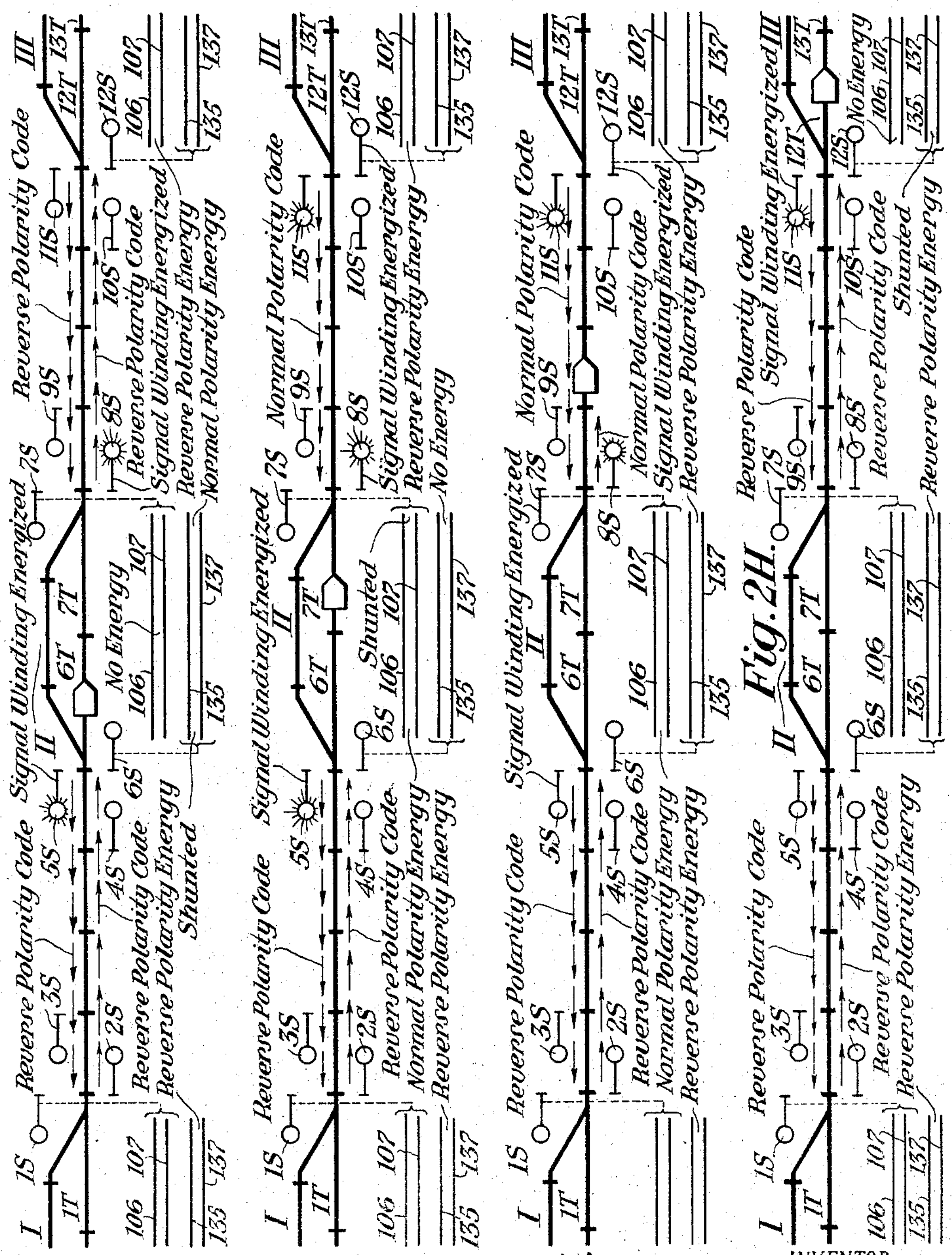
Figures 3A, 3B, 3C, 3D:
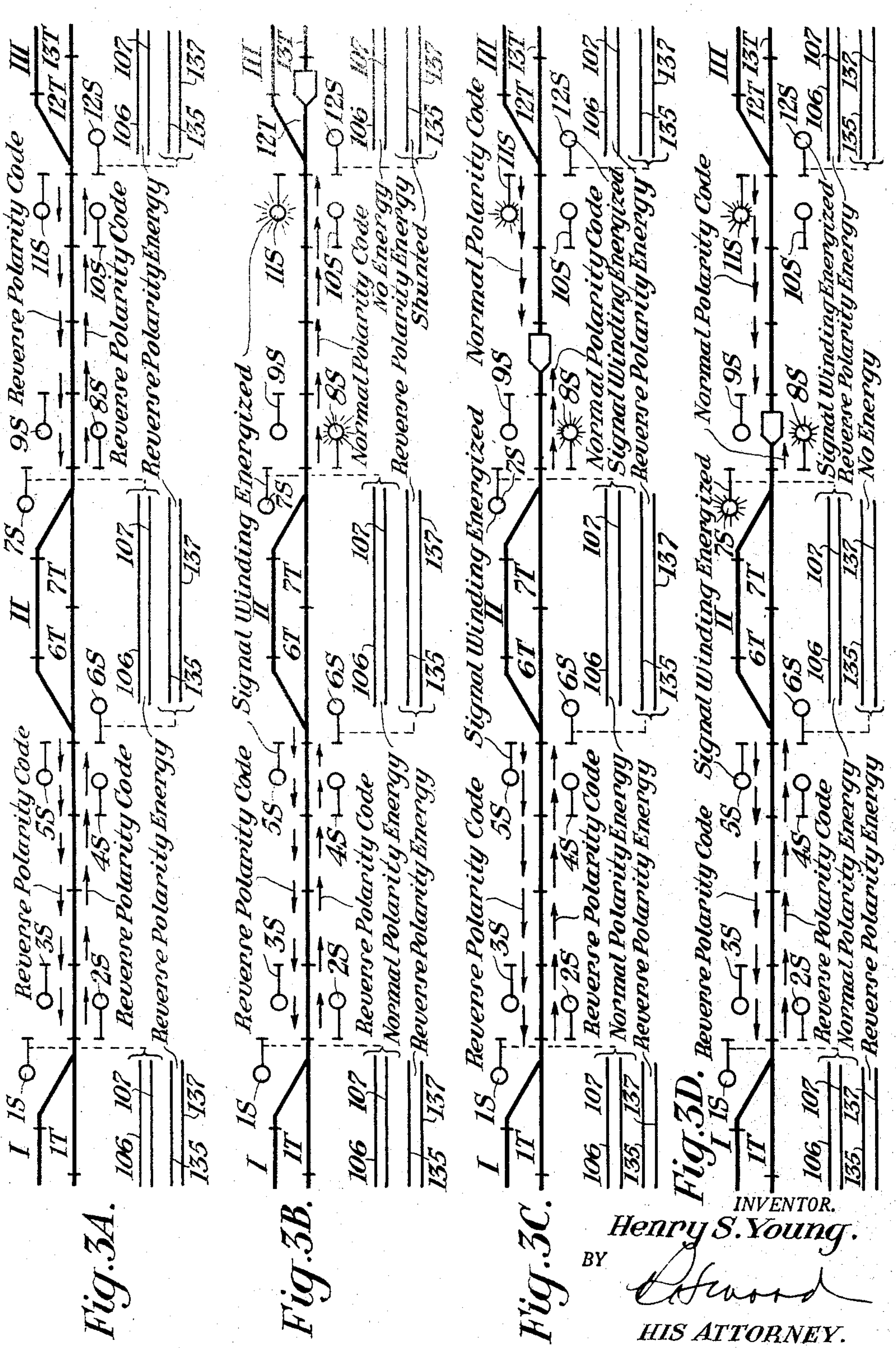
Figures 3E, 3F, 3G, 3H:
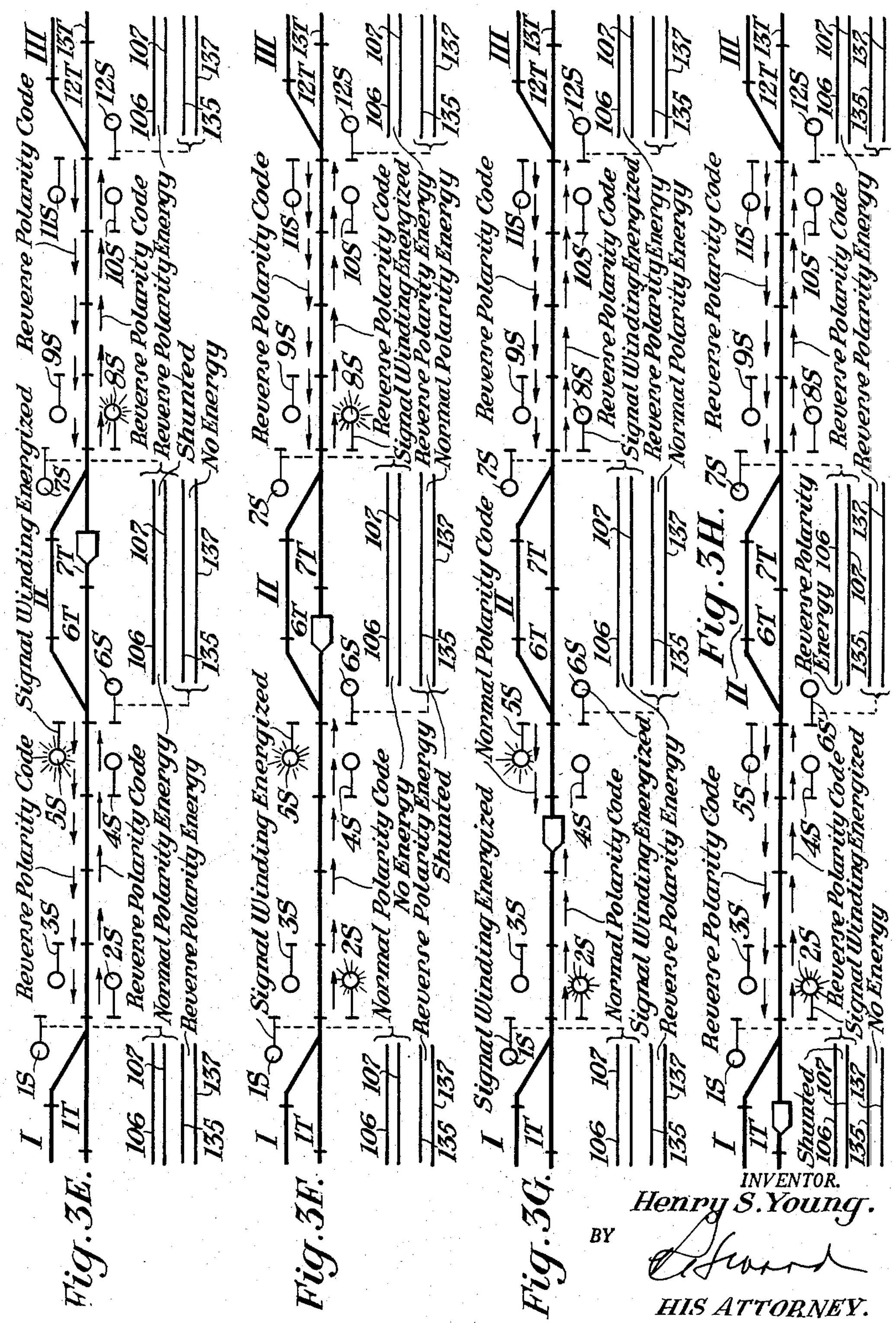

When the eastbound train completes its movement into the siding II and the switch at the left-hand end of the siding is restored to its normal position, the track relay for section 6T picks up and establishes the circuit for the time element relay 6TE, Fig. 1D, so that after a short time interval its contact picks up and establishes a circuit for the track relay repeater 6TPR and it picks up to establish a stick circuit for itself and to interrupt the circuit of the time element relay. After picking up of the track relay repeater 6TPR the series relays at the left-hand end of the line wires 106 and 107 leading to signal 7S remain picked up because of shunting of this line circuit during occupancy of section 7T, assuming that the westbound train has advanced into section 7T, so these relays maintain the circuits of the winding of signal 5S and of the lamp of this signal. The signal 5S now displays its green or clear indication to indicate to the westbound train that it is safe for it to proceed into the single track stretch beyond siding II.

When the track relay 6TR picks up, it establishes the circuits of the relays 5CRA, 5CRB and 5CRC so that these relays operate to supply impulses of coordinated return code to the single track stretch at the left of siding II.

Figure 4C:
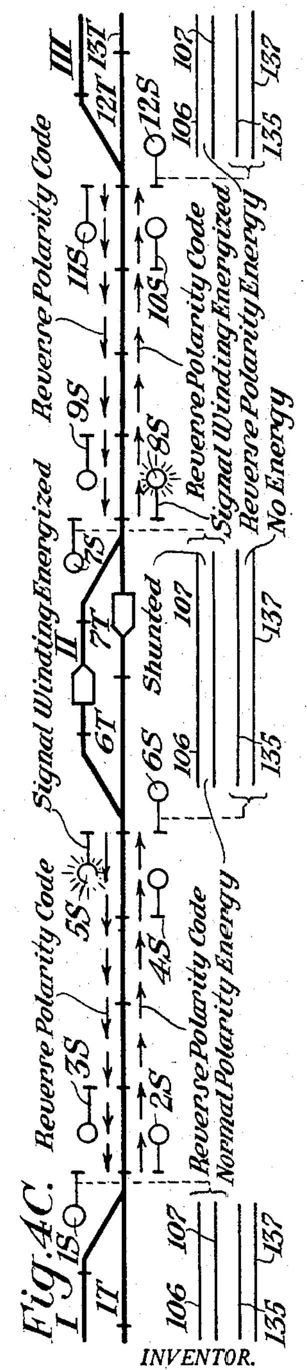

When the westbound train vacates the single track stretch between sidings II and III, the master code energy supplied to the left-hand end of this stretch feeds to the right-hand end of the stretch and causes the equipment at that point to supply coordinated return code to the stretch. This energy feeds to the left-hand end of the stretch to operate the track relay at this location and thus energize the associated code detecting relays. When these are energized, the circuit of the winding of signal 8S is complete, assuming relay 2ALA to be picked up, and this signal displays its green or clear indication so the crew of the eastbound train on the siding will know that it is safe for the train to proceed into the single track stretch leading to siding III. The equipment is now substantially in the condition in which it is shown in Fig. 4C.

On further movement of the two trains through the stretch the equipment operates substanially in the manner previously explained for movement of a train in each direction and a detailed explanation of the operation of the equipment is unnecessary.

Likewise, the equipment operates in a similar manner if, in making a meet, the eastbound train remains on the main track and the westbound train takes to the siding, and a detailed explanation of the operation of the equipment at such times is unnecessary.

Figure 5A:
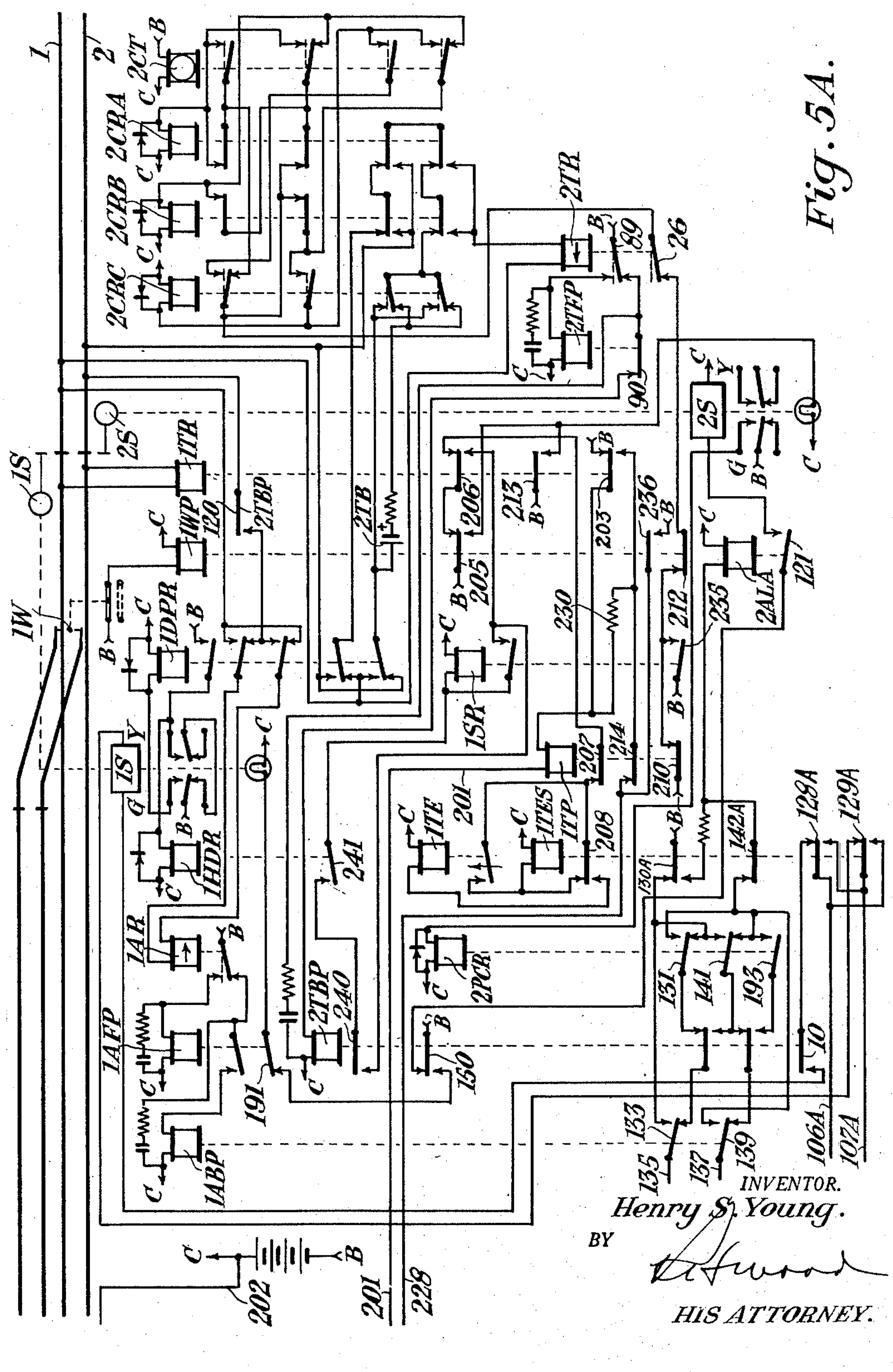
Figure 5B:
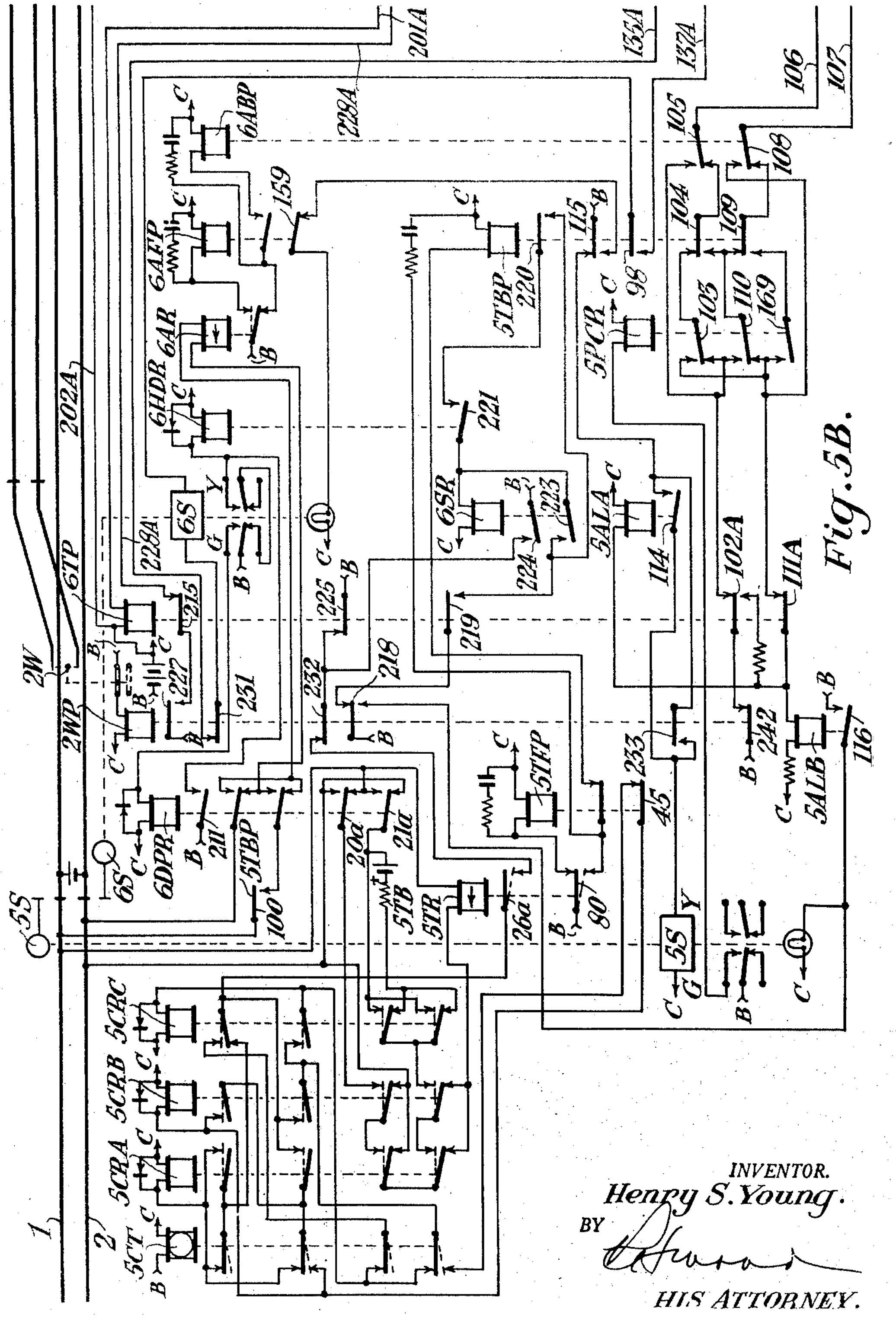

*Modification shown in Figs. 5A and 5B*

In the system illustrated in Figs. 1A–1D of the drawings, the main track portion of the tracks in the passing siding is divided into two track sections, and the supply of coded energy to the ends of the single track stretches adjoining opposite ends of a siding is governed by occupancy of the adjoining main track section. For example, when an eastbound train enters the main track portion beside a passing siding, the supply of coded track circuit energy to the west end of the single track stretch in advance of the train is continued until the eastbound train advances into the track section adjacent the exit or east end of the siding. Accordingly, the distant signal governing movement of westbound trains approaching this siding will continue to display a caution indication until the eastbound train advances into the section of the main track adjacent the exit or east end of the siding, but will be put to stop as soon as the eastbound train enters the main track section adjacent the exit end of the siding. The operation of the system shown in Figs. 1A and 1D, therefore, is such that a train passing a distant signal or an entering signal displaying a caution indication may proceed on the main track up to substantially the middle of the passing siding territory without interfering with movement of traffic in the opposite direction in the adjacent single track section in advance.

Where a passing siding is relatively short, it is preferred to arrange the equipment so that the main track portion forms a single track section which extends beyond and includes the hand-throw switches at the ends of the siding.

A modified form of equipment for a siding layout having only one track section is shown in Figs. 5A and 5B, the equipment for the right-hand or east end of the siding being shown in Fig. 5A, and the equipment for the left-hand or west end of the siding being shown in Fig. 5B. A complete siding section equipment is formed by placing Figs. 5A and 5B together with Fig. 5A at the right. To facilitate comparison of this modification with the species shown in Figs. 1A and 1D, the portion of the siding section equipment shown in Fig. 5A employs the same reference characters that are employed in Fig. 1A and the portion of the siding section equipment shown in Fig. 5B employs the same reference characters that are employed in Fig. 1D.

Referring to the drawings it will be seen that the track relay 1TR, Fig. 5A, is energized by current supplied from the track battery, Fig. 5B, which is located at the opposite end of the siding. The track relay 1TR has a contact 203 which controls the pick-up circuit for a repeater relay 1TP at the right-hand end of the siding for a series repeater relay 6TP at the left-hand end of the siding. The repeater relays 1TP and 6TP are normally energized in series over a line circuit which extends between the two ends of the siding, while stick circuits are provided for these relays to at times maintain them energized when relay 1TR is released, provided the switch 2W at the left-hand end of the siding, or the switch 1W at the right-hand end of the siding, is reversed, as hereinafter described. The negative terminals C of the batteries at the two ends of the siding are connected together by a line wire 202—202A to which one terminal of the winding of relay 6TP is connected so the relays 1TP and 6TP may at times be energized in series from the battery at the right-hand end of the siding and may at other times be energized in series from the battery at the left-hand end of the siding.

In this modification each of the track switches 1W and 2W controls a repeater relay WP so that the relay is energized when and only when the associated switch occupies its normal position.

This modification further differs from that shown in Figs. 1A and 1D in that only one series line relay 2ALA is employed at the right-hand end of the siding, and in that a time element relay TE is not required at the left-hand end of the siding. At the right-hand end of the siding, relay 1TPR of Fig. 1A is replaced by a normally energized stick repeater 1TES of relays 1TR, 1TP and 1WP.

Where this modification is employed, the equipment for the single track stretches is not affected except for changes in the circuits governing the transmitter relays, as hereinafter explained.

The equipment is shown in the condition which it assumes when the track stretch is vacant and the track switches are in their normal positions. At this time the code detecting relays 5TFP and 5TBP are picked up in response to operation of the track relay 5TR, and the code detecting relays 2TFP and 2TBP are picked up in response to operation of relay 2TR.

As the main track section beside the passing siding is not occupied, the track relay 1TR is picked up and its front contact 203 establishes a circuit for energizing relays 1TP and 6TP in series. This circuit is traced from terminal B of the battery at the right-hand end of the siding, over front contact 203 of relay 1TR, through the winding of relay 1TP, over line wire 201—201A, through the winding of relay 6TP, and over line wire 202A—202 to terminal C of the battery at the right-hand end of the siding.

As relays 1WP, 1TR and 1TP are picked up, energy is supplied to the relay 1TES over its stick circuit which includes front contact 205 of relay 1WP, front contact 206 of relay 1TR, front contact 207 of relay 1TP, and front contact 208 of relay 1TES. As relay 1TES is picked up, its back contact 208 interrupts the circuit of relay 1TE, while contacts 130A and 142A of relay 1TES establish connections for supplying energy to the line wires 135 and 137 leading to signal 6S at the west end of the siding, and contacts 128A and 129A of relay 1TES establish connections to permit energy to be supplied from line wires 106A and 107A to the winding of signal 1S.

At this time the circuit of the winding of signal 1S is open at contact 10 of relay 2TBP so this signal, if lighted, would display its stop indication, and the relay 1DPR is released to cause the coded energy supplied to the west end of the adjoining single track stretch to be of reverse polarity.

Similarly, at this time, the circuit of the winding of signal 6S is open at contact 98 of relay 5TBP so this signal, if lighted, would display its stop indication, and the relay 6DPR is released and causes the coded energy supplied to the east end of the adjoining single track stretch to be of reverse polarity.

At this time as the circuit of the winding of signal 1S is open the series relays 5ALA and 5ALB, Fig. 5B, are released and interrupt the circuits of the winding of the signal 5S and of the signal lamp, so the relay 5PCR is released and establishes connections for supplying energy of reverse polarity to the line wires 106 and 107 leading to signal 1S.

Similarly, as the circuit of the winding of signal 6S is open, the series relay 2ALA, Fig. 5A, is released and interrupts the circuit of the winding of signal 2S so the relay 2PCR is released and establishes connections for supplying energy of reverse polarity to the line wires 135 and 137 leading to signal 6S.

*Operation of equipment on movement of an eastbound train through the stretch*

When the single track stretch at the west of the siding is occupied by an eastbound train, the supply of coded energy over the rails of the single track stretch from left to right is cut off and relays 5TFP and 5TBP are released so contact 98 of relay 5TBP establishes the circuit of the winding of signal 6S with the result that the series relay 2ALA is picked up and its front contact 121 in the circuit of the winding of signal 2S is closed. As the stretch is assumed to be vacant, the relay 2TBP is picked up and energy is supplied to the winding of signal 2S on picking up of relay 2ALA. When the signal 2S is conditioned to display its clear indication, the relay 2PCR is picked up to cause energy of normal polarity to be supplied to the line wires 135 and 137 leading to signal 6S. Accordingly, the signal 6S is conditioned to display its clear indication, and relay 6DPR is picked up to cause the coded energy supplied to the right-hand end of the single track stretch to be of normal polarity and thus cause the distant signal to display a clear indication to an approaching train. In addition, as relay 6DPR is picked up, its contact 211 establishes a circuit for supplying energy to the signal repeating relay 6HDR and contact 221 of relay 6HDR is picked up and prepares the pick-up circuit for relay 6SR.

If at the time the eastbound train approaches the signal 6S traffic conditions in advance are such that this signal displays its yellow or caution indication, a contact Y of the signal will establish the circuit of the relay 6HDR so that contact 221 of relay 6HDR prepares the pick-up circuit for relay 6SR. Under these conditions the relay 6DPR remains released and the coded energy supplied to the right-hand end of the single track stretch is of reverse polarity and will cause the distant signal to display its yellow or caution indication.

As relay 5TBP is released, the approach relay 6AR operates and relays 6AFP and 6ABP are picked up and contacts 105 and 108 of relay 6ABP establish connections for supplying energy of reverse polarity to the line wires 106 and 107 leading to signal 1S and this signal may display a caution indication to an approaching train.

As relay 1TP is picked up, its contact 210 establishes the circuit including front contact 212 of relay 1WP and back contact 26 of track relay 2TR for supplying energy to the transmitter relays 2CRA, TCRB and 2CRC, and they operate to cause impulses of energy to be supplied to the single track stretch at the right of the siding to control the signals for westbound traffic in that stretch.

When the eastbound train advances within a predetermined distance of the signal 6S, the multiple approach relay 6AR ceases to operate and relays 6AFP and 6ABP release so that contact 159 of relay 6AFP establishes the circuit of the lamp of signal 6S and causes this signal to display its clear indication. On release of relay 6ABP, its contacts 105 and 108 interrupt the connections for supplying energy of reverse polarity to the line wires 106 and 107 leading to signal 1S and insure that this signal remains at stop. At this time, as relay 1TP is energized, the circuit for the transmitter relays 2CRA, 2CRB and 2CRC is maintained so coded energy is supplied to the single track stretch at the right, and the distant signal for a westbound train approaching signal 1S will display a caution indication. Furthermore, at this time the head block signal, not shown, governing entrance of westbound traffic into the single track stretch at the right of the siding illustrated may display a clear indication.

When the eastbound train under consideration passes signal 6S and enters section 1T, the track relay 1TR at the east end of the siding releases and its contact 203 interrupts the circuit of the relays 1TP and 6TP and these relays release. In addition, on release of relay 1TR, its contact 206 interrupts the stick circuit for relay 1TES and it releases, while contact 213 of relay 1TR establishes a circuit of the lamp of signal 2S.

On release of relay 1TP, its contact 210 interrupts the circuit for supplying energy to the transmitter relays 2CRA, 2CRB and 2CRC, and these relays cease operating so coded energy is no longer supplied to the west end of the single track stretch at the right of the siding. Accordingly, the distant signal and the head block signal governing westbound traffic in the single track stretch at the right of the siding are held at stop.

In addition, on release of relay 1TES, its contacts 130A and 142A interrupt the connections for supplying energy to the line wires 135 and 137 leading to signal 6S to hold this signal at stop, and back contact 130A of relay 1TES establishes a circuit for relay 2ALA and it remains picked up and maintains the circuit of the winding of signal 2S and this signal continues to display its green or clear indication. Also on release of relay 1TES, its contacts 128A and 129A interrupt the connections from line wires 106A and 107A to the winding of signal 1S to insure that signal 1S displays its stop indication.

On release of relay 6TP energy is supplied to relay 6SR over the circuit which includes front contact 218 of relay 2WP, back contact 219 of relay 6TP, back contact 220 of relay 5TBP, and front contact 221 of relay 6HPR so the contacts of relay 6SR pick up and its contact 223 establishes a stick circuit to keep the relay energized after release of relay 6HDR. As explained above, when the eastbound train enters section 1T, the relay 1TES releases to interrupt the supply of energy to signal 6S. Accordingly, it goes to stop and the circuit of relay 6HDR is interrupted either by a contact of the signal mechanism or by contact 211 of relay 6DPR. However, the relay 6HDR is snubbed by a rectifier so its contacts are slow to release. As a result, front contact 221 of relay 6HDR remains closed long enough subsequent to release of relay 6TP to insure that energy will be supplied to relay 6SR over its pick-up circuit for a sufficient time interval to insure that relay 6SR will pick up and establish its stick circuit before relay 6HDR releases to interrupt the pick-up circuit for relay 6SR.

When relay 6SR picks up, its contact 224 maintains the circuit for operating the transmitter relays 5CRA, 5CRB and 5CRC after relay 6TP releases and its contact 225 interrupts the branch of the circuit which it controls for supplying energy to these transmitter relays. Accordingly, these relays continue to operate and cause energy impulses to be supplied to the single track stretch at the left of the siding and when the train vacates the single track stretch, these energy impulses feed over the track rails to permit the head block signal at the other end to clear. In addition, when the train clears the single track stretch at the left of the siding, coded energy supplied to the left-hand or west end of the single track stretch feeds to the right-hand end of the stretch and operates track relay 5TR to pick up relays 5TFP and 5TBP. When contact 45 of relay 5TFP is closed, the transmitter relays 5CRA, 5CRB and 5CRC operate to supply coordinated return code energy to the single track stretch.

When the train enters section 1T and relay 6TP releases, its contacts 102A and 111A interrupt the connections for supplying energy to the line wires 106 and 107 leading to signal 1S to thereby insure that this signal remains at stop. After release of relay 6TP its back contact 102A establishes a circuit for energizing relays 5ALA and 5ALB, and contact 116 of relay 5ALB is picked up to establish the circuit of the lamp of signal 5S. As long as the rear of the train occupies a portion of the single track stretch the relay 5TBP is released and its contact 115 interrupts the circuit of the winding of signal 5S so it displays the stop indication. When the train vacates the single track stretch and relay 5TBP picks up, its contact 115 establishes the circuit including front contact 114 of relay 5ALA for supplying energy to the winding of signal 5S and this signal now displays the clear indication. In addition, when relay 5TBP picks up, its contact 115 interrupts the circuit of the lamp of signal 6S and this lamp is extinguished. Furthermore, when the train vacates the single track stretch and relay 5TBP picks up, its contact 100 interrupts the circuit of the relay 6AR so that it remains released and does not cause energy to be supplied to relays 6AFP and 6ABP.

When the eastbound train under consideration passes signal 2S and advances into the single track stretch at the right of the passing siding, the relay 2TR remains released and relays 2TFP and 2TBP release. When relay 2TBP releases, its contact 150 interrupts the circuit of the winding of signal 2S and this signal displays its stop indication, while a contact of the signal mechanism interrupts the circuit of relay 2PCR and it releases, thereby interrupting the connections for supplying energy of normal polarity to line wires 135 and 137 leading to signal 6S, and establishing connections for supplying energy of reverse polarity to these line wires after relay 1TES picks up.

When the train vacates section 1T, the track relay 1TR picks up and its contact 213 interrupts the circuit of the lamp of signal 2S, and contact 203 of relay 1TR esetablishes the pick-up circuit for relays 1TP and 6TP. This circuit is traced from terminal B of the battery at the right-hand end of the siding, over front contact 203 of relay 1TR, winding of relay 1TP, line wire 201-201A, winding of relay 6TP, and line wire 202A-202 to terminal C of this battery. Accordingly, relays 1TP and 6TP pick up and energy is supplied to the time element relay 1TE over the circuit which includes front contact 205 of relay 1WP, front contact 206 of relay 1TR, front contact 207 of relay 2TP, and back contact 208 of relay 1TES. After a short time interval, such as 30 seconds, the relay 1TE picks up and establishes the pick-up circuit for relay 1TES and it picks up with the result that its contact 208 interrupts the circuit of relay 1TE and establishes the stick circuit for relay 1TES to keep it energized after release of relay 1TE.

The relays 2TFP and 2TBP are snubbed by condensers and relay 2TBP will remain picked up for a short time interval after a train enters the single track stretch, and will cause signal 2S to continue to display its clear indication, while a contact of the signal maintains the circuit of the relay 2PCR. Accordingly, relay 2PCR remains picked up for an appreciable time interval and maintains the connections over which energy of normal polarity may be supplied to the line wires leading to signal 6S.

When a short fast train passes through the siding area it may vacate section 1T before the single track stretch in advance has been occupied long enough to cause relays 2TBP and 2PCR to release. If relay 1TES picked up immediately after section 1T is vacated and track relay 1TR picks up, the relay 1TES might cause energy to be supplied to the line wires leading to signal 6S before relay 2PCR had released. If this should occur, energy of normal polarity would be supplied to these line wires in the interval prior to release of relay 2PCR, and the signal 6S might improperly display a green or clear indication. As the picking up of relay 1TES is delayed for a short time after relay 1TR picks up, the relay 1TES is certain to remain released long enough to enable relay 2PCR to release, and there will be no temporary improper supply of energy of normal polarity to the line wires leading to signal 6S.

The relay 1TES also controls the circuit of the line wires leading to signal 1S, and when a westbound train vacates the section 1T, energy will not be supplied to signal 1S from the associated line circuit until the relays at the west end of the siding have had time to position themselves so that energy of the proper polarity is supplied to the line circuit. The relay 1TES, therefore, serves to prevent temporary improper display of a clear indication by the signal 1S as well as by the signal 6S.

When the eastbound train under consideration vacates section 1T and relays 1TP and 6TP pick up, contact 219 of relay 6TP interrupts the stick circuit for relay 6SR and it releases so that its contact 224 interrupts the circuit which it controls for supplying energy to the transmitter relays 5CRA, 5CRB and 5CRC, but at this time these relays are energized by current supplied over front contact 225 of relay 6TP.

When relay 6TP picks up, its back contact 102A interrupts one circuit for supplying energy to relays 5ALA and 5ALB but these relays are maintained picked up by energy supplied thereto in series with the line wires 106 and 107. This is true because when relay 6TP picks up its contacts 102A and 111A establish connections for supplying energy to the line wires 106 and 107, and at this time relay 1TES, Fig. 5A, is released and short-circuits these line wires with the result that the energy supplied to these line wires keeps both of the relays 5ALA and 5ALB picked up.

After a short time interval the relay 1TES picks up and interrupts the connections which short-circuit the line wires 106 and 107 and connect these line wires over back contact 10 of relay 2TBP to the winding of the signal 1S. As a result of the reduction in the value of the energy supplied over the line wires 106 and 107, the relay 5ALB releases and its contact 116 interrupts the circuit of the lamp of signal 5S. At this time relay 5ALA remains picked up and its contact maintains the circuit of the winding of signal 5S, and, if traffic conditions are such that relay 5TBP is picked up, the signal 5S will be prepared to display its clear indication and a contact of the signal mechanism will establish the circuit of the relay 5PCR. Accordingly, the contacts of relay 5PCR are picked up and cause the energy supplied to line wires 106 and 107 to be of normal polarity with the result that signal 1S displays its green or clear indication.

At the time the eastbound train enters the single track stretch at the right of the siding the relays 1AFP and 1ABP are released since relay 1AR has not been operating because its circuit is open at contact 120 of relay 2TBP, and because coded energy was not being supplied to this end of the single track stretch. After the train clears section 1T and coded energy is again supplied to the single track stretch, the relay 1AR does not operate because of the shunting effect of the train. Accordingly, until the train advances a substantial distance in the single track stretch, relay 1ABP remains released and prevents the supply of energy to the line wires 135 and 137 leading to signal 6S and holds this signal at stop.

On continued movement of the eastbound train through the stretch the equipment operates substantially as described in connection with Figs. 1A—1D and a detailed description of the operation of the equipment is not required.

*Operation of equipment when an eastbound train enters the passing siding*

The control circuits provided by this modification are arranged so that occupancy of section 1T by a train entering or leaving the passing siding will not cut off the supply of coded energy to the adjacent end of the single track stretch at the opposite end of the passing siding. Accordingly, movement of a train into or out of a siding will not unnecessarily delay other trains.

When an eastbound train approaching signal 6S is to enter the passing siding, it stops short of the signal and does not enter section 1T until the switch 2W has been reversed. Accordingly, the track relay 1TR remains picked up and its contact 203 maintains the pick-up circuit for the relays 1TP and 6TP and they are picked up with the result that contact 210 of relay 1TP establishes the circuit for supplying energy to the transmitter relays 2CRA, 2CRB and 2CRC, and these relays operate to supply impulses of energy to the single track stretch at the right of the passing siding.

One of the train crew now reverses the switch 2W, and on this movement of the switch the relay 2WP releases and its contact 218 interrupts the circuit of the relay 6SR and insures that it remains released. In addition, contact 218 establishes a circuit for the lamp of signal 5S, and contact 231 of relay 2WP interrupts the circuit of the winding of signal 6S so this signal displays its stop indication. After release of relay 2WP its contact 232 interrupts the circuit for supplying energy to the transmitter relays 5CRA, 5CRB and 5CRC, and these relays do not operate to supply coded energy to the rails of the single track stretch. Accordingly, relay 6AR does not operate and relays 6AFP and 6ABP are released and contacts 105 and 108 of relay 6ABP prevent the supply of energy to line wires 106 and 107 leading to signal 1S and thus insure that this signal remains at stop. The supply of energy to line wires 106 and 107 is additionally interrupted by contact 242 of relay 2WP on release of this relay.

On release of relay 2WP, its contact 233 in the circuit of the winding of signal 5S is closed, but at this time this circuit is open at contact 115 of relay 5TBP so this signal remains at stop.

On release of relay 2WP, its contact 227 establishes a stick circuit for the relays 1TP and 6TP to maintain them picked up after release of relay 1TR. This stick circuit is traced from terminal B of the battery at the left-hand end of the passing siding over back contact 227 of relay 2WP, front contact 215 of relay 6TP, line wire 228A—228, front contact 214 of relay 1TP, resistance 230, winding of relay 1TP, line wire 201—201A, and winding of relay 6TP to terminal C of the battery at the left-hand end of the siding.

After the switch 2W has been reversed, the eastbound train may proceed into the siding. When the train enters section 1T, the track relay 1TR releases and its front contact 203 interrupts the circuit for supplying energy from the battery at the east end of the siding to the relays 1TP and 6TP. When the contacts of relay 1TR complete their movement to their released position, back contact 203 of relay 1TR establishes a connection shunting resistance 230 in the stick circuit traced above for relays 1TP and 6TP. The resistor 230 provides a circuit for supplying energy to relays 1TP and 6TP from the battery at the left-hand end of the siding in the interval between opening of the front contact 203 of relay 1TR and the closing of this back contact of the relay. The energy supplied to relays 1TP and 6TP through the resistor 230 prevents release of these relays during the transfer time of the contact of relay 1TR and thus insures that relays 1TP and 6TP remain picked up and maintain their stick circuits.

As relay 1TP is picked up, its contact 210 maintains the circuit for supplying energy to the transmitter relays 2CRA, 2CRB and 2CRC, and these relays continue to operate to supply coded energy to the single track stretch to govern the signals which control westbound traffic in this single track stretch.

As relay 6TP is picked up, its front contacts 102A and 111A in the connections for supplying energy to line wires 106 and 107 leading to signal 1S are closed, but energy is not supplied to these line wires since relays 2WP, 2PCR, 5TBP and 6ABP are released.

On release of the track relay 1TR its contact 206 interrupts the stick circuit for relay 1TES and it releases to cut off the supply of energy to the line wires 135 and 137 leading to signal 6S and thereby insures that it remains at stop. In addition, contacts 128A and 129A of relay 1TES interrupt the connections from line wires 106A and 107A to signal 1S to insure that it remains at stop.

Accordingly, signal 1S is held at stop, and relay 1DPR remains released and causes the coded energy supplied to the left-hand end of the single track stretch to be of reverse polarity with the result that the distant signal will display its yellow or caution indication to an approaching westbound train.

From the foregoing it will be seen that during movement of an eastbound train into the siding, a westbound train will receive a caution indication at the distant signal as it approaches the siding, and will receive a stop indication at the entering signal at the east end of the siding. The distant signal is far enough removed from the entering signal to enable a train to stop before reaching the entering signal, so a westbound train is certain to be able to stop before it reaches the eastbound train which is entering the siding. This is true even though the siding is relatively short. Furthermore, it will be seen that movement of the eastbound train into the passing siding does not interfere with movement of the westbound train up to the passing siding, but permits the westbound train to advance up to signal 1S so as to be prepared to enter the siding area when the eastbound train completes its movement into the siding and the switch 2W at the west end of the siding is restored to its normal position.

When the eastbound train clears the fouling point and vacates section 1T, the track relay 1TR picks up and its contact 203 establishes the circuit for supplying energy from the battery at the right-hand end of the siding to the relays 1TP and 6TP. At this time contact 213 of relay 1TR interrupts the supply of energy to the lamp of signal 1S.

As soon as relay 1TR picks up, its front contact 206 establishes the circuit including front contact 207 of relay 1TP for supplying energy to relay 1TE, and after a short time interval its contact picks up and establishes the pick-up circuit for the relay 1TES and it picks up to establish its stick circuit and to interrupt the circuit of relay 1TE.

When the switch 2W is restored to its normal position, the relay 2WP picks up and its contact 227 interrupts the supply of energy from the battery at the left-hand end of the siding to the stick circuit for the relays 1TP and 6TP, but at this time these relays are maintained picked up by energy supplied from the battery at the other end of the siding. Accordingly, contact 210 of relay 1TP maintains the circuit for the transmitter relays 2CRA, 2CRB and 2CRC and thus maintains the supply of coded energy to the west end of the single track stretch.

When relay 2WP picks up, its contact 232 establishes the circuit including front contact 225 of relay 6TP for supplying energy to the transmitter relays 5CRA, 5CRB and 5CRC and these relays now operate to supply coded energy to the single track stretch. As the train has cleared the single track stretch, the track relay 5TR is operated by coded energy supplied over the rails of the single track stretch, and the relays 5TFP and 5TBP are picked up and the transmitter relays 5CRA, 5CRB and 5CRC operate to supply coordinated return code to the track rails.

When relay 2WP picks up, its contact 231 in the circuit of the winding of signal 6S is closed, but at this time this circuit is open at contact 98 of relay 5TBP so this signal winding is not energized.

When relay 2WP picks up, its contact 233 in the circuit of the winding of signal 5S is open. At this time contact 114 of the series relay 5ALA in the circuit of the winding of signal 5S is open because relay 5ALA is released. The relay 5ALA is released, assuming that relay 1TES has picked up, because contact 10 of relay 2TBP interrupts the circuit of the winding of signal 1S and thus prevents flow of energy in the line wires 106 and 107 and in the series relays 5ALA and 5ALB.

When the switch 2W is restored to its normal position and relay 2WP picks up, its contact 242 is closed to permit energy to be supplied to line wires 106 and 107 leading to signal 1S. At this time energy may be supplied to these line wires since relay 5TBP is picked up. Accordingly, signal 1S will be controlled in the usual manner and will provide an appropriate indication for a westbound train.

The equipment is now substantially in the condition in which it is shown in the drawings except for the presence of the eastbound train on the passing siding.

*Operation of equipment when an eastbound train leaves the passing siding*

For purposes of illustration it will be assumed that the track stretch in the vicinity of the passing siding is not occupied and that the eastbound train leaves the passing siding.

When this train is to leave the siding, one of the train crew reverses the switch 1W, thereby releasing the relay 1WP with the result that contact 205 of relay 1WP interrupts the stick circuit for relay 1TES and it releases to cut off the supply of energy to the line wires 135 and 137 leading to signal 6S and thus insure that this signal remains at stop, and to also insure that the coded energy supplied to the single track in the rear of signal 6S is of reverse polarity so the distant signal will display its yellow or caution indication.

In addition, on release of relay 1TES, its back contact 130A establishes a circuit for relay 2ALA and contact 121 of relay 2ALA in the circuit of the winding of signal 2S is closed. If, at this time, traffic conditions in advance are such that it is proper for the eastbound train to advance into the single track stretch, the relay 2TBP will be picked up so its contact 150 establishes the circuit of the winding of signal 2S and this signal will display its green or clear indication. At this time, the lamp of signal 2S is lighted by energy supplied over the circuit established by back contact 205 of relay 1WP.

On release of relay 1WP its contact 212 interrupts the circuit of the transmitter relays 2CRA, 2CRB and 2CRC to cut off the supply of coded energy to the west end of the single track stretch and thus hold at stop the westbound head block signal at the right-hand end of the single track stretch.

As the relay 1WP is released, its contact 205 interrupts the pick-up circuit for relay 1SR and this relay is certain to remain released when the train enters the siding section and releases relay 1TR. Accordingly, contact 235 of relay 1SR remains open and does not establish a circuit for the transmitter relays 2CRA, 2CRB and 2CRC, and these relays remain released.

On release of relay 1WP its contact 236 establishes a stick circuit for relays 1TP and 6TP to insure that they remain picked up after release of relay 1TR during movement of the train through the end of section 1T. This stick circuit is traced from terminal B of the battery at the right-hand end of the siding over back contact 236 of relay 1WP, front contact 214 of relay 1TP, resistor 230, winding of relay 1TP, wire 201—201A, winding of relay 6TP, and wire 202A—202 to terminal C of the battery. As explained above in connection with the stick circuit established by contact 227 of relay 2WP, the resistor 230 provides a circuit over which energy is supplied to relays 1TP and 6TP during movement of contact 203 of relay 1TR between its picked-up and its released positions to thereby insure that relays 1TP and 6TP remain picked up and maintain their stick circuit. After release of relay 1TR, contact 203 shunts the resistor 230 and increases the energy supplied to relays 1TP and 6TP.

When the eastbound train leaves the siding and passes through the siding section, the relay 1TR is released, but relays 1TP and 6TP remain picked up because of the energy supplied over their stick circuit.

As relay 6TP remains picked up at this time, its contact 225 maintains the circuit for supplying energy to the transmitter relays 5CRA, 5CRB and 5CRC, and these relays operate to supply coded energy to the rails of the single track stretch to condition the eastbound head block signal to authorize entrance of traffic into this stretch. At this time, as relay 1TES is released, the signal 6S is certain to be at stop, and the relay 6DPR is certain to be released and cause the coded energy supplied to the single track stretch to be of reverse polarity so the distant signal will display its yellow or caution indication to inform the engineer of an approaching train to be prepared to stop at signal 6S.

Accordingly, while an eastbound train is leaving the passing siding, an approaching eastbound train will be given adequate warning of traffic conditions in advance and will be able to stop before reaching the train which is leaving the siding. This is true because the distance from the distant signal to signal 6S is adequate to enable a train to stop before reaching signal 6S, and, even though the siding section is relatively short, there is no danger that a train will advance through the siding section and collide with the train leaving the siding.

When the eastbound train which is leaving the siding advances into the single track stretch, the track relay 2TR ceases to operate and relays 2TFP and 2TBP release to put signal 2S to stop and release relay 2PCR.

When the train vacates the siding section, the track relay 1TR picks up and its contact 203 establishes the pick-up circuit for relays 1TP and 6TP so that these relays remain picked up after switch 1W is restored to its normal position, thereby picking up relay 1WP to interrupt the stick circuit for relays 1TP and 6TP. Also when relay 1TR picks up, its contact 213 interrupts one circuit for the lamp of signal 2S.

When the switch 1W is restored to its normal position, the relay 1WP picks up and its contact 205 interrupts the other circuit for the lamp of signal 2S, and establishes the circuit including front contact 206 of relay 1TR, front contact 207 of relay 1TP, and back contact 208 of relay 1TES for supplying energy to relay 1TE. After a short time relay 1TE picks up and establishes the circuit for relay 1TES and it picks up to interrupt the circuit of relay 1TE and establish its own stick circuit.

When relay 1TES picks up, its back contact 130A interrupts the supply of energy to relay 2ALA and it releases so that its contact 214 in the circuit of the winding of signal 2S is open. In addition, when relay 1TES picks up, its front contacts 130A and 142A establish connections over which energy may be supplied to the line wires 135 and 137 leading to signal 6S, but energy is not supplied to these line wires since relays 1ABP, 2TBP and 2PCR are released. At this time, the relay 1ABP is released because the multiple approach relay 1AR does not respond to coded track circuit energy while the train is adjacent the west end of the single track stretch. Accordingly, signal 6S remains at stop, and the coded energy supplied to the single track stretch in the rear of signal 6S is of reverse polarity so the distant signal will display its yellow or caution indication.

When the eastbound train advances far enough in the single track stretch for the rear of the train to be located a substantial distance from the signal 2S, the relay 1AR responds to coded energy supplied to the west end of the single track stretch and the relay 1ABP picks up to establish connections over which energy of reverse polarity may be supplied to the line wires 135 and 137 leading to signal 6S so this signal may display its yellow or caution indication to an approaching train.

On continued movement of the eastbound train through the stretch, the equipment operates in substantially the same manner as the species shown in Figs. 1A–1D and a detailed explanation of the operation of the apparatus is unnecessary.

*Operation of equipment on movement of a westbound train through the stretch*

On entrance of a westbound train into section 1T, the relay 1SR is picked up by energy supplied over its pick-up circuit which includes back contact 206 of relay 1TR, back contact 240 of relay 2TBP, and front contact 241 of the signal repeater relay 1HDR. Accordingly, relay 1SR picks up to establish its stick circuit, while contact 235 of relay 1SR establishes a circuit for supplying energy to the transmitter relays 2CRA, 2CRB and 2CRC and they operate to supply coded energy to the west end of the single track stretch to control the signals governing westbound traffic in this stretch and thus permit a following train to move through this stretch.

On release of relay 1TR, the relays 1TP, 6TP and 1TES release. Release of relay 1TES cuts off the supply of energy to the line wires 135 and 137 leading to signal 6S to insure that it remains at stop. Release of relay 6TP causes its contact 225 to interrupt the supply of energy to the transmitter relays 5CRA, 5CRB and 5CRC, and they cease to supply coded energy to the single track stretch so the eastbound head block signal governing entrance of traffic into this single track stretch is held at stop, and the eastbound distant signal is also held at stop.

If the westbound train under consideration is to enter the siding, the train is stopped short of signal 1S and one of the train crew reverses the switch 1W. On this movement of the switch the relay 1WP releases and its contact 236 establishes a stick circuit for relays 1TP and 6TP so that they remain picked up when the train passes through the end of section 1T and releases relay 1TR. As relay 6TP remains picked up at this time, its contact 225 maintains the circuit of the transmitter relays 5CRA, 5CRB and 5CRC, and they continue to operate to supply coded energy to the single track stretch to permit the head block signal at the opposite end of this stretch to display its clear indication and authorize entrance of an eastbound train into this single track stretch, and to cause the distant signal to display its caution indication to an approaching train.

On reversal of switch 1W and release of relay 1WP, contact 205 of relay 1WP interrupts the stick circuit for relay 1TES and its releases to interrupt the line circuits for signal 1S and for signal 6S so that both of these signals are held at stop. In addition, on release of relay 1WP, its contact 205 interrupts the pick-up circuit for relay 1SR so it remains released.

When the train completes its movement into the siding, the track relay 1TR picks up and its contact 203 reestablishes the pick-up circuit for relays 1TP and 6TP and these relays remain picked up after the switch 1W is restored to its normal position and relay 1WP picks up so that its contact 236 interrupts the stick circuits for relays 1TP and 6TP.

When the switch 1W is restored, the relay 1WP picks up and its front contact 205 completes the circuit for supplying energy to relay 1TE and after a short time interval it establishes the circuit of relay 1TES and it picks up to close its contacts in the line circuits for signals 1S and 6S and thus permits these signals to be governed by traffic conditions in the usual manner.

When a westbound train is to leave the siding, the switch 2W is reversed, thereby releasing the relay 2WP with the result that its contact 227 establishes a stick circuit for the relays 1TP and 6TP and these relays remain picked up when relay 1TR releases during movement of the train through the siding section. As relay 1TP remains picked up its contact 210 maintains the circuit for supplying energy to the transmitter relays 2CRA, 2CRB and 2CRC, and these relays continue to operate to supply coded energy to the single track stretch at the right of the siding to control the signals governing westbound traffic in the stretch.

On release of relay 2WP its contact 242 interrupts the supply of energy to the line wires 106 and 107 leading to signal 1S and thus insures that this signal will remain at stop as long as the switch 2W is reversed. As signal 1S is at stop the relay 1DPR is released and the coded energy supplied by relays 2CRA, 2CRB and 2CRC to the single track stretch is of reverse polarity and holds the distant signal at caution.

On release of relay 2WP its contact 232 interrupts the circuit for supplying energy to the transmitter relays 5CRA, 5CRB and 5CRC, and they cease to supply coded energy to the single track stretch at the left of the siding and cause the eastbound signals for this stretch to remain at stop. At this time contact 218 of relay 2WP interrupts the circuit of relay 6SR and establishes a circuit for the lamp of signal 5S. In addition, at this time contact 233 of relay 2WP establishes a circuit for the winding of signal 5S, and, if traffic conditions in advance are such that it is proper for the westbound train to leave the siding, the relay 5TBP is picked up so that its contact 115 establishes the circuit of the winding of signal 5S and it displays its green or clear indication.

When the westbound train passes through the end of section 1T in leaving the siding, the relay 1TR releases and interrupts the stick circuit for relay 1TES and it releases to interrupt the line circuits for the signals 1S and 6S and insures that these signals both remain at stop.

When the train enters the single track stretch, the relay 5TR ceases to operate and relays 5TFP and 5TBP release and contact 115 of relay 5TBP interrupts the circuit of the winding of signal 5S and it goes to stop and a contact of the signal mechanism interrupts the circuit of relay 5PCR and it releases.

When the train clears section 1T, relay 1TR picks up to reestablish the pick-up circuit for relays 1TP and 6TP, and to establish the circuit for relays 1TE and 1TES so that relay 1TES picks up and closes its front contacts in the circuits of the signals 1S and 6S.

When the switch 2W is restored to its normal position, the relay 2WP picks up and its contact 227 interrupts the stick circuit for relays 1TP and 6TP but these relays are energized by current supplied over their pick-up circuit.

At this time contact 232 of relay 2WP establishes the circuit of the transmitter relays 5CRA, 5CRB and 5CRC and they operate to supply coded energy to the single track stretch, but because of the presence of the train in the stretch this energy does not reach the other end of the stretch, nor does it operate relay 6AR so the relays 6AFP and 6ABP remain released.

When relay 2WP picks up, its contact 242 in the circuit for supplying energy to the line wires 106 and 107 leading to signal 1S is closed, but energy is not supplied to these line wires since relays 5PCR, 5TBP and 6ABP are all released. Accordingly, signal 1S remains at stop.

When the train advances far enough in the single track stretch for the rear of the train to be located a substantial distance from the right-hand end of the stretch, the relay 6AR responds to coded energy supplied to the right-hand end of the stretch and the relays 6AFP and 6ABP pick up. When relay 6ABP picks up, its contacts 105 and 108 establish connections over which energy of reverse polarity may be supplied to the line wires 106 and 107 leading to signal 1S and this signal may display a caution indication to an approaching train.

On continued movement of the westbound train through the stretch, the equipment operates in substantially the same manner as explained in detail in connection with Figs. 1A–1D.

*Operation of siding section equipment of Figs. 5A and 5B when trains meet*

As explained above, the siding section equipment shown in Figs. 5A and 5B operates so that when the main track section is occupied the supply of coded energy to the adjacent end of the single track stretch in advance is cut off, thereby holding at stop the head block signal governing entrance into the single track stretch of traffic moving in the opposite direction. It follows that if two sections adjoining the opposite ends of a single track stretch are occupied by trains approaching each other, the head block signals at both ends of the intervening single track stretch will be at stop and neither train can proceed through this single track stretch to take the siding and pass the other train.

In order to prevent this situation from arising, overlap signals are erected at the ends of main track sections equipped with apparatus arranged as shown in Figs. 5A and 5B. These overlap signals warn trains not to enter a siding area except for the purpose of entering the passing siding, but to remain in the single track portion in the rear of the siding entering signal, if a meet is to be made at the siding and the train approaching from the opposite direction has not arrived. This insures that coded energy will be supplied to the single track stretch beyond the siding so that the signals in that stretch and governing movement of traffic toward the siding will continue to display permissive indications and authorize traffic to move through the stretch.

Although I have illustrated one form of railway signaling system embodying my invention together with one modification thereof which I may employ, it should be understood that various changes and modifications may be made therein within the scope of the appended claims without departing from the spirit and scope of my invention.

Having thus described my invention, what I claim is:

1. In combination, a stretch of railroad track through which traffic moves in both directions, the rails of said track stretch being divided into a plurality of track sections each of which has at each end a code following track relay which is operated by energy supplied over the section rails, a transmitter relay at each end of the stretch effective when energized to connect a source of current across the rails of the stretch and effective when deenergized to connect the associated track relay across the rails of the stretch, an operating circuit for each transmitter relay including a back contact of the associated track relay, impulse forming equipment at each end of the stretch for supplying impulses of energy of substantial duration to the operating circuit for the associated transmitter relay, each track relay in the track stretch except the track relays at the ends of the stretch being effective when its contacts are picked up to connect a source of energy across the rails of the adjacent end of the adjoining track section so that on the supply of energy to an end of the stretch the supply of energy is repeated through all of the sections to operate the track relay at the other end provided the stretch is unoccupied, each impulse forming equipment being governed by the associated track relay and operating so long as the track relay is responding to received impulses to supply an energy impulse following each release of the track relay and when the track relay remains released to supply impulses of energy at intervals which are substantially longer than said impulses, whereby impulses of energy are normally supplied alternately in opposite directions over the rails by the operation of the equipments at the two ends of the stretch and whereby the equipment at each end continues to supply energy impulses to the stretch when the supply of energy impulses received over the rails of the stretch from the opposite end of the stretch is cut off, a signal at each end of the stretch governing entrance of traffic into the stretch, and control means for each signal governed by the associated track relay.

2. In combination, a stretch of railroad track through which traffic moves in both directions, the rails of said stretch being divided into a plurality of track sections including a first end section which extends to one end of the stretch and a second end section which extends to the other end of the stretch, each section in the stretch having at each end a code following track relay which is operated by energy supplied over the section rails, a transmitter relay at each end of the stretch effective when energized to connect a source of current across the rails of the stretch and effective when deenergized to connect the associated track relay across the rails of the stretch, an operating circuit for each transmitter relay including a back contact of the associated track relay, impulse forming equipment at each end of the stretch for supplying impulses of energy of substantial duration to the operating circuit for the associated transmitter relay, each track relay in the track stretch except the track relays at the ends of the stretch being effective when its contacts are picked up to connect a source of energy across the rails of the adjacent end of the adjoining track section so that on the supply of energy to an end of the stretch the supply of energy is repeated through all of the sections to the other end provided the stretch is unoccupied, each impulse forming equipment being governed by the associated track relay and operating when the track relay is responding to received impulses to supply an energy impulse following each release of the track relay and when the track relay remains released to supply impulses of energy at intervals which are substantially longer than said impulses, whereby impulses of energy are normally supplied alternately in opposite directions over the rails by the operation of the equipments at the two ends of the stretch and whereby the equipment at each end continues to supply energy impulses to the stretch when the supply of energy impulses received over the rails of the stretch from the opposite end of the stretch is cut off, a head block signal at each end of the stretch governing entrance of traffic into the stretch, control means for each of said signals governed by the associated track relay, a first distant signal governing entrance into the first end section of traffic moving toward said first end section from the second end section and governed by the track relay which is operated by coded energy supplied over the rails of said first end section from said one end of the stretch, and a second distant signal governing entrance into the second end section of traffic moving toward said second end section from said first end section governed by the track relay which is operated by coded energy supplied over the rails of said second end section from said other end of the stretch.

3. In combination, a railroad track layout comprising a single track stretch having an adjoining approach section at each end through which traffic moves in both directions, the rails of said single track stretch being divided into a plurality of track sections each of which has at each end a code following track relay which is operated by energy supplied over the section rails, a transmitter relay at each end of the stretch effective when energized to connect a source of current across the rails of the stretch and effective when deenergized to connect the associated track relay across the rails of the stretch, an operating circuit for each transmitter relay including a back contact of the associated track relay, impulse forming equipment at each end of the stretch for supplying impulses of energy of substantial duration to the operating circuit for the associated transmitter relay, each track relay in the single track stretch except the track relays at the ends of the stretch being effective when its contacts are picked up to connect a source of energy across the rails of the adjacent end of the adjoining track section so that on the supply of energy to an end of the stretch the supply of energy is repeated through all of the sections to the other end provided the stretch is unoccupied, each impulse forming equipment being governed by the associated track relay and operating when the track relay is responding to received impulses to supply an energy impulse following each release of the track relay and when the track relay remains released to supply impulses of energy at intervals which are substantially longer than said impulses, whereby impulses of energy are normally supplied alternately in opposite directions over the rails by the operation of the equipments at the two ends of the stretch and whereby the equipment at each end continues to supply energy impulses to the stretch when the supply of energy impulses received over the rails of the stretch from the opposite end of the stretch is cut off, means at each end of the single track stretch responsive to occupancy of the approach section adjoining said end of the single track stretch for controlling the supply of energy impulses to the adjacent end of the single track stretch, a signal at each end of single track stretch governing entrance of traffic into the stretch, and control means for each signal governed by the associated track relay.

4. In combination, a railroad track layout comprising a single track stretch having an adjoining approach section at each end through which traffic moves in both directions, the rails of said single track stretch being divided into a plurality of track sections including a first end section which adjoins one approach section and a second end section which adjoins the other approach section, each section in the single track stretch having at each end a code following track relay which is operated by energy supplied over the section rails, a transmitter relay at each end of the stretch effective when energized to connect a source of current across the rails of the stretch and effective when deenergized to connect the associated track relay across the rails of the stretch, an operating circuit for each transmitter relay including a back contact of the associated track relay, impulse forming equipment at each end of the stretch for supplying impulses of energy of substantial duration to the operating circuit for the associated transmitter relay, each track relay in the single track stretch except the track relays at the ends of the stretch being effective when its contacts are picked up to connect a source of energy across the rails of the adjacent end of the adjoining track section so that on the supply of energy to an end of the stretch the supply of energy is repeated through all of the sections to the other end provided the stretch is unoccupied, each impulse forming equipment being governed by the associated track relay and operating when the track relay is responding to received impulses to supply an energy impulse following each release of the track relay and when the track relay remains released to supply impulses of energy at intervals which are substantially longer than said impulses, whereby impulses of energy are normally supplied alternately in opposite directions over the rails by the operation of the equipments at the two ends of the stretch and whereby the equipment at each end continues to supply energy impulses to the stretch when the supply of energy impulses received over the rails of the stretch from the opposite end of the stretch is cut off, means at each end of the single track stretch responsive to occupancy of the approach section adjoining said end of the single track stretch for controlling the supply of energy impulses to the adjacent end of the single track stretch, a signal at each end of the stretch governing entrance of traffic into the stretch, control means for each signal governed by the associated track relay, a first distant signal governing entrance into the first end section of traffic moving toward said first end section from the second end section and governed by the track relay which is operated by coded energy supplied over the rails of said first end section from said one end of the stretch, and a second distant signal governing entrance into the second end section of traffic moving toward said second end section from said first end section and governed by the track relay which is operated by coded energy supplied over the rails of said second end section from said other end of the stretch.

5. In combination, a railroad track layout having a first single track stretch connected with a second single track stretch by a main track portion, impulse forming equipment at each end of each single track stretch for supplying coded energy to the rails of said stretch, each of said single track stretches having a code following track relay at each end which is operated by coded energy supplied over the rails of the stretch as a result of operation of the impulse forming equipment at the opposite end of the same stretch, each impulse forming equipment being governed by the associated track relay and operating in such manner that when such track relay is responding to received impulses an impulse of energy is supplied to the track rails following each release of the track relay to thereby cause impulses of energy to be normally supplied alternately in opposite directions over the rails by the equipment at the two ends of said stretch, a code detecting relay associated with each track relay and governed thereby so as to be energized when and only when the track relay is being operated periodically by coded energy, a head block signal at each end of each single track stretch controlled by the associated code detecting relay, a first entering signal governing entrance of traffic from the first single track stretch into the main track portion, a second entering signal governing entrance of traffic from the second single track stretch into the main track portion, a line circuit for each of said entering signals extending the length of said main track portion and governed by traffic conditions therein, means for each line circuit for supplying thereto energy of normal or of reverse polarity according as the code detecting relay at the end of said main track portion remote from the signal with which the line circuit is associated is energized or is deenergized, and control means for each entering signal selectively responsive to the polarity of the energy supplied to the line circuit for such signal.

6. In combination, a railroad track layout having a first single track stretch connected with a second single track stretch by a main track portion, impulse forming equipment at each end of each single track stretch for supplying coded energy to the rails of said stretch, each of said single track stretches having a code following track relay at each end which is operated by coded energy supplied over the rails of the stretch as a result of operation of the impulse forming equipment at the opposite end of the same stretch, each impulse forming equipment being governed by the associated track relay and operating in such manner that when such relay is responding to received impulses an impulse of energy is supplied to the track rails following each release of the track relay to thereby cause impulses of energy to be normally supplied alternately in opposite directions over the rails by the equipments at the two ends of said stretch, a code detecting relay associated with each track relay and governed thereby so as to be energized when and only when the track relay is being operated periodically by coded energy, a head block signal at each end of each single track stretch controlled by the associated code detecting relay, an entering signal at each end of said main track portion for governing entrance of traffic into the main track portion, a line circuit for each of said entering signals extending the length of the main track portion and governed by traffic conditions therein, means for each line circuit for supplying thereto energy of normal or of reverse polarity according as the code detecting relay at the end of said main track portion remote from the signal with which the line circuit is associated is energized or is deenergized, control means for each entering signal selectively responsive to the polarity of the energy supplied thereto, and means for supplying energy to each entering signal control means from the line circuit for the associated signal only when the code detecting relay at the same end of the main track portion siding is deenergized.

7. In combination, a railroad track layout having a first single track stretch connected with a second single track stretch by a main track portion, impulse forming equipment at each end of each single track stretch for supplying coded energy to the rails of said stretch, each of said single track stretches having a code following track relay at each end which is operated by coded energy supplied over the rails of the stretch as a result of operation of the impulse forming equipment at the opposite end of the same stretch, each impulse forming equipment being governed by the associated track relay and operating in such manner that when such relay is responding to received impulses an impulse of energy is supplied to the track rails following each release of the track relay to thereby cause impulses of energy to be normally supplied alternately in opposite directions over the rails by the equipments at the two ends of said stretch, a code detecting relay associated with each track relay and governed thereby so as to be energized when and only when the track relay is being operated periodically by coded energy, a head block signal at each end of each single track stretch controlled by the associated code detecting relay, an entering signal at each end of the main track portion for governing entrance of traffic into the main track portion, a line circuit for each of said entering signals extending the length of the main track portion and governed by traffic conditions therein, means for supplying energy to each line circuit at the end thereof remote from the entering signal with which such line circuit is associated, control means for each entering signal, and means for supplying energy to each control means from the line circuit for the associated signal only when the code detecting relay at the same end of the main track portion is deenergized.

8. In combination, a railroad track layout having a first single track stretch connected with a second single track stretch by a main track portion, impulse forming equipment at each end of each single track stretch for supplying coded energy to the rails of the said stretch, each of said single track stretches having a code following track relay at each end which is operated by coded energy supplied over the rails of the stretch as a result of operation of the impulse forming equipment at the opposite end of the same stretch, each impulse forming equipment being governed by the associated track relay and operating in such manner that when such relay is responding to received impulses an impulse of energy is supplied to the track rails following each release of the track relay to thereby cause impulses of energy to be normally supplied alternately in opposite directions over the rails by the operation of the equipments at the two ends of the stretch, a code detecting relay associated with each track relay and governed thereby so as to be energized when and only when the track relay is being operated periodically by coded energy, a head block signal at each end of each single track stretch controlled by the associated code detecting relay, a first entering signal governing entrance of traffic from the first single track stretch into the main track portion, a second entering signal governing entrance of traffic from the second single track stretch into the main track portion, a line circuit for each of said entering signals extending the length of said main track portion and governed by traffic conditions therein, means for each line circuit for supplying thereto energy of normal or of reverse polarity according as the code detecting relay at the end of said main track portion remote from the signal with which the line circuit is associated is energized or is deenergized, means governed by traffic conditions in the portion of said second single track stretch adjacent the main track portion for controlling the supply of energy of reverse polarity to the line circuit for said first entering signal, means governed by traffic conditions in the portion of said first single track stretch adjacent the main track portion for controlling the supply of energy of reverse polarity to the line circuit for said second entering signal, and control means for each entering signal selectively responsive to the polarity of the energy supplied to the line circuit for such signal.

9. In combination, a railroad track layout having a first single track stretch connected with a second single track stretch by a main portion, each of said single track stretches being divided into a plurality of track sections including an end section adjacent said main track portion, each of the track sections in the single track stretches being provided at each end with a code following track relay which is operated by coded energy supplied over the section rails, impulse forming equipment at each end of each single track stretch for supplying coded energy to the rails of said stretch, each track relay in each single track stretch except the track relays at the ends thereof being effective when its contacts are picked up to connect a source of energy across the rails of the adjacent section in said stretch so that on the supply of energy to an end of a single track stretch the supply of energy is repeated through all of the sections of that single track stretch to the other end provided said stretch is unoccupied, each impulse forming equipment being governed by the associated track relay and operating when the track relay is responding to received impulses to supply an energy impulse following each release of the track relay and when the track relay remains released to supply impulses of energy at intervals which are substantially longer than said impulses, whereby impulses of energy are normally supplied alternately in opposite directions over the rails of each single track stretch by the operation of the equipments at the two ends thereof and whereby the equipment at each end of each single track stretch continues to supply energy impulses to the track rails when the supply of impulses over the rails of the same stretch from the other end is cut off, a code detecting relay at each end of each single track stretch, means for governing each code detecting relay so that it is energized when and only when the associated track relay is being operated periodically by coded energy, a head block signal at each end of each single track stretch controlled by the associated code detecting relay, a first entering signal governing entrance of traffic from the first single track stretch into the main track portion, a second entering signal governing entrance of traffic from the second single track stretch into the main track portion, means controlled by traffic conditions in the main track portion and by the code detecting relay at the adjoining end of said second single track stretch for controlling said first entering signal, means controlled by traffic conditions in the main track portion and by the code detecting relay at the adjoining end of said first single track stretch for controlling said second entering signal, a first distant signal governing entrance into the end section of the first single track stretch of traffic approaching said first entering signal, means governed by said first entering signal and by coded energy supplied over the rails of said end section from the location of said first entering signal for controlling said first distant signal, a second distant signal governing entrance into the end section of the second single track stretch of traffic approaching said second entering signal, and means governed by said second entering signal and by coded energy supplied over the rails of said end section from the location of said second entering signal for controlling said second distant signal.

10. In combination, a railroad track layout comprising a single track stretch having an adjoining approach section at each end, impulse forming equipment at each end of said single track stretch for supplying coded energy to the rails of the stretch, a code following track relay at each end of the stretch which is operated by coded energy supplied over the rails of the stretch as a result of operation of the impulse forming equipment at the opposite end of the stretch, each impulse forming equipment being governed by the associated track relay and operating in such manner that an impulse of energy is supplied to the track rails following each release of the track relay as long as such relay is responding to received impulses and when the track relay remains released impulses of energy are supplied at intervals which are substantially longer than said impulses whereby impulses of energy are normally supplied alternately in opposite directions over the rails of the stretch by the operation of the equipments at the two ends thereof and whereby the equipment at each end continues to supply energy impulses to the stretch when the supply of energy impulses over the rails of the stretch from the other end of the stretch is cut off, a code detecting relay associated with each track relay and governed thereby so as to be energized when and only when the track relay is being operated periodically by coded energy, a head block signal at each end of the single track stretch controlled by the associated code detecting relay, and directionally controlled means for each approach section selectively responsive to occupancy of such section by a train entering the section at the end remote from said single track stretch for discontinuing the supply of coded energy to the adjacent end of said single track stretch which adjoins the other end of such approach section.

11. In combination, a railroad track layout having a first single track stretch connected with a second single track stretch by a main track portion divided into two track sections, impulse forming equipment at each end of each single track stretch for supplying coded energy to the rails of the said stretch, each of said single track stretches having a code following track relay at each end which is operated by coded energy supplied over the rails of the stretch as a result of operation of the impulse forming equipment at the opposite end of the same stretch, each impulse forming equipment being governed by the associated track relay and operating in such manner that an impulse of energy is supplied to the track rails following each release of the track relay as long as such relay is responding to received impulses and when the track relay remains released impulses of energy are supplied at intervals which are substantially longer than said impulses whereby impulses of energy are normally supplied alternately in opposite directions over the rails by the operation of the equipments at the two ends of the stretch and whereby the equipment at each end continues to supply energy impulses to the stretch when the supply of energy impulses received over the rails of the stretch from the opposite end of the same stretch is cut off, a code detecting relay associated with each track relay and governed thereby so as to be energized when and only when the track relay is being operated periodically by coded energy, a head block signal at each end of each single track stretch controlled by the associated code detecting relay, and directionally controlled means for each track section in said main track portion selectively responsive to occupancy of the section by a train entering the section from the other section of said main track portion for discontinuing the supply of coded energy to the adjacent end of the adjoining single track stretch in front of such train.

12. In combination, a railroad track layout having a first single track stretch connected with a second single track stretch by a main track portion divided into two track sections, impulse forming equipment at each end of each single track stretch for supplying coded energy to the rails of said stretch, each of said single track stretches having a code following track relay at each end which is operated by coded energy supplied over the rails of the stretch as a result of operation of the impulse forming equipment at the opposite end of the same stretch, each impulse forming equipment being governed by the associated track relay and operating in such manner that an impulse of energy is supplied to the track rails following each release of the track relay as long as such relay is responding to received impulses and when the track relay remains released impulses of energy are supplied at intervals which are substantially longer than said impulses, whereby impulses of energy are normally supplied alternately in opposite directions over the rails by the operation of the equipments at the two ends of the stretch and whereby the equipment at each end continues to supply energy impulses to the stretch when the supply of energy impulses over the rails of the stretch from the other end of the same stretch is cut off, a code detecting relay associated with each track relay and governed thereby so as to be energized when and only when the track relay is being operated by periodically coded energy, a head block signal at each end of each single track stretch controlled by the associated code detecting relay, directionally controlled means for each track section in said main track portion selectively responsive to traffic conditions in said section and means governed by the directionally controlled means for each section for controlling the impulse forming equipment at the adjacent end of the single track stretch which adjoins such section so as to permit coded energy to be supplied by said impulse forming equipment only when such section is unoccupied or is occupied by a train entering the section from the adjoining single track stretch.

13. In combination, a railroad track layout having a first single track stretch connected with a second single track stretch by a main track portion, each of said single track stretches being divided into a plurality of track sections including an end section adjacent said main track portion, each of the track sections in the single track portions being provided at each end with a code following track relay which is operated by coded energy supplied over the section rails, impulse forming equipment at each end of each single track stretch for supplying coded energy to the rails of said stretch, each track relay in each single track stretch except the track relays at the ends thereof being effective when its contacts are picked up to connect a source of energy across the rails of the adjacent end of the adjoining section so that on the supply of energy to an end of a single track portion the supply of energy is repeated through all of the sections of that single track portion to operate the track relay at the other end provided the single track stretch is unoccupied, each impulse forming equipment being governed by the associated track relay and operating to supply an energy impulse following each release of the track relay as long as such relay is responding to received impulses and when the track relay remains released to supply impulses of energy at intervals which are substantially longer than said impulses, whereby impulses of energy are normally supplied alternately in opposite directions of the rails by the operation of the equipments at the two ends of each single track stretch and whereby the equipment at each end of each single track stretch continues to supply energy impulses to the track rails when the supply of impulses received over the rails from the opposite end of the same stretch is cut off, a code detecting relay at each end of each single track stretch, means controlled by each track relay at an end of a single track stretch for governing the associated code detecting relay so that it is energized when and only when the track relay is being operated periodically by coded energy, a head block signal at each end of each single track stretch controlled by the associated code detecting relay, a first entering signal governing entrance of traffic from the first single track stretch into the main track portion, a second entering signal governing entrance of traffic from the second single track stretch into the main track portion, means governed by traffic conditions in the main track portion for causing said first entering signal to display a clear or a caution indication according as the code detecting relay at the end of said main track portion adjacent said second single track stretch is energized or is deenergized, means governed by traffic conditions in the main track portion for causing said second entering signal to display its clear or its caution indication according as the code detecting relay at the end of said main track portion adjacent said first single track stretch is energized or is deenergized, a first distant signal governing entrance into the end section of said first single track stretch of traffic approaching said first entering signal, means governed by traffic conditions in said end section for causing said first distant signal to display its clear or its caution indication according as said first entering signal displays its clear or its caution indication, a second distant signal governing entrance into the end section of said second single track stretch of traffic approaching said second entering signal, and means governed by traffic conditions in said end section for causing said second distant signal to display its clear or its caution indication according as said second entering signal displays its clear or its caution indication.

14. In the combination, a railroad track layout comprising a single track stretch through which traffic moves in both directions between a first and a second location, and a first and a second approach section which adjoin said stretch at said first and second locations respectively, the rails of said single track stretch being divided into a plurality of track sections each of which has at each end a code following track relay which is operated by energy supplied over the section rails, a transmitter relay at each end of the stretch effective when energized to connect a source of current across the rails of the stretch and effective when deenergized to connect the associated track relay across the rails of the stretch, an operating circuit for each transmitter relay including a back contact of the associated track relay, impulse forming equipment at each end of the stretch for supplying impulses of energy of substantial duration to the operating circuit for the associated transmitter relay, each track relay in the track stretch except the track relays at the ends of the stretch being effective when its contacts are picked up to cause a source of energy to be connected across the rails of the adjacent end of the adjoining track section so that on the supply of energy to an end of the stretch the supply of energy is repeated through all of the sections to the other end provided the stretch is unoccupied, each impulse forming means being governed by the associated track relay and operating when the track relay is responding to received impulses to supply an energy impulse following each release of the track relay and when the track relay remains released to supply impulses of energy at intervals which are substantially longer than said impulses, whereby impulses of energy are normally supplied alternately in opposite directions over the rails by the equipments at the two ends of the track stretch and whereby the equipment at each end continues to supply energy impulses to the track rails when the supply of energy impulses received over the rails of the stretch from the other end of the stretch is cut off, means at each of said locations responsive to occupancy of the adjoining approach section for controlling the supply of energy impulses to the adjacent end of the single track stretch, a signal at each location governing entrance into the stretch of traffic moving toward the other location, and control means for each signal governed by the associated track relay.

15. In combination, a railroad track layout having an approach track section at each end connected by a single track stretch the rails of which are divided into a plurality of track sections each of which has a code following track relay at each end, impulse forming equipment at each end of said single track stretch effective when rendered active to supply impulses of energy to the rails of said single track stretch, each of said impulse forming equipment being governed by the associated track relay and operating when rendered active to supply an energy impulse following each release of the track relay so long as such relay is responding to received impulses and when the track relay remains released to supply impulses of energy at intervals, each track relay in said single track stretch except the track relays at the extreme ends of said single track stretch having associated therewith means responsive to operation of said track relay for supplying coded energy to the adjacent end of the adjoining track section, whereby when the single track stretch is vacant the application of coded energy to an end of the single track stretch results in the supply of coded energy to the corresponding end of each track section in the stretch, a signal at each end of said single track stretch governing entrance of traffic into the stretch, control means for each signal governed by the associated track relay, and means at each end of said single track stretch and governed by traffic conditions in the adjoining approach section for rendering the impulse forming equipment at that end of the stretch active.

16. In combination, a railroad track layout having an approach track section at each end connected by a single track stretch the rails of which are divided into a plurality of track sections each of which has a code following track relay at each end, impulse forming equipment at each end of said single track stretch effective when rendered active to supply impulses of energy to the rails of said single track stretch, each impulse forming equipment being governed by the associated track relay and when rendered active operating to supply an energy impulse following each release of the track relay so long as such relay is responding to received impulses and when the track relay remains released to supply impulses of energy at intervals, each track relay in said single track stretch except the track relays at the extreme ends of said single track stretch having associated therewith means responsive to operation of said track relay for supplying coded energy to the adjacent end of the adjoining track section, whereby when the single track stretch is vacant the application of coded energy to an end of the single track stretch results in the supply of coded energy to the corresponding end of each track section in the stretch, a signal at each end of said single track stretch governing entrance of traffic into the stretch, control means for each signal governed by the associated track relay, and means at each end of the stretch for rendering the associated impulse forming means active only when the approach section at that end of the single track stretch is unoccupied or is occupied by a train leaving the single track stretch.

17. In combination, a railroad track layout having an approach track section at each end connected by a single track stretch the rails of which are divided into a plurality of track sections including a first end section adjacent one end of the single track stretch and a second end section adjacent the other end of the single track stretch, each track section in said single track stretch having at each end a code following track relay, impulse forming equipment at each end of said single track stretch effective when rendered active to supply impulses of energy to the rails of said single track stretch, each impulse forming equipment being governed by the associated track relay and when rendered active operating to supply an energy impulse following each release of the track relay so long as such relay is responding to received impulses and when the track relay remains released to supply impulses of energy at intervals, each track relay in said single track stretch except the track relays at the extreme ends of said single track stretch having associated therewith means responsive to operation of said track relay for supplying coded energy to the adjacent end of the adjoining track section, whereby when the single track stretch is vacant the application of coded energy to an end of the single track stretch results in the supply of coded energy to the corresponding end of each track section in the single track stretch, a head block signal at each end of said single track stretch governing entrance of traffic into the stretch, control means for each head block signal governed by the associated track relay, a first distant signal governing entrance into the first end track section of traffic moving from said second end section, a second distant signal governing entrance into the second end section of traffic moving from said first end section, control means for each distant signal governed by the track relay at the adjacent end of the associated end track section, and means at each end of said single track stretch and governed by traffic conditions in the adjoining approach section for rendering the impulse forming means at that end of the stretch active.

18. In combination, a railroad track layout having an approach track section at each end connected by a single track stretch the rails of which are divided into a plurality of track sections including a first end section adjacent one end of the single track stretch and a second end section adjacent the other end of the single track stretch, each track section in said single track stretch having at each end a code following track relay, impulse forming equipment at each end of said single track stretch effective when rendered active to supply impulses of energy to the rails of said single track stretch, each impulse forming equipment being governed by the associated track relay and when rendered active operating to supply an energy impulse following each release of the track relay so long as such relay is responding to received impulses and when the track relay remains released to supply impulses of energy at intervals, the impulse forming equipment at each end of said single track stretch also being governed by traffic conditions in the approach section at that end of the single track stretch and operating at times to supply energy of normal polarity and at other times to supply energy of reverse polarity to the rails of the stretch, each track relay in said single track stretch except the track relays at the extreme ends of said single track stretch having associated therewith means responsive to operation of said track relay for supplying coded energy to the adjacent end of the adjoining track section, whereby when the single track stretch is vacant the application of coded energy to an end of the single track stretch results in the supply of coded energy to the corresponding end of each track section in the single track stretch, a head block signal at each end of said single track stretch governing entrance of traffic into the stretch, control means for each head block signal governed by the associated track relay, a first distant signal governing entrance into the first end track section of traffic moving from said second end section, a second distant signal governing entrance into the second end section of traffic moving from said first end section, and control means for each distant signal governed by the track relay at the adjacent end of the associated end track section and selectively responsive to the polarity of the energy supplied over the rails of said end track section.

19. In combination, a railroad track layout having a first single track stretch connected with a second single track stretch by a main track portion, the rails of each of said single track stretches being divided into a plurality of track sections each of which has at each end a code following track relay, impulse forming equipment at each end of each single track stretch effective when rendered active to supply impulses of energy to the rails of the associated single track stretch, each impulse forming equipment being governed by the associated track relay and when rendered active operating to supply an energy impulse following each release of the track relay so long as such relay is responding to received impulses and when the track relay remains released to supply impulses of energy at intervals, each track relay in each single track stretch except the track relays at the extreme ends thereof having associated therewith means responsive to operation of said track relay for supplying coded energy to the adjacent end of the adjoining track section, whereby when a single track stretch is vacant the application of coded energy to an end of the stretch results in the supply of coded energy to the corresponding end of each track section in that single track stretch, a head block signal at each end of each single track stretch governing entrance of traffic into the stretch, control means for each head block signal governed by the associated track relay, a first entering signal governing entrance of traffic from said first single track stretch into the main track portion, a second entering signal governing entrance of traffic from said second single track stretch into the main track portion, and control means for each of said entering signals governed by traffic conditions in the main track portion and also governed by the code following track relay at the adjacent end of the single track stretch in advance of said entering signal.

20. In combination, a railroad track layout having a first single track stretch connected with a second single track stretch by a main track portion, the rails of each of said single track stretches being divided into a plurality of track sections each of which has at each end a code following track relay, impulse forming equipment at each end of each single track stretch effective when rendered active to supply impulses of energy to the rails of the associated single track stretch, each impulse forming equipment being governed by the associated track relay and operating when rendered active to supply an energy impulse following each release of the track relay so long as such relay is responding to received impulses and when the track relay remains released to supply impulses of energy at intervals, each track relay in each single track stretch except the track relays at the extreme ends thereof having associated therewith means responsive to operation of said track relay for supplying coded energy to the adjacent end of the adjoining track section, whereby when a single track stretch is vacant the application of coded energy to an end of the stretch results in the supply of coded energy to the corresponding end of each track section in that single track stretch, a code detecting relay associated with each code following track relay at an end of a single track stretch and governed thereby so as to be energized when and only when the track relay is being operated by coded energy, a head block signal at each end of each single track stretch for governing entrance of traffic into the stretch and controlled by the associated code detecting relay, a first entering signal governing entrance of traffic from said first single track stretch into the main track portion, a second entering signal governing entrance of traffic from said second single track stretch into the main track portion, and control means for each of said entering signals governed by traffic conditions in the main track portion and also governed by the code detecting relay at the adjacent end of the single track stretch in advance of said entering signal.

21. In combination, a railroad track layout having a first single track stretch connected with a second single track stretch by a main track portion, the rails of each of said single track stretches being divided into a plurality of track sections each of which has at each end a code following track relay, impulse forming equipment at each end of each single track stretch effective when rendered active to supply impulses of energy to the rails of the associated single track stretch, each impulse forming equipment being governed by the associated track relay and when rendered active operating to supply an energy impulse following each release of the track relay so long as such relay is responding to received impulses and when the track relay remains released to supply impulses of energy at intervals, each track relay in each single track stretch except the track relays at the extreme ends thereof having associated therewith means responsive to operation of said track relay for supplying coded energy to the adjacent end of the adjoining track section, whereby when a single track stretch is vacant the application of coded energy to an end of the stretch results in the supply of coded energy to the corresponding end of each track section in that single track stretch, a code detecting relay for each single track stretch at the end adjacent said main track portion, means for controlling each code detecting relay so that it is energized only when the associated track relay is responding to coded energy, each single track stretch having connected across the rails thereof at the end adjacent the main track portion an approach code following relay which responds to the coded energy supplied to the rails at that end only when said single track stretch is unoccupied for a predetermined distance from said end, an approach code detecting relay for each approach code following relay, means for governing each approach code detecting relay so that it is energized only when the associated approach code following relay is responding periodically to coded energy, an entering signal at each end of the main track portion and governing entrance of traffic into said main track portion, and control means for each entering signal governed by traffic conditions in the main track portion and effective to cause the associated signal to display its clear indication only if the code detecting relay governed by the track relay at the adjacent end of the single track portion in advance is energized and effective to cause the associated signal to display its caution indication only if the approach code detecting relay governed by the approach relay at the adjacent end of the single track portion in advance is energized.

22. In combination, a railroad track layout having a first single track stretch connected with a second single track stretch by a main track portion, the rails of each of said single track stretches being divided into a plurality of track sections each of which has at each end a code following track relay, impulse forming equipment at each end of each single track stretch effective when rendered active to supply impulses of energy to the rails of the associated single track stretch, each impulse forming equipment being governed by the associated track relay and when rendered active operating to supply an energy impulse following each release of the track relay so long as such relay is responding to received impulses and when the track relay remains released to supply impulses of energy at intervals, each track relay in each single track stretch except the track relays at the extreme ends thereof having associated therewith means responsive to operation of said track relay for supplying coded energy to the adjacent end of the adjoining track section, whereby when a single track stretch is vacant the application of coded energy to an end of the stretch results in the supply of coded energy to the corresponding end of each track section in that single track stretch, a slow release code detecting relay at the end of each single track stretch adjacent said main track stretch, means for controlling each slow release code detecting relay so that it is energized only when the associated track relay is responding periodically to coded energy, a main section track relay governed by traffic conditions in the main track portion, a stick relay having pick-up and stick circuits which are interrupted when said main section track relay is released, means effective when said main section track relay picks up for establishing the pick-up circuit for said stick relay only after a time interval which exceeds the release time of one of said code detecting relays, an entering signal at each end of the main track portion for governing entrance of traffic into said main track portion, and control means for each entering signal governed by said stick relay and also governed by the code detecting relay associated with the track relay at the adjacent end of the single track stretch in advance.

23. In combination, a railroad track layout having a first single track stretch connected with a second single track stretch by a main track portion, the rails of each of said single track stretches being divided into a plurality of track sections each of which has at each end a code following track relay, impulse forming equipment at each end of each single track stretch effective when rendered active to supply impulses of energy to the rails of the associated single track stretch, each impulse forming equipment being governed by the associated track relay and when rendered active operating to supply an energy impulse following each release of the track relay as long as such relay is responding to received impulses and when the track relay remains released to supply impulses of energy at intervals, each track relay in each single track stretch except the track relays at the extreme ends thereof having associated therewith means responsive to operation of said track relay for supplying coded energy to the adjacent end of the adjoining track section, whereby when a single track stretch is vacant the application of coded energy to an end of the stretch results in the supply of coded energy to the corresponding end of each track section in that single track stretch, a slow release code detecting relay at the end of each single track stretch adjacent said main track stretch, means for controlling each slow release code detecting relay so that it is energized only when the associated track relay is responding periodically to coded energy, a main section track relay governed by traffic conditions in the main track portion, a stick relay having pick-up and stick circuits which are interrupted when said main section track relay is released, means effective when said main section track relay picks up for establishing the pick-up circuit for said stick relay only after a time interval which exceeds the release time of one of said code detecting relays, an entering signal at each end of the main track portion for governing entrance of traffic into said main track portion, each of said entering signals being capable of displaying a stop, a caution, or a clear indication, means for each of said entering signals effective only when said stick relay is picked up for causing the signal to display its caution indication, and means for each of said entering signals effective only when said stick relay and the code detecting relay associated with the track relay at the adjacent end of the single track stretch in advance is energized for causing the signal to display its clear indication.

HENRY S. YOUNG.

REFERENCES CITED

The following references are of record in the file of this patent:

UNITED STATES PATENTS

| Number | Name | Date |
|---|---|---|
| 2,244,901 | Staples | June 10, 1941 |
| 2,280,491 | Kemmerer | Apr. 21, 1942 |
| 2,291,579 | Judge | July 28, 1942 |
| 2,349,460 | Phinney et al. | May 23, 1944 |
| 2,400,005 | Jerome | May 7, 1946 |